United States Patent
Yoo et al.

(10) Patent No.: US 10,697,553 B2
(45) Date of Patent: *Jun. 30, 2020

(54) DISH WASHING MACHINE

(71) Applicant: Samsung Electronics Co., Ltd., Suwon-si, Gyeonggi-do (KR)

(72) Inventors: Soo Hyung Yoo, Incheon (KR); Seung Gee Hong, Suwon-si (KR); Chan Young Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/245,933

(22) Filed: Jan. 11, 2019

(65) Prior Publication Data
US 2019/0145534 A1    May 16, 2019

Related U.S. Application Data

(62) Division of application No. 14/584,661, filed on Dec. 29, 2014, now Pat. No. 10,221,952.

(30) Foreign Application Priority Data

Dec. 31, 2013   (KR) .................. 10-2013-0169377
Jul. 25, 2014   (KR) .................. 10-2014-0094605

(51) Int. Cl.
  *A47L 15/42*   (2006.01)
  *F16K 11/085*  (2006.01)
  (Continued)

(52) U.S. Cl.
  CPC ......... *F16K 11/0856* (2013.01); *A47L 15/16* (2013.01); *A47L 15/4221* (2013.01);
  (Continued)

(58) Field of Classification Search
  CPC ................................................ A47L 15/4282
  See application file for complete search history.

(56) References Cited

U.S. PATENT DOCUMENTS 1,645,227 A   10/1927  Cease
3,570,537 A    3/1971  Kelly
(Continued)

FOREIGN PATENT DOCUMENTS

CN          1400880       3/2003
CN        203226793      10/2013
(Continued)

OTHER PUBLICATIONS

International Search Report dated Apr. 1, 2015 from International Patent Application No. PCT/KR2014/013016, 3 pages.
(Continued)

*Primary Examiner* — Jason Y Ko
(74) *Attorney, Agent, or Firm* — Staas & Halsey LLP

(57) ABSTRACT

A dish washing machine includes a plurality of spray nozzles to spray wash water, a sump to store wash water, a pump to pump wash water stored in the sump, and a distribution device to distribute wash water pumped by the pump into the plurality of spray nozzles. The distribution device includes a cylindrical housing having an inlet formed in one axial end portion thereof and a plurality of outlets that are arranged in a circumferential surface of the cylindrical housing in an axial direction and connected to the plurality of spray nozzles, an opening/closing member rotatably disposed within the cylindrical housing to open and close the plurality of outlets, and a motor to rotate the opening/closing member. Wash water may be independently sprayed from a plurality of nozzles, a wash tank may be dividedly washed, and loss of pressure of wash water may be reduced, thereby increasing washability.

2 Claims, 56 Drawing Sheets

(51) Int. Cl.
*F16K 11/076* (2006.01)
*A47L 15/16* (2006.01)

(52) U.S. Cl.
CPC ........ *A47L 15/4282* (2013.01); *F16K 11/076* (2013.01); *Y10T 137/86533* (2015.04)

(56) References Cited

U.S. PATENT DOCUMENTS

| | | | |
|---|---|---|---|
| 4,884,585 | A | 12/1989 | Oh |
| 5,848,610 | A | 12/1998 | Livernash |
| 2003/0168087 | A1 | 9/2003 | Inui et al. |
| 2005/0139272 | A1 | 6/2005 | Thornton |
| 2006/0054194 | A1 | 3/2006 | Choi et al. |
| 2006/0278258 | A1 | 12/2006 | Kara et al. |
| 2009/0056754 | A1 | 3/2009 | Rolek |
| 2012/0145200 | A1 | 6/2012 | Jerg et al. |
| 2012/0279536 | A1 | 11/2012 | Adams |
| 2013/0319481 | A1 | 12/2013 | Welch |
| 2013/0319487 | A1 | 12/2013 | Hong et al. |

FOREIGN PATENT DOCUMENTS

| | | |
|---|---|---|
| DE | 102005031962 | 1/2007 |
| DE | 102006011580 | 10/2007 |
| EP | 2583611 | 4/2013 |
| EP | 2870907 | 5/2015 |
| JP | 50-13499 | 5/1975 |
| JP | 2011-117614 | 6/2011 |
| WO | 01/58335 | 8/2001 |
| WO | 03/005875 | 1/2003 |
| WO | 2004/085893 | 10/2004 |
| WO | 2015/072698 | 5/2015 |

OTHER PUBLICATIONS

Australian Office Action dated Mar. 31, 2017 from Australian Patent Application No. 2014374589, 3 pages.
Australian Office Action dated Dec. 5, 2017 in Australian Patent Application No. 2014374589.
Australian Notice of Acceptance for Patent Application dated Mar. 26, 2018 in Australian Patent Application No. 2014374589.
European Communication dated Apr. 25, 2018 in European Patent Application No. 14876995.3.
Extended European Search Report dated Jul. 18, 2017 in European Patent Application No. 14876995.3.
Australian Examination Report dated Aug. 24, 2017 in Australian Patent Application No. 2014374589.
Chinese Office Action dated May 25, 2018 in Chinese Patent Application No. 201480076198.X.
U.S. Office Action dated Mar. 28, 2017 in U.S. Appl. No. 14/584,661.
U.S. Office Action dated Sep. 1, 2017 in U.S. Appl. No. 14/584,661.
U.S. Office Action dated Apr. 18, 2018 in U.S. Appl. No. 14/584,661.
U.S. Advisory Action dated Jun. 25, 2018 in U.S. Appl. No. 14/584,661.
U.S. Notice of Allowance dated Oct. 24, 2018 in U.S. Appl. No. 14/584,661.
U.S. Appl. No. 14/584,661, filed Dec. 29, 2014, Soo Hyung Yoo, Samsung Electronics Co., Ltd.
European Communication dated Feb. 20, 2019 in corresponding European Patent Application No. 14876995.3 (21 pages).
Japanese Office Action dated Dec. 18, 2018 in Japanese Patent Application No. 2016-543724.
Japanese Office Action dated Sep. 3, 2019 in Japanese Patent Application No. 2016-543724.
Chinese Office Action dated Nov. 4, 2019 in Chinese Patent Application No. 201480076198.X.

DISH WASHING MACHINE

CROSS-REFERENCE TO RELATED APPLICATIONS

This application is a divisional application of U.S. patent application Ser. No. 14/584,661 filed on Dec. 29, 2014 which claims the benefit of Korean Patent Application No. 10-2013-0169377 and 10-2014-0094605, filed on Dec. 31, 2013 and Jul. 25, 2014, respectively, in the Korean Intellectual Property Office, the disclosures of each of which are incorporated herein by reference.

BACKGROUND

1. Field

Embodiments disclosed herein relate to a dish washing machine including a spray nozzle fixed at one side of a wash tank and a vane disposed or placed to be capable of moving within the wash tank to reflect wash water sprayed from the spray nozzle, toward the dishes.

2. Description of the Related Art

A dish washing machine generally refers to a household or commercial appliance which is used to clean or sanitize objects (e.g., dishes) disposed therein. For example, a dish washing machine may include a main body in which a wash tank is disposed or placed, a basket containing the dishes, a sump configured to store wash water, a spray nozzle configured to spray the wash water, and a pump configured to supply the wash water of the sump to the spray nozzle, and configured to spray the wash water toward the dishes under a high pressure and wash the dishes.

In general, a dish washing machine adopts a rotor-type spray structure having a spray nozzle that rotates. A rotation nozzle may spray wash water while rotating due to a water pressure. Since the rotation nozzle sprays the wash water only within a range of a rotation radius, there may be some regions to which the wash water is not sprayed. Accordingly, a linear spray structure has been proposed to prevent occurrence of the regions to which the wash water is not sprayed.

A linear spray structure may include a fixing nozzle fixed at one side of a wash tank and a vane configured to reflect wash water sprayed from a nozzle spray nozzle, toward the dishes while moving within the wash tank. The linear spray structure may spray the wash water to the entire region of the wash tank according to the movement of a reflection plate.

The fixing nozzle may have a plurality of spray holes arranged in a lateral direction of the wash tank and may be fixed to a side of a rear wall of the wash tank. The vane may extend in the lateral direction of the wash tank to reflect the wash tank sprayed from the plurality of spray holes, and may be disposed or placed to linearly reciprocate (move) in forward and backward directions of the wash tank.

The linear spray structure further may include a driving device capable of driving the vane. The driving device may be embodied in various manners. For example, the driving device may include a motor, a belt connected to the motor to transmit driving force to the vane, and a rail configured to guide movement of the vane, and may be disposed or placed such that when the motor is driven, the vane moves on the rail while rotating the belt.

In terms of a distribution device configured to distribute wash water stored in a sump into spray nozzles, the linear spray structure may need a distribution device having a different structure from a rotor-type spray structure.

When a spray nozzle disposed in a lower portion of a wash tank is a rotation nozzle, an outlet of a distribution device may be disposed or placed in an upward direction so that a length of a flow path connecting the outlet of the distribution device and the rotation nozzle may be reduced, and loss of pressure of wash water may be minimized.

However, when the spray nozzle disposed in the lower portion of the wash tank is a fixing nozzle, since the fixing nozzle is disposed adjacent to a rear wall of the wash tank, the outlet of the distribution device does not need to be disposed or placed upward; rather, when the outlet of the distribution device is disposed or placed upward, a flow path connecting the outlet of the distribution device and the fixing nozzle has to be curved backward as soon as the flow path starts from the outlet of the distribution device. Thus, loss of pressure of wash water may increase.

Meanwhile, since spray nozzles are fixed in the linear spray structure, wash water is distributed only to some of the spray nozzles, thereby enabling a division washing operation of spraying wash water only to a partial region of a wash tank.

SUMMARY

Therefore, it is an aspect of the disclosure to provide a dish washing machine having a linear spray structure, in which a distribution device configured to distribute wash water may minimize loss of pressure of the wash water and increase spatial availability.

Additional aspects of the disclosure will be set forth in part in the description which follows and, in part, will be apparent from the description, or may be learned by practice of the disclosure.

In accordance with an aspect of the disclosure, a dish washing machine may include a main body, a plurality of spray nozzles configured to spray wash water, a sump configured to store the wash water, a pump configured to pump the wash water stored in the sump, and a distribution device configured to distribute the wash water pumped by the pump into the plurality of spray nozzles. The distribution device may include a cylindrical housing having an inlet formed in one axial end portion and a plurality of outlets that are arranged in a circumferential surface of the cylindrical housing in an axial direction and connected to the plurality of spray nozzles, an opening/closing member rotatably disposed or placed within the cylindrical housing to open and close the plurality of outlets, and a motor configured to rotate the opening/closing member.

The plurality of outlets may be independently opened and closed according to rotation of the opening/closing member.

The opening/closing member may include a rotation body having a cylindrical shape, and a plurality of sealing members combined with the rotation body to close the plurality of outlets.

The sealing member may be combined with the rotation body to be capable of moving in a radial direction of the rotation body.

The sealing member may move between an open position in which the sealing member is closely adhered to the rotation body and a closed position in which the sealing member is closely adhered to the outlet.

The sealing member may move from the open position to the closed position due to pressure of the wash water.

The sealing member may include a sealing unit having a curved shape and a coupling protrusion that protrudes from the sealing unit to be combined with the rotation body.

The rotation body may include a clasp hole into which the coupling protrusion is inserted.

The coupling protrusion may include a stopper unit that protrudes to prevent the sealing member from being detached from the rotation body.

An outer circumferential surface of the rotation body may be spaced a predetermined distance from an inner circumferential surface of the housing.

The rotation body may include a spacing protrusion that protrudes in a radial direction to maintain the distance between the outer circumferential surface of the rotation body and the inner circumferential surface of the housing.

The rotation body may include a plurality of communication holes formed in a circumferential surface of the rotation body to correspond to the plurality of outlets.

The distribution device may further include a cam member combined with the opening/closing member and the motor to rotate along with the opening/closing member, and a micro switch contacted by the cam member to detect a rotation position of the opening/closing member.

The cam member may include convex units and concave units alternately formed in a circumferential direction such that the micro switch is turned on and off according to the rotation of the cam member.

The distribution device may further include a controller that designates rotation positions of the opening/closing member according to time points at which the micro switch is turned on and off, and rotates the motor or stops the rotation of the motor such that the opening/closing member rotates to a required rotation position from among the rotation positions.

The plurality of spray nozzles may include at least one fixing nozzle fixed at one side of the wash tank, and at least one rotation nozzle configured to rotate due to water pressure.

The at least one fixing nozzle may be disposed adjacent to a rear wall of the wash tank, the inlet may be disposed or placed to face toward one sidewall of the main body, and the plurality of outlets may be disposed or placed to face toward a rear wall of the main body.

In accordance with an aspect of the disclosure, a dish washing machine may include a main body, a wash tank disposed or placed within the main body, a basket disposed or placed in the wash tank to store the dishes, a plurality of fixing nozzles fixed at one side of the wash tank to spray wash water, a vane configured to move within the wash tank and reflect the wash water from the plurality of fixing nozzles toward the dishes, and a distribution device configured to selectively distribute the wash water into all or some of the plurality of fixing nozzles such that the wash water is selectively sprayed to the entire region or a partial region of the wash tank.

The plurality of fixing nozzles may include a left fixing nozzle disposed or placed on the left side of the wash tank, and a right fixing nozzle disposed or placed on the right side of the wash tank. The wash tank may be divided into left and right regions and the left and right regions of the wash tank may be washed independently.

The plurality of fixing nozzles may be disposed adjacent to a rear wall of the main body.

The distribution device may include a cylindrical housing having an inlet formed in one axial end portion thereof and a plurality of outlets arranged in a circumferential surface in an axial direction and connected to the plurality of fixing nozzles, an opening/closing member rotatably disposed or placed within the housing to open and close the plurality of outlets, and a motor configured to rotate the opening/closing member.

The inlet may be disposed or placed to face toward one sidewall of the main body, and the plurality of outlets may be disposed or placed to face toward a rear wall of the main body.

The opening/closing member may include a rotation body having a cylindrical shape and including a plurality of communication holes corresponding to the plurality of outlets, and a plurality of sealing members combined with the rotation body to close the plurality of outlets.

The distribution device may further include a cam member that is combined with the opening/closing member and rotates along with the opening/closing member, and a micro switch that is contacted by the cam member to detect a rotation position of the opening/closing member.

In accordance with an aspect of the disclosure, a distribution device may include a cylindrical housing including an inlet formed in one axial end portion and a plurality of outlets arranged in a circumferential surface in an axial direction, a cylindrical rotation body rotatably disposed or placed within the housing and having a plurality of communication holes corresponding to the plurality of outlets, a plurality of sealing members combined with the rotation body to close the plurality of outlets, a motor configured to rotate the rotation body, a cam member combined with the rotation body to rotate along with the rotation body, and a micro switch contacted by the cam member to detect a rotation position of the rotation body.

The sealing member may be combined with the rotation body to be capable of moving in a radial direction between an open position in which the sealing member is closely adhered to the rotation body and a closed position in which the sealing member is closely adhered to the outlet. The sealing member may move from the open position to the closed position due to water pressure.

In accordance with an aspect of the disclosure, a dish washing machine may include a main body, a plurality of spray nozzles configured to spray wash water, a sump configured to store the wash water, a pump configured to pump the wash water stored in the sump, and a distribution device configured to distribute the wash water pumped by the pump into the plurality of spray nozzles. The distribution device may include a housing formed in a cylindrical shape having a top surface, a bottom surface, and a circumferential surface, the housing having a plurality of outlets connected to the plurality of spray nozzles, wherein the plurality of outlets comprise at least one axial outlet formed in at least one of the top surface and the bottom surface of the housing, and at least one radial outlet formed in the circumferential surface of the housing, an opening/closing member disposed or placed within the housing to be capable of rotating about an axial direction of the housing, the opening/closing member having an axial opening/closing unit configured to open and close the at least one axial outlet, and a radial opening/closing unit configured to open and close the at least one radial outlet, and a motor configured to generate rotary power to rotate the opening/closing member.

The axial opening/closing unit may be integrated with the radial opening/closing unit.

The axial opening/closing unit and the radial opening/closing unit may be disposed perpendicular to each other.

The axial opening/closing unit may include an axial communication hole disposed or placed to correspond to the axial outlet and open the axial outlet.

The radial opening/closing unit may include a radial communication hole disposed or placed to correspond to the radial outlet and open the radial outlet.

The opening/closing member may have a cylindrical shape.

In accordance with an aspect of the disclosure, a dish washing machine may include a main body, a plurality of spray nozzles configured to spray wash water, a sump configured to store the wash water, a pump configured to pump the wash water stored in the sump, and a distribution system configured to distribute the wash water pumped by the pump into the plurality of spray nozzles. The distribution system may include a distribution flow path configured to connect the pump with the plurality of spray nozzles and having a plurality of branch points, and a plurality of distribution devices disposed or placed at the plurality of branch points to distribute the wash water.

At least one of the plurality of distribution devices may include a cylindrical housing having an inlet and a plurality of outlets, an opening/closing member disposed or placed within the housing to be capable of rotating about an axial direction of the housing, the opening/closing member configured to open and close at least some of the plurality of outlets, and a motor configured to generate rotary power to rotate the opening/closing member.

The plurality of outlets may be formed in a circumferential surface of the cylindrical housing.

The plurality of outlets may be arranged in an axial direction of the housing.

The plurality of outlets may be formed in at least one of a top surface and a bottom surface of the cylindrical housing.

The plurality of outlets may be arranged in a radial direction of the housing.

The plurality of outlets may include at least one radial outlet formed in a circumferential surface of the cylindrical housing, and at least one axial outlet formed in at least one of a top surface and a bottom surface of the cylindrical housing.

The opening/closing member may include an axial opening/closing unit configured to open and close the at least one axial outlet, and a radial opening/closing unit configured to open and close the at least one radial outlet and disposed perpendicular to the axial opening/closing unit.

In accordance with an aspect of the disclosure, a distribution device for a dish washing machine may include a housing including a plurality of outlets arranged on a surface of the housing and an inlet connectable with a pump of the dish washing machine, an opening/closing member rotatably disposed within the housing formed with a plurality of communication holes corresponding to the plurality of outlets to selectively open and close the plurality of outlets, and a motor to rotate the opening/closing member, wherein an axial direction of at least one outlet is substantially perpendicular to an axial direction of the inlet.

The housing may be cylindrical and the inlet may be formed in one axial end portion thereof and the plurality of outlets may be arranged in a circumferential surface of the cylindrical housing in an axial direction. The opening/closing member may include a rotation body having a cylindrical shape, and a plurality of sealing members combined with the rotation body to close the plurality of outlets.

The distribution device may further include a cam member combined with the rotation body to rotate together with the rotation body and a micro switch contacted by the cam member to detect a rotation position of the rotation body.

The distribution device may further include one or more distribution valves to correspond to one or more of the plurality of outlets, to open and close outflow paths of the one or more of the plurality of outlets.

The housing may be cylindrical and have a top surface, a bottom surface, and a circumferential surface, and the inlet may be formed in a circumferential surface of the housing, and at least one outlet may be formed in at least one of the top surface and the bottom surface of the housing. Also, at least one outlet may be formed in the circumferential surface of the housing. A plurality of outlets may be formed in at least one of the top surface and the bottom surface of the housing, and a number of communication holes may be greater than a number of outlets formed in the at least one of the top surface and the bottom surface of the housing.

A plurality of outlets may be formed in the circumferential surface of the housing, and a number of communication holes may be greater than a number of outlets formed in the circumferential surface of the housing.

The opening/closing member may include an axial opening/closing unit to open and close at least one outlet formed in at least one of the top surface and the bottom surface of the housing, and a radial opening/closing unit to open and close at least one outlet formed in the circumferential surface of the housing.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
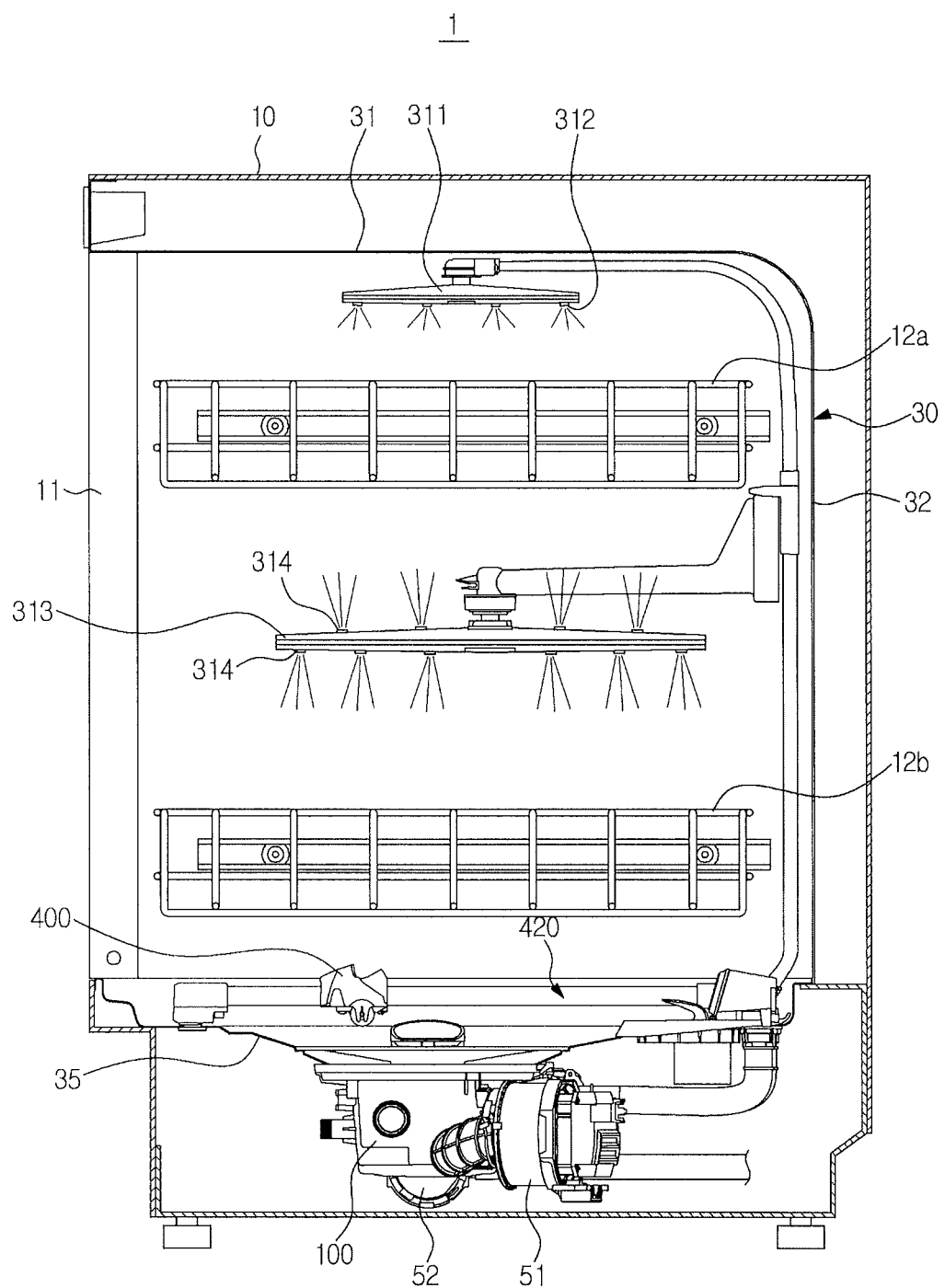
FIG. 1 is a schematic cross-sectional view of a dish washing machine in accordance with an embodiment of the disclosure.

Reference will now be made in detail to embodiments of the disclosure, examples of which are illustrated in the accompanying drawings, wherein like reference numerals refer to like elements throughout. Where the term "configured" is used to describe any aspect of the disclosure, terms such as suitable for, adapted to, capable of, arranged to, operable to, provided to, etc., may also be applicable to describe that aspect of the disclosure.

Figure 2:
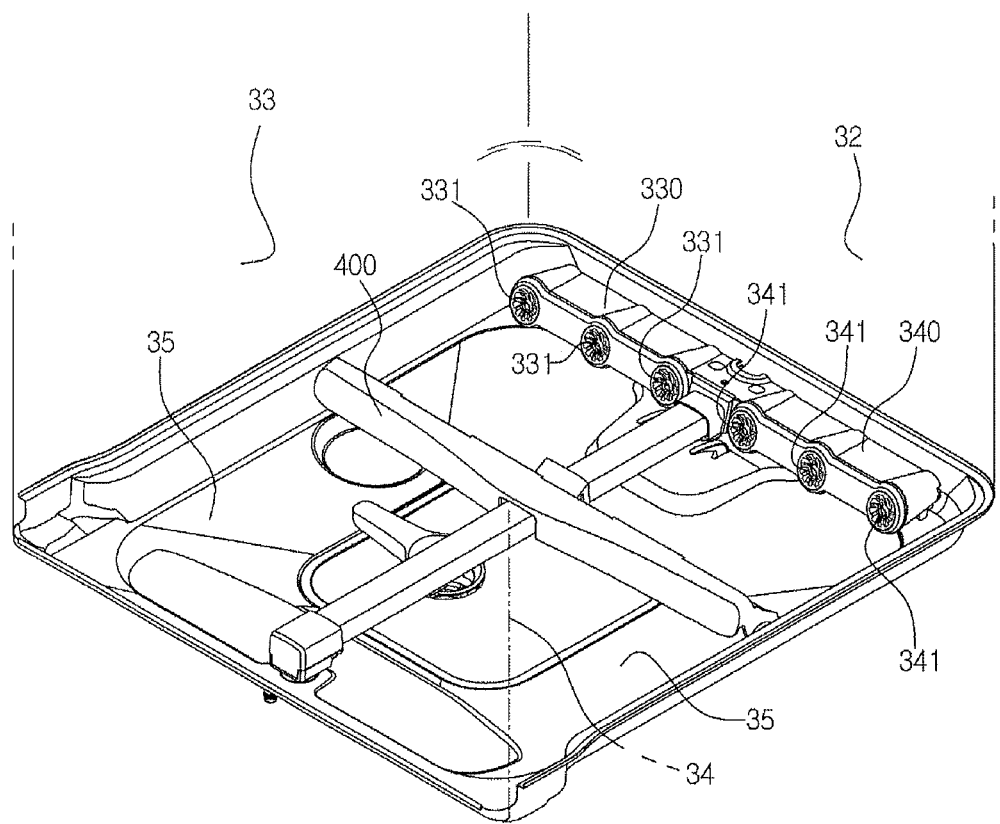
FIG. 2 is a view illustrating a lower portion of the dish washing machine of FIG. 1.

FIG. 1 is a schematic cross-sectional view of a dish washing machine in accordance with an embodiment of the disclosure. FIG. 2 is a view illustrating a lower portion of the dish washing machine of FIG. 1.

The entire structure of a dish washing machine in accordance with one embodiment of the disclosure will be generally described with reference to FIGS. 1 and 2.

A dish washing machine 1 may include a main body 10 forming an outer appearance, a wash tank 30 disposed or placed within the main body 10, baskets 12a and 12b disposed or placed within the wash tank 30 to contain the dishes, spray nozzles 311, 313, 330, and 340 configured to spray wash water, a sump 100 configured to store wash water, a circulation pump 51 configured to pump the wash water of the sump 100 and supply the wash water to the spray nozzles 311, 313, 330, and 340, a drain pump 52 configured to drain the wash water of the sump 100 along with debris (e.g., food, dirt, etc.) which may flow into the drain pump 52 out of the main body 10, a vane 400 configured to move within the wash tank 30 and reflect the wash water toward the dishes, and a driving device 420 configured to drive the vane 400.

The wash tank 30 may have a roughly box shape with a front opening so as to load or unload the dishes. The front opening of the wash tank 30 may be opened and closed by a door 11. The wash tank 30 may have an upper wall 31, a rear wall 32, a left wall 33, a right wall 34, and a bottom plate 35.

The baskets 12a and 12b may be wire racks including wires, which may prevent wash water from collecting and allow the wash water to pass therethrough. The baskets 12a and 12b may be disposed or placed to be capable of being attached to or detached from an inside of the wash tank 30. The baskets 12a and 12b may include an upper basket 12a disposed in an upper portion of the wash tank 30, and a lower basket 12b disposed in a lower portion of the wash tank 30.

The spray nozzles 311, 313, 330, and 340 may spray wash water under a high pressure and wash the dishes. The spray nozzles 311, 313, 330, and 340 may include an upper rotation nozzle 311 disposed or placed in an upper portion of the wash tank 30, a middle rotation nozzle 313 disposed or placed in the center of the wash tank 30, and fixing nozzles 330 and 340 disposed or placed in a lower portion of the wash tank 30.

The upper rotation nozzle 311 may be disposed or placed above the upper basket 12a and spray wash water downward while rotating due to a water pressure. To this end, spray holes 312 may be disposed or placed in a lower end of the upper rotation nozzle 311. The upper rotation nozzle 311 may directly spray the wash water toward the dishes contained in the upper basket 12a.

The middle rotation nozzle 313 may be disposed or placed between the upper basket 12a and the lower basket 12b and spray the wash water upward and downward while rotating due to a water pressure. To this end, spray holes 314 may be disposed or placed at upper and lower ends of the middle rotation nozzle 313. The middle rotation nozzle 313 may directly spray the wash water toward the dishes contained in the upper basket 12a and the lower basket 12b.

The fixing nozzles 330 and 340 may be disposed or placed not to move (i.e., be stationary), unlike the rotation nozzles 311 and 313, and fixed to one side of the wash tank 30. For example, the fixing nozzles 330 and 340 may be disposed roughly adjacent to the rear wall 32 of the wash tank 30, and spray wash water toward the front of the wash tank 30. Accordingly, the wash water sprayed by the fixing nozzles 330 and 340 may not be directly sprayed toward the dishes, and instead the wash water sprayed by the fixing nozzles 330 and 340 may be redirected by the vane 400 as explained below.

The wash water sprayed by the fixing nozzles 330 and 340 may be reflected by the vane 400 toward the dishes. The fixing nozzles 330 and 340 may be disposed under the lower basket 12b, and the vane 400 may reflect the wash water sprayed by the fixing nozzles 330 and 340 upward. That is, the wash water sprayed by the fixing nozzles 330 and 340 may be reflected by the vane 400 toward the dishes contained in the lower basket 12b.

The fixing nozzles 330 and 340 may respectively have a plurality of spray holes 331 and 341 arranged in a lateral direction of the wash tank 30. The plurality of spray holes 331 and 341 may spray wash water forward. As shown in FIG. 2, there are three spray holes 331 and three spray holes 341. However, the disclosure is not so limited and there may be less than or more than three spray holes for each fixing nozzle. The spray holes may be evenly or regularly distributed, and/or may of the same size, or the spray holes may be irregularly distributed, and/or may of a different size.

The vane 400 may be elongated in the lateral direction of the wash tank 30 to totally reflect the wash water sprayed from the plurality of spray holes 331 and 341 of the fixing nozzles 330 and 340. That is, one lengthwise end portion of the vane 400 may be adjacent to a left wall 33 of the wash tank 30, and the other lengthwise end portion of the vane 400 may be adjacent to a right wall 34 of the wash tank 30.

The vane 400 may linearly reciprocate along a direction in which wash water is sprayed from the fixing nozzles 330 and 340 (e.g., move in a back and forth direction). That is, the vane 400 may linearly reciprocate in forward and backward directions of the wash tank 30.

Accordingly, a linear spray structure including the fixing nozzles 330 and 340 and the vane 400 may wash an entire region of the wash tank 30 without blind spots. The fixing nozzles 330 and 340 are distinguished from rotation nozzles that may spray wash water only within a range of a rotation radius.

The fixing nozzles 330 and 340 may include a left fixing nozzle 330 disposed on the left side of the wash tank 30, and a right fixing nozzle 340 disposed on the right side of the wash tank 30. However, the disclosure is not so limited and there may be more than two fixing nozzles disposed in the dish washing machine. Further, there may be more than two fixing nozzles which are disposed adjacent to one another.

As described below, the rotation nozzles 311 and 313 and the fixing nozzles 330 and 340 may spray wash water independent of each other. Furthermore, the left fixing nozzle 330 and the right fixing nozzle 340 also may spray wash water independent of each other.

The wash water sprayed from the left fixing nozzle 330 may be reflected by the vane 400 only to a left region of the wash tank 30, while the wash water sprayed from the right fixing nozzle 340 may be reflected by the vane 400 only to a right region of the wash tank 30.

Accordingly, the dish washing machine 1 may divide the wash tank 30 into the left and right regions and wash the left and right regions of the wash tank 30 independently. Naturally, as would be understood by one of ordinary skill in the art, the wash tank 30 may not necessarily be divided into the left and right regions but may be further subdivided and washed if needed. For example, there may be more than two fixing nozzles which are disposed adjacent to one another and the number of regions which are washed may correspond to the number of fixing nozzles (e.g., for the case of three fixing nozzles, there may be a left region, central region, and a right region). Alternatively, it may be possible that some of the wash water sprayed from a fixing nozzle of the dish washing machine 1 may be reflected by the vane into a region which is primarily washed by wash water sprayed from another nozzle and reflected by the vane.

Components of the dish washing machine 1 in accordance with an embodiment of the disclosure will be further described in detail.

Figure 3:
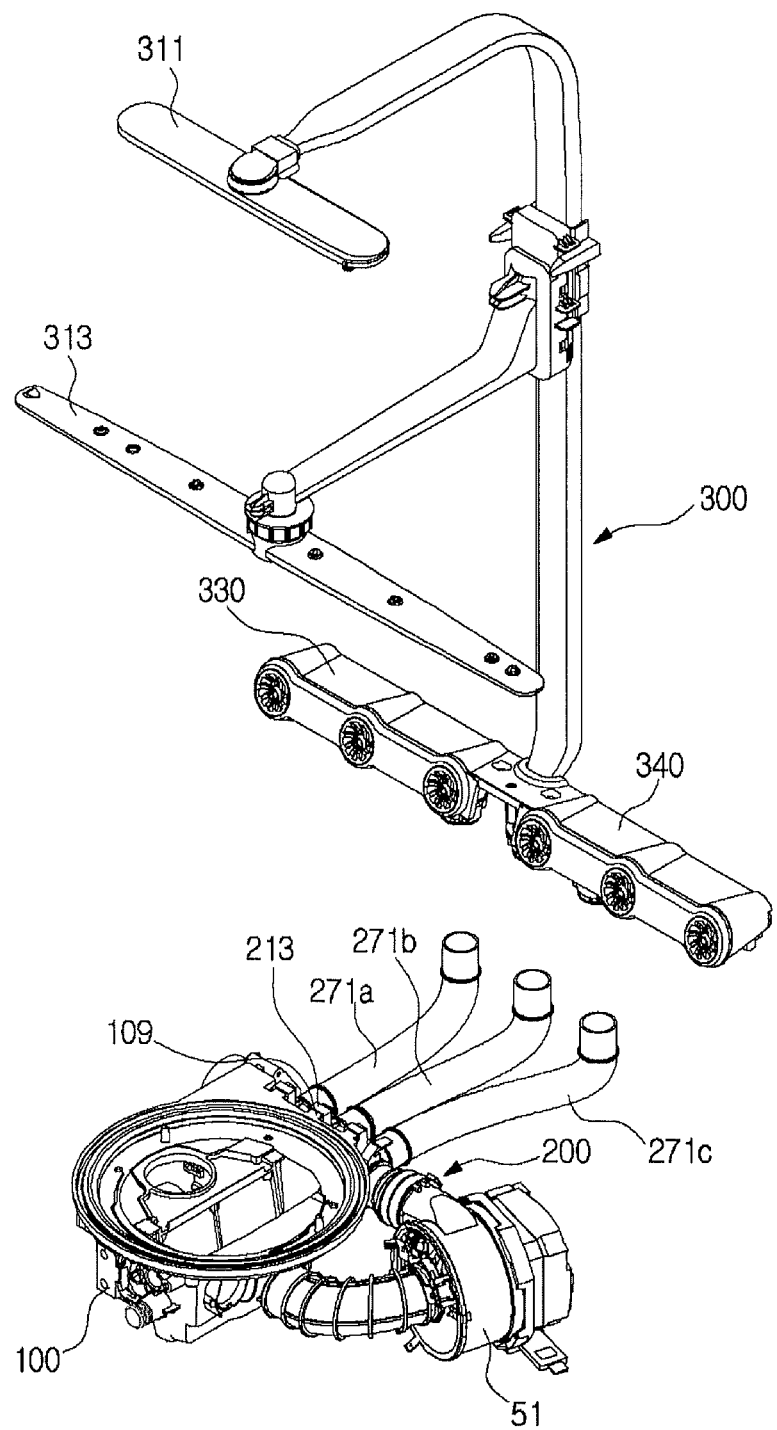
FIG. 3 is a view of a flow path structure of the dish washing machine of FIG. 1.
Figure 4:
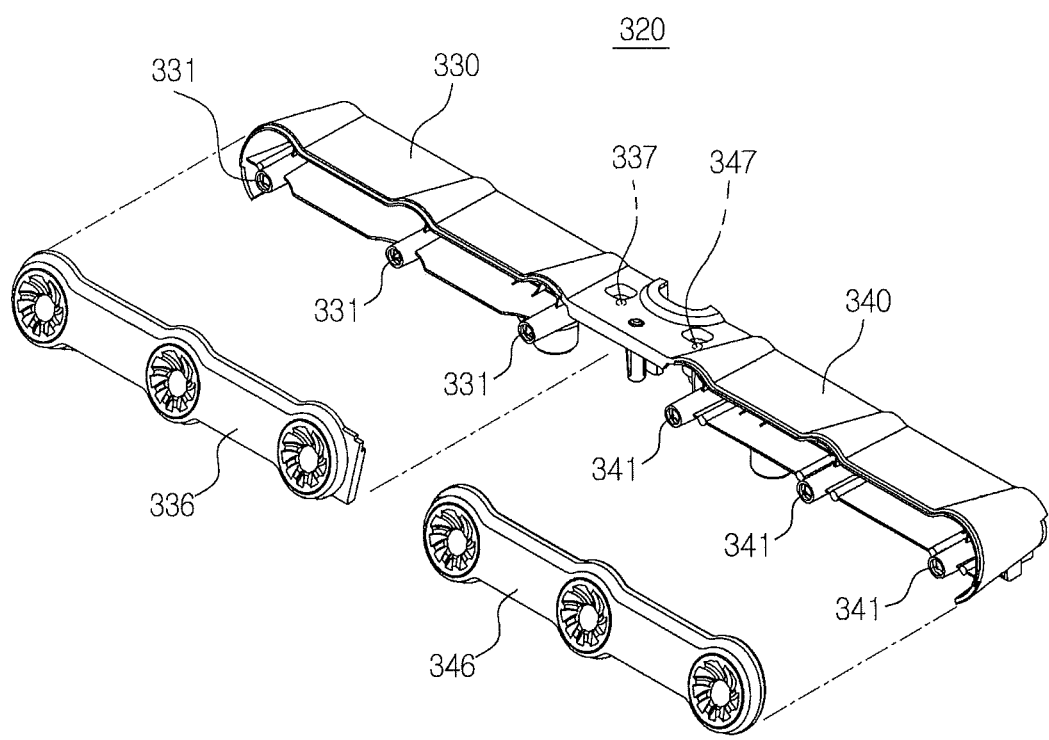
FIG. 4 is an exploded view of a fixing nozzle assembly of the dish washing machine of FIG. 1.
Figure 5:
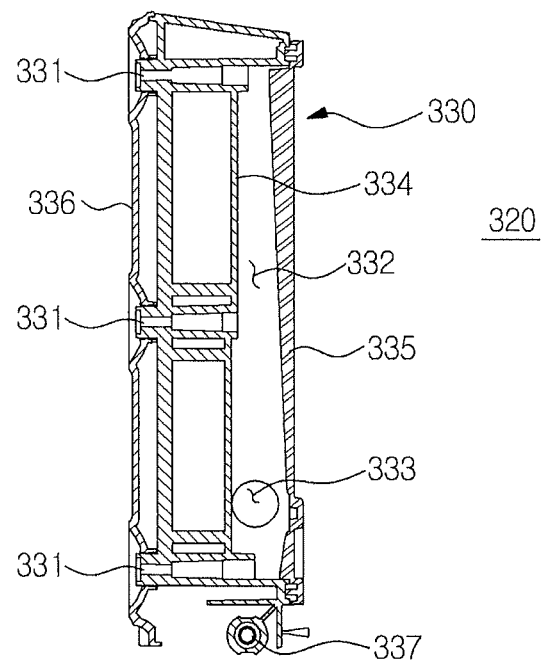
FIG. 5 is a cross-sectional view of the fixing nozzle assembly of the dish washing machine of FIG. 1.
Figure 5:
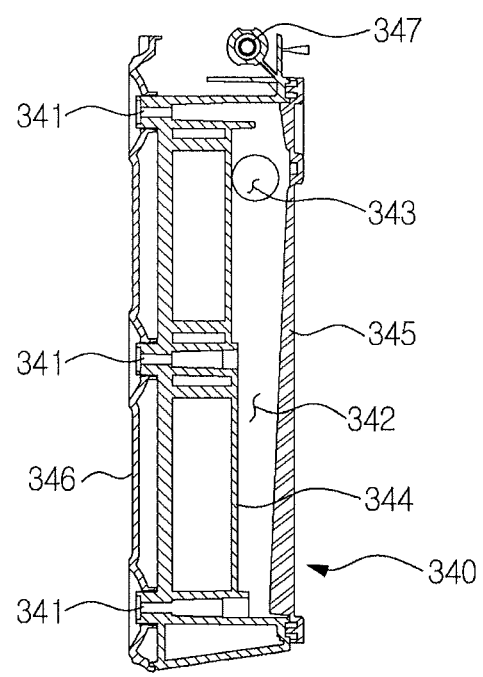

FIG. 3 is a view of a flow path structure of the dish washing machine of FIG. 1. FIG. 4 is an exploded view of a fixing nozzle assembly of the dish washing machine of FIG. 1. FIG. 5 is a cross-sectional view of the fixing nozzle assembly of the dish washing machine of FIG. 1.

Operations, a flow path structure, a fixing nozzle assembly, and a wash water distribution structure of a dish washing machine in accordance with an embodiment of the disclosure will be described with reference to FIGS. 3 through 5.

The dish washing machine may perform one or more of a water supplying operation, a washing operation, a draining operation, and a drying operation.

In the water supplying operation, wash water may be supplied through a water supply pipe (not shown) into the wash tank 30. The wash water supplied to the wash tank 30 may flow into the sump 100 disposed or placed under the wash tank 30 due to a gradient of the bottom plate 35 of the wash tank 30, and be stored in the sump 100.

In the washing operation, the circulation pump 51 may be operated to pump the wash water of the sump 100. The wash water pumped by the circulation pump 51 may be distributed to the rotation nozzles 311 and 313, the left fixing nozzle 330, and the right fixing nozzle 340 by means of a distribution device 200. Due to the pumping force of the circulation pump 51, the wash water may be sprayed from the spray nozzles 311, 313, 330, and 340 under a high pressure to wash the dishes.

Herein, the upper rotation nozzle 311 and the middle rotation nozzle 313 may receive wash water from the distribution device 200 through a second hose 271b. The left fixing nozzle 330 may receive wash water from the distribution device 200 through a first hose 271a. The right fixing nozzle 340 may receive wash water from the distribution device 200 through a third hose 271c.

According to an aspect of the disclosure, the distribution device 200 may be disposed or placed to have four distribution modes.

In a first mode, the distribution device 200 supplies wash water through the second hose 271b only into the rotation nozzles 311 and 313.

In a second mode, the distribution device 200 supplies wash water through the third hose 271c only into the right fixing nozzle 340.

In a third mode, the distribution device 200 supplies wash water through the first hose 271a and the third hose 271c only into the left fixing nozzle 330 and the right fixing nozzle 340.

In a fourth mode, the distribution device 200 supplies wash water through the first hose 271a only into the left fixing nozzle 330.

However, the distribution device 200 may have a larger number of distribution modes than four distribution modes, or may have less than four distribution modes.

The wash water sprayed from the spray nozzles 311, 313, 330, and 340 may remove, food, dirt, or other types of debris clinging to the dishes while beating (spraying) the dishes, fall along with the food, dirt, or other types of debris, and be stored in the sump 100 again. The circulation pump 51 may pump again and circulate the wash water stored in the sump 100. During the washing operation, the circulation pump 51 may be repetitively driven and stopped several times. In this process, the dirt, food, or other types of debris that has fallen to the sump 100 along with the wash water may be captured by a filter mounted in the sump 100 and remain in the sump 100 so that it does not circulate into the spray nozzles 311, 313, 330, and 340.

In the draining operation, the drain pump 52 may be operated to drain the debris (e.g., food, dirt, etc.) and the wash water remaining in the sump 100 and the wash water out of the main body 10.

In the drying operation, a heater (not shown) mounted in the wash tank 30 may be operated to dry the dishes.

Structures of the left fixing nozzle 330 and the right fixing nozzle 340 will be described in detail.

The left fixing nozzle 330 may include one or more spray holes 331 configured to spray wash water, a nozzle flow path 332 configured to supply the wash water to the spray holes 331, a nozzle inflow port 333 into which wash water flows through a nozzle flow path 332, a nozzle body 334 forming an outer appearance, a nozzle cover 335 combined with the rear of the nozzle body 334 to form the nozzle flow path 332, an ornamental member 336 combined with the front of the nozzle body 334, and a coupling hole 337 formed in the nozzle body 334 to combine the left fixing nozzle 330 with a bottom plate cover (refer to 600 in FIG. 19) to be described later.

The right fixing nozzle 340 may include one or more spray holes 341 configured to spray wash water, a nozzle flow path 342 configured to supply wash water to the spray holes 3410, a nozzle inflow port 343 into which wash water flows through the nozzle flow path 342, a nozzle body 344 forming an outer appearance, a nozzle cover 345 combined with the rear of the nozzle body 344 to form the nozzle flow path 342, an ornamental member 346 combined with the front of the nozzle body 344, and a coupling hole 347 formed in the nozzle body 344 to combine the right fixing nozzle 340 with the bottom plate cover 600 to be described later. As can be seen from FIG. 5, the coupling hole 337 of the left fixing nozzle 330 may be disposed adjacent to the coupling hole 347 of the right fixing nozzle 340.

Here, the nozzle body 334 of the left fixing nozzle 330 may be integrated with the nozzle body 344 of the right fixing nozzle 340. Thus, the left fixing nozzle 330 and the right fixing nozzle 340 may be an integral body.

By integrating the left fixing nozzle 330 with the right fixing nozzle 340, the left fixing nozzle 330 and the right fixing nozzle 340 may be easily aligned in a horizontal direction, and easily combined with the bottom plate cover 600.

A fixing nozzle assembly 320 may include the left fixing nozzle 330 and the right fixing nozzle 340. A nozzle assembly 300 may include the fixing nozzle assembly 320, the upper rotation nozzle 311, and the middle rotation nozzle 313.

Figure 6:
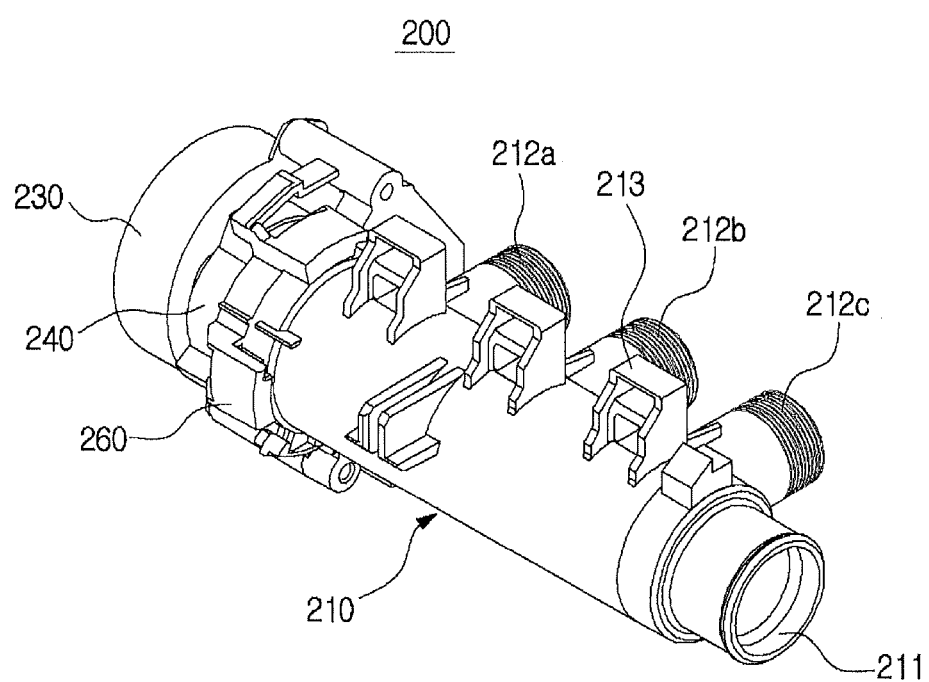
FIG. 6 is a view of a distribution device of the dish washing machine of FIG. 1.
Figure 7:
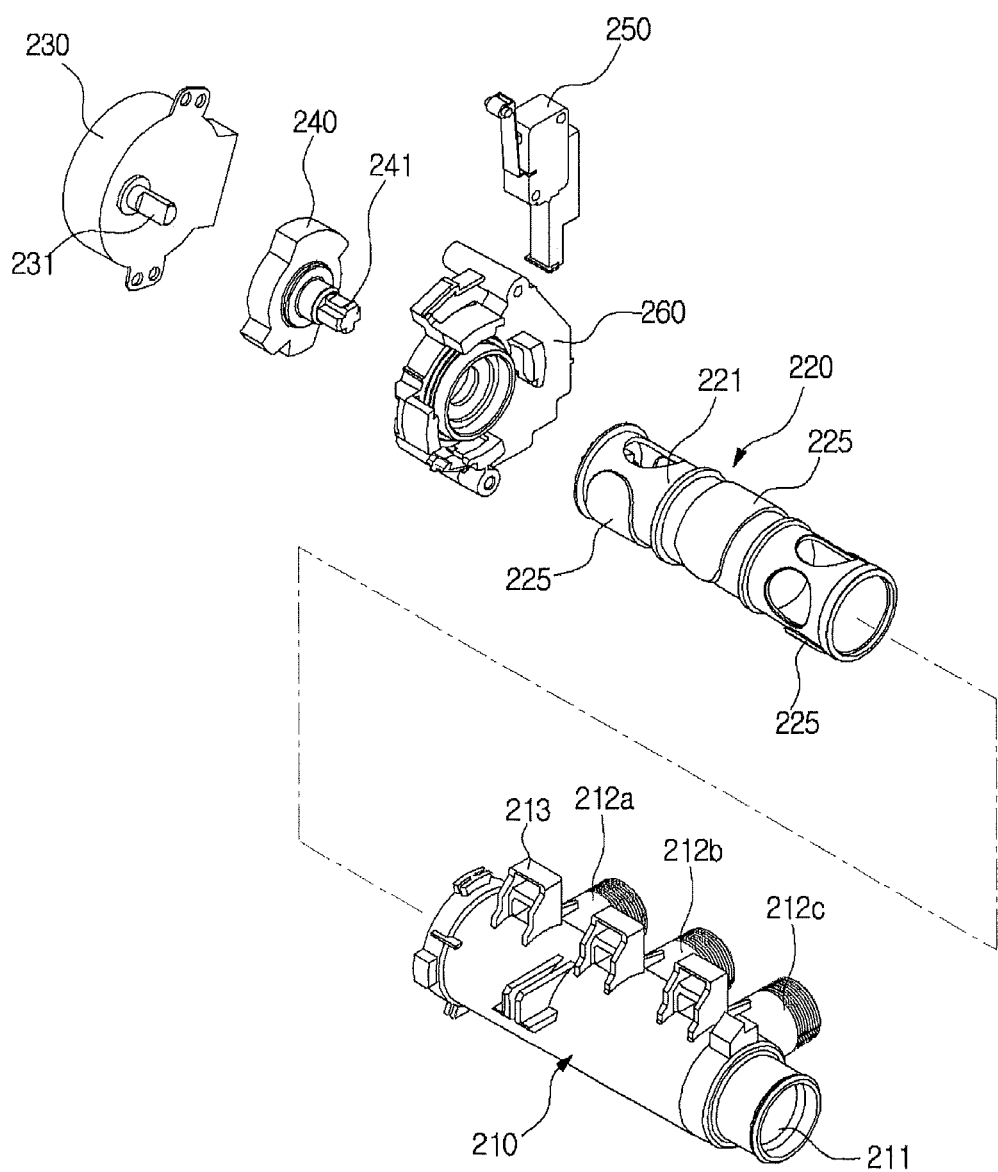
FIG. 7 is an exploded view of a distribution device of the dish washing machine of FIG. 1.
Figure 8:
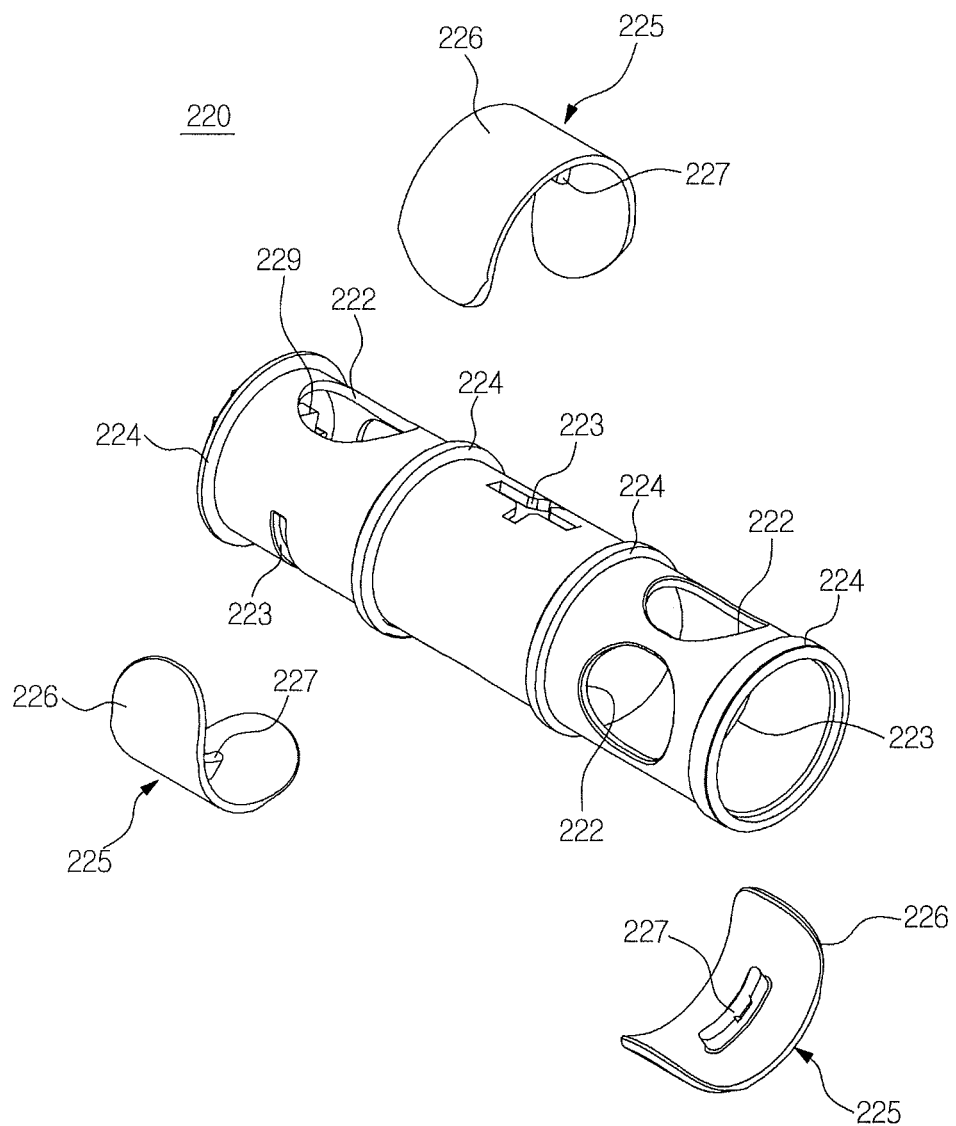
FIG. 8 is an exploded view of an opening/closing member of the distribution device of the dish washing machine of FIG. 1.
Figure 9:
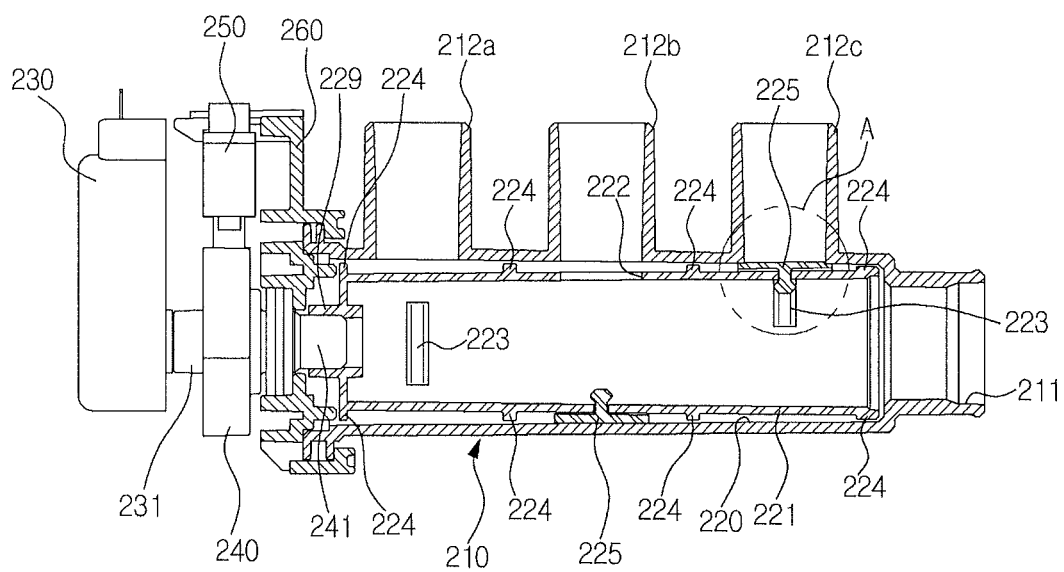
FIG. 9 is a cross-sectional view of the distribution device of the dish washing machine of FIG. 1.
Figure 10:
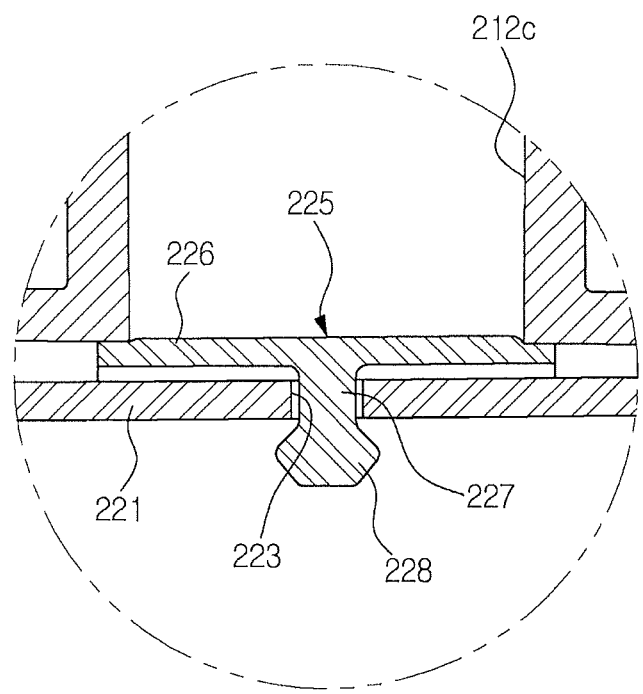
FIG. 10 is an enlarged view of portion A of FIG. 9.

FIG. 6 is a view of a distribution device of the dish washing machine of FIG. 1. FIG. 7 is an exploded view of a distribution device of the dish washing machine of FIG. 1. FIG. 8 is an exploded view of an opening/closing member of the distribution device of the dish washing machine of FIG. 1. FIG. 9 is a cross-sectional view of the distribution device of the dish washing machine of FIG. 1. FIG. 10 is an exploded view of portion A of FIG. 9.

A distribution device 200 of a dish washing machine in accordance with an embodiment of the disclosure will be described with reference to FIGS. 6 through 10.

The distribution device 200 may be formed, manufactured, or configured to have a roughly cylindrical shape.

The distribution device 200 may include a housing 210 that has a roughly hollow cylindrical shape and forms an outer appearance, an opening/closing member 220 disposed or placed within the housing 210 to be capable of rotating, a motor 230 configured to rotate the opening/closing member 220, a support member 260 configured to support the motor 230 and the housing 210, a cam member 240 combined with the motor 230 and the opening/closing member 220 to rotate along with the opening/closing member 220, and a micro switch 250 contacted by the cam member 240 to detect a rotation position of the opening/closing member 220.

The housing 210 may be disposed to be elongated toward both sidewalls (refer to 33 and 34 in FIG. 2) of the wash tank 30. Hereinafter, a lengthwise direction of the housing 210 will be referred to as an axial direction. An inlet 211 through which wash water flows into the housing 210 is formed at one axial end portion of the housing 210. The motor 230 may be disposed at the other axial end portion of the housing 210.

Specifically, the inlet 211 may be disposed or placed such that it faces toward a right wall 34 of the wash tank 30. The circulation pump 51 may be connected to the inlet 211. Thus, when the circulation pump 51 is operated, the wash water stored in the sump 100 may flow through the inlet 211 into the housing 210.

A plurality of outlets 212a, 212b, and 212c may be formed in a circumferential surface of the housing 210. The plurality of outlets 212a, 212b, and 212c may be arranged at regular intervals in an axial direction. The plurality of outlets 212a, 212b, and 212c may include a first outlet 212a, a second outlet 212b, and a third outlet 212c. Alternatively, the plurality of outlets may be irregularly arranged. Additionally, or alternatively, the plurality of outlets may have the same or different diameters through which wash water flows.

Here, the plurality of outlets 212a, 212b, and 212c are may be disposed or placed such that they face toward the rear wall (refer to 32 in FIG. 2) of the wash tank 30. The reason that the plurality of outlets 212a, 212b, and 212c may be disposed or placed to face toward the rear wall 32 of the wash tank 30 is that the housing 210 of the distribution device 200 in accordance with an embodiment of the disclosure has a cylindrical shape and may be disposed to be elongated toward the both sidewalls 33 and 34 of the water tank 30, and the opening/closing member 220 is configured to open and close the outlets 212a, 212b, and 212c while rotating about an axial direction of the housing 210.

In addition, since a distribution device typically used for a conventional dish washing machine may include a hemispherical housing and an opening/closing device having a flat panel disk shape, which is disposed or placed in an upper portion of the housing and capable of rotating, outlets may not help but being disposed or placed in the upper portion of the housing. That is, in a conventional distribution device, the outlet are placed in the upper portion of the housing to face toward a top of the dish washing machine. Thus, the flow path connected to the outlets is sharply curved backward as soon as the flow path starts from the outlets.

As described above, since the outlets 212a, 212b, and 212c of the distribution device 200 in accordance with an embodiment of the disclosure are disposed or placed to face toward the rear wall 32 of the wash tank 30, loss of pressure of wash water supplied from the distribution device 200 into the fixing nozzles 330 and 340 disposed adjacent to the rear wall 32 of the wash tank 30 may be reduced.

The loss of pressure of wash water may be reduced because a flow path connecting the outlets 212a, 212b, and 212c and the fixing nozzles 330 and 340 may be gently formed without a sharply curved portion.

In contrast, when a conventional distribution device in which outlets are disposed or placed toward an upper portion of the distribution device is applied to the fixing nozzles 330 and 340 in accordance with an embodiment of the disclosure, a flow path connected to the outlets has to be sharply curved backward as soon as the flow path starts from the outlets, thereby causing a large loss of pressure.

The first outlet 212a, the second outlet 212b, and the third outlet 212c may be sequentially arranged from the left side of the wash tank 30 to the right side thereof.

Specifically, the first outlet 212a may be disposed relatively close to the left fixing nozzle 330, the third outlet 212c may be disposed relatively close to the right fixing nozzle 340, and the second outlet 212b may be disposed between (e.g., midway) between the first and third outlets 212a and 212c.

The first outlet 212a may be connected to the left fixing nozzle 330 through the first hose (refer to 271a in FIG. 3). The second outlet 212b may be connected to the rotation nozzles 311 and 313 through the second hose (refer to 271b in FIG. 3). The third outlet 212c may be connected to the right fixing nozzle 340 through the third hose (refer to 271c in FIG. 3).

As described above, since each of the outlets 212a, 212b, and 212c is connected to one or more of the spray nozzles 311, 313, 330 and 340, which are relatively close to the corresponding outlet, lengths of the hoses 271a, 271b, and 271c may be reduced, the hoses 271a, 271b, and 271c may be prevented from being entangled, and/or loss of pressure of wash water may be reduced.

A sump coupling unit 213 to be combined with the sump 100 may be disposed or placed in the housing 210, and a distribution device coupling unit (refer to 109 in FIG. 3) to be combined with the sump coupling unit 213 may be disposed or placed on the sump 100. In accordance with an aspect of the disclosure, the sump coupling unit 213 may be disposed or placed in a groove shape, and the distribution device coupling unit 109 may be disposed or placed in a protrusion shape. By coupling the sump coupling unit 213 to the distribution device coupling unit 109, positions of the distribution device 200 and the sump 100 may be aligned.

The opening/closing member 220 selectively opens and closes the outlets 212a, 212b, and 212c while rotating about the axial direction of the housing 210 within the housing 210. Accordingly, the opening/closing member 220 substantially functions to distribute wash water to the spray nozzles 311, 313, 330, and 340.

The opening/closing member 220 may have a roughly or substantially hollow cylindrical shape. The opening/closing member 220 may include a rotation body 221 that rotates within the housing 210, and sealing members 225 combined with the rotation body 221 to close the outlets 212a, 212b, and 212c.

Communication holes 222 may be formed in a circumferential surface of the rotation body 221. The communication holes may be circular in shape, for example. However, the disclosure is not so limited and the communication holes may be differently shaped (e.g., oval, square, triangular, etc.). When the communication holes 222 are located in positions corresponding to the outlets 212a, 212b, and 212c, the communication holes 222 may allow wash water to flow out to the outlets 212a, 212b, and 212c.

Also, spacing protrusions 224 may be formed on the circumferential surface of the rotation body 221. The spacing protrusions 224 may space an inner circumferential surface of the housing 210 a predetermined distance apart from an outer circumferential surface of the rotation body 221. Thus, when the opening/closing member 220 rotates within the housing 210, the spacing protrusions 224 may minimize friction between the opening/closing member 220 and the housing 210 and enable efficient rotation of the opening/closing member 220. The inner circumferential surface of the housing 210 may always remain a predetermined distance apart from the outer circumferential surface of the rotation body 221 by the spacing protrusions 224.

Furthermore, clasp holes 223 to be combined with the sealing members 225 may be formed in the circumferential surface of the rotation body 221. Clasp protrusion units 227 of the sealing members 225 are combined with the clasp holes 223. The clasp holes 223 may have respectively different shapes to correspond to the shape of the clasp protrusion units 227 of the sealing members 225.

As an example, a clasp hole 223 in the center may have a roughly cross shape, and each of clasp holes 223 on both sides may have a straight shape. Similarly, a clasp protrusion unit 227 of a sealing member 225 in the center may have a cross shape, and each of clasp protrusion units 227 on both sides may have a straight shape.

By preparing the clasp holes 223 and the clasp protrusion units 227 in different shapes, when the sealing member 225 combined in the center has a different shape from the sealing members 225 combined on both sides, the sealing member 225 in the center may be easily discriminated from the sealing members 225 combined on both sides. Alternatively, the sealing member 225 in the center may have clasp holes and clasp protrusion units with a straight shape and the other sealing members may have clasp holes and clasp protrusion units with cross shapes. Alternatively, different shapes may be used.

One of both axial end portions of the rotation body 221, which corresponds to the inlet 211 of the housing 210, is opened. A cam shaft coupling unit 229 to be combined with a cam shaft 241 of the cam member 240 may be disposed or placed at the other one of the both axial end portions of the rotation body 221.

The sealing members 225 may be combined with the circumferential surface of the rotation body 221 to close the outlets 212a, 212b, and 212c. The sealing members 225 may be combined with the clasp holes 223 of the rotation body 221. The sealing members 225 maybe combined with the clasp holes 223 of the rotation body 221 to be capable of moving to some extent in a radial direction. Thus, the sealing members 225 may be closely adhered to the outlets 212a, 212b, and 212c to tighten the sealing of the outlets 212a, 212b, and 212c.

That is, the sealing members 225 move between an open position in which the sealing members 225 are closely adhered to the rotation body 221 and a closed position in which the sealing members 225 are closely adhered to the outlets 212a, 212b, and 212c. When wash water flows into the housing 210, the sealing members 225 may naturally move from the open position to the closed position due to a pressure of wash water. Accordingly, airtightness of the outlets 212a, 212b, and 212c may be improved to raise reliability of the distribution device 200.

Each of the sealing members 225 may include a sealing unit (refer to 226 in FIG. 8) having a curved surface shape to be closely adhered to the outlets 212a, 212b, and 212c, and a clasp protrusion unit 227 that protrudes from the sealing unit 226 and is inserted into the clasp hole 223 of the rotation body 221.

The clasp protrusion unit 227 and the clasp hole 223 may be disposed or placed to have a small gap such that the sealing member 225 is capable of moving in a radial direction. Also, a stopper unit 228 having a greater diameter than the clasp hole 223 may be formed at an end portion of the clasp protrusion unit 227 to prevent the sealing member 225 from being completely detached from the clasp hole 223.

The sealing member 225 may be formed as an integral type using a resin material. The sealing member 225 may be easily assembled with the rotation body 221 by applying strong power to the clasp protrusion unit 227 and inserting the clasp protrusion unit 227 into the clasp hole 223. After the sealing member 225 is assembled, the stopper unit 228 is caught in the clasp hole 223 but not detached from the rotation body 221 unless an external force is applied (e.g., by the hands of a user (e.g., a repairman)).

Figure 11:
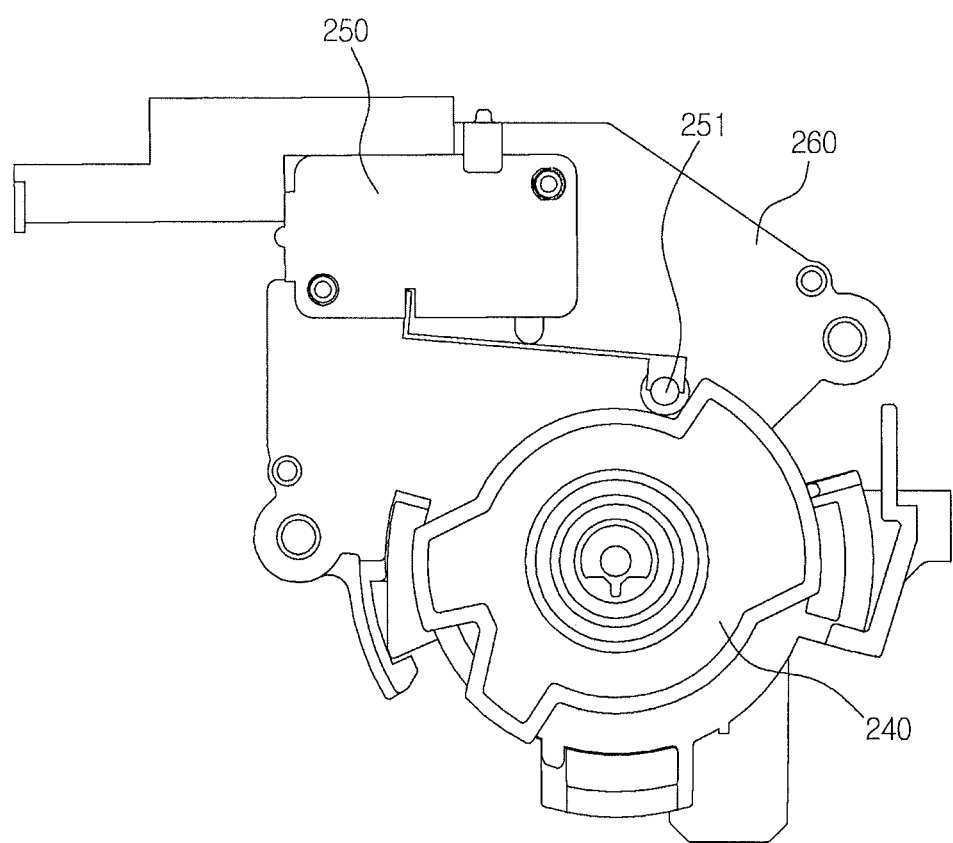
FIG. 11 is a side view of the distribution device of the dish washing machine of FIG. 1, wherein a motor is omitted.
Figure 12:
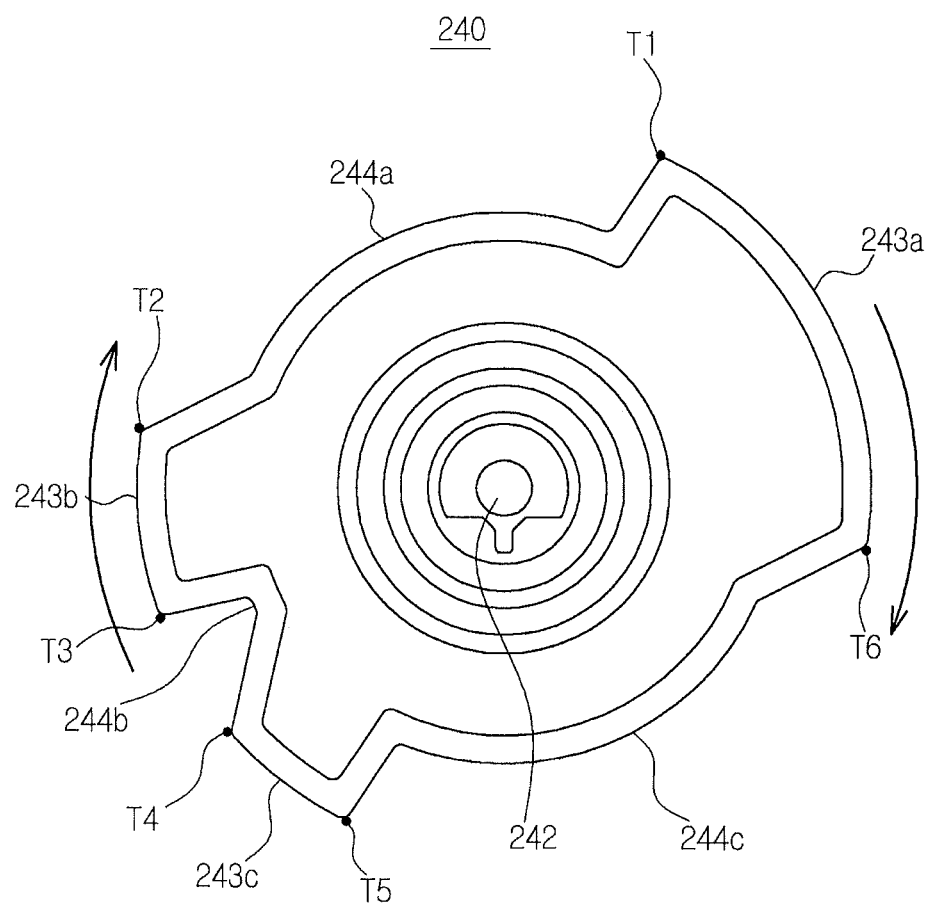
FIG. 12 is an enlarged view of a cam member of the distribution device of the dish washing machine of FIG. 1.
Figure 13:
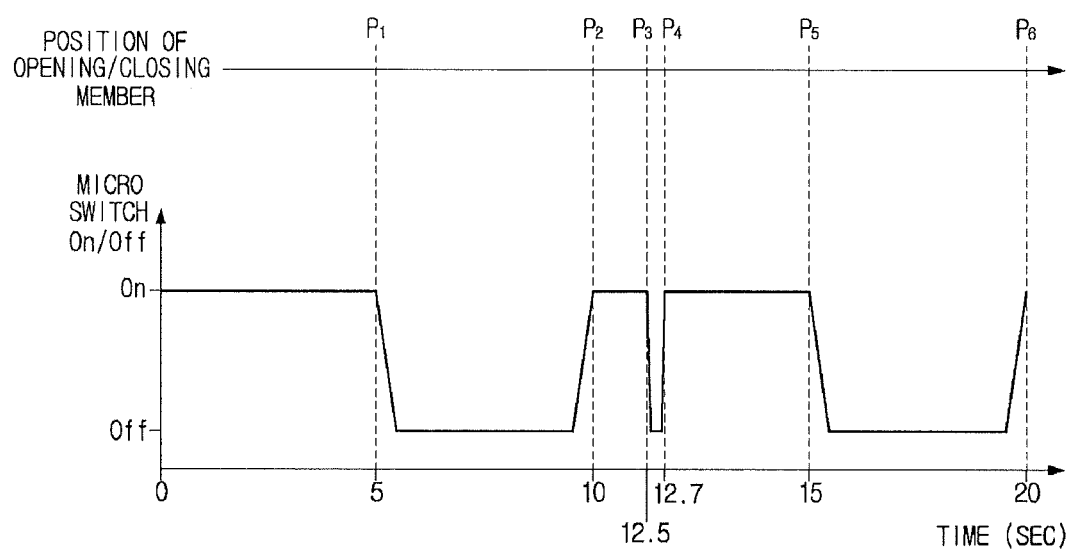
FIG. 13 is a view showing a relationship between on/off time points of a micro switch of the distribution device of the dish washing machine of FIG. 1 and a rotation position of an opening/closing member.
Figure 14:
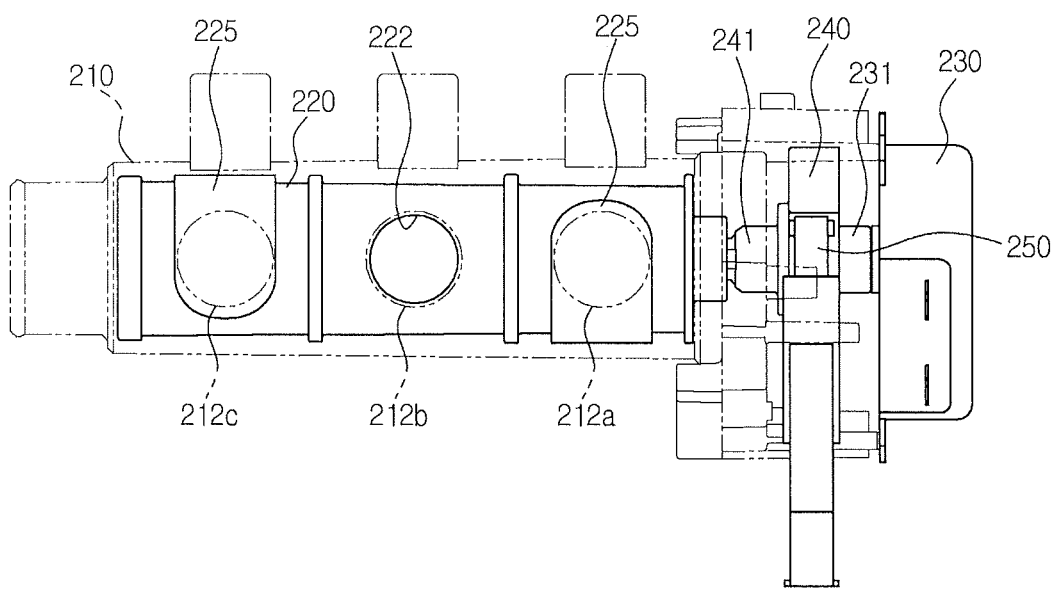
FIG. 14 is a view illustrating an operation of the distribution device of the dish washing machine of FIG. 1, in which wash water is distributed only into rotation nozzles by opening only a second outlet.
Figure 15:
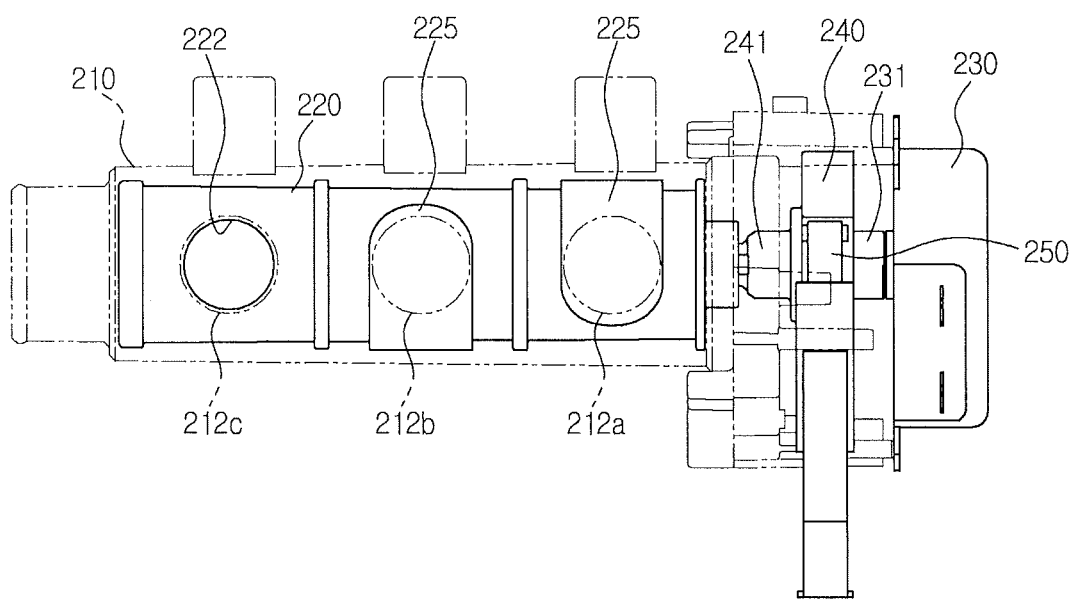
FIG. 15 is a view illustrating an operation of the distribution device of the dish washing machine of FIG. 1, in which wash water is distributed only into right fixing nozzles by opening only a third outlet.
Figure 16:
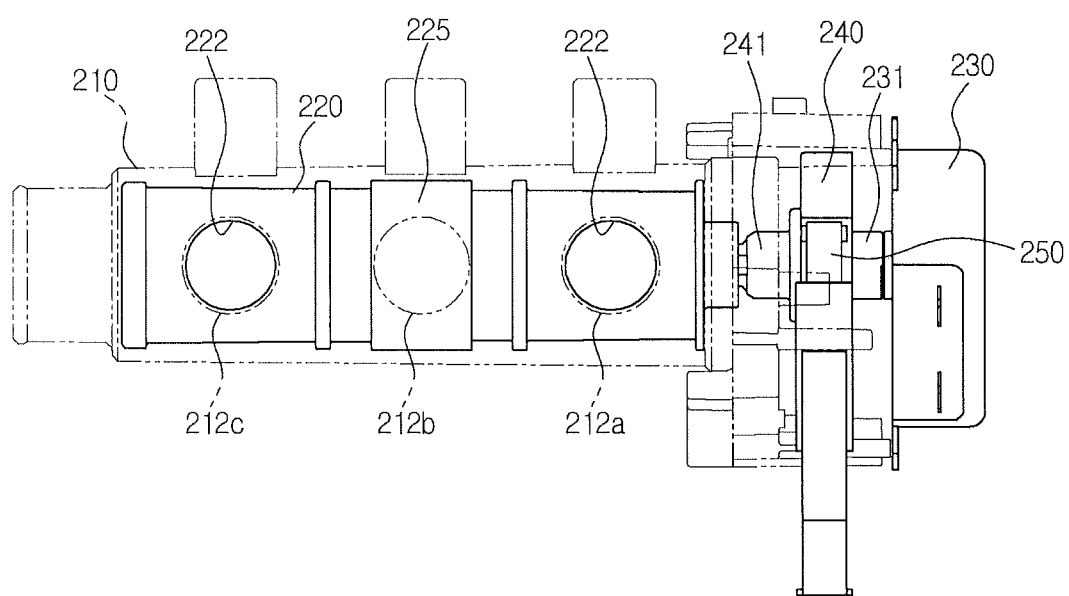
FIG. 16 is a view illustrating an operation of the distribution device of the dish washing machine of FIG. 1, in which wash water is distributed only into left fixing nozzles and the right fixing nozzles by opening only a first outlet and the third outlet.
Figure 17:
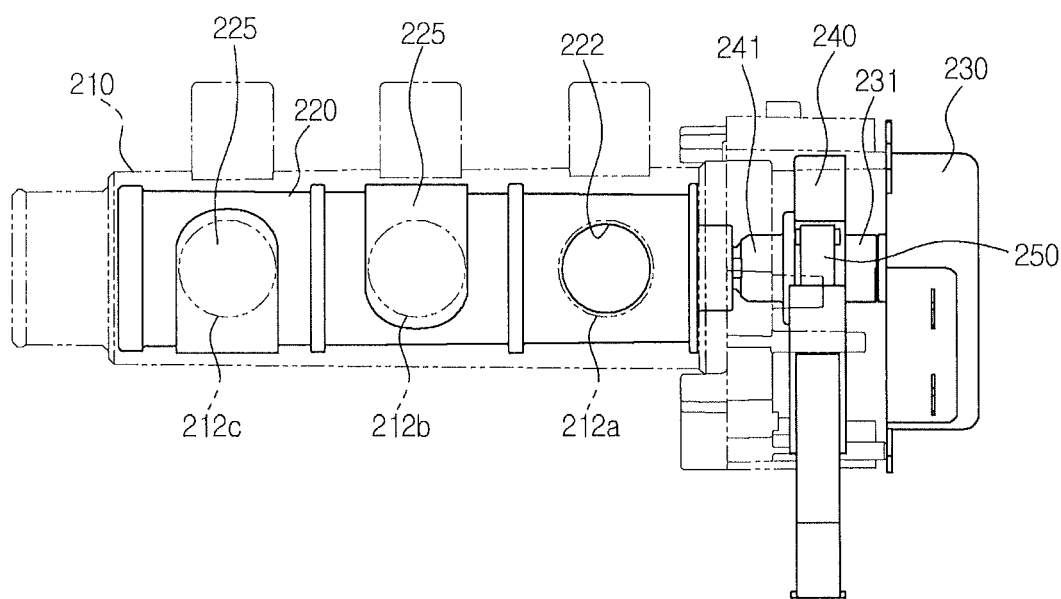
FIG. 17 is a view illustrating an operation of the distribution device of the dish washing machine of FIG. 1, in which wash water is distributed only into the left fixing nozzles by opening only the first outlet.

FIG. 11 is a side view of the distribution device of the dish washing machine of FIG. 1, wherein a motor is omitted. FIG. 12 is an enlarged view of a cam member of the distribution device of the dish washing machine of FIG. 1. FIG. 13 is a view showing a relationship between on/off time points of a micro switch of the distribution device of the dish washing machine of FIG. 1 and a rotation position of an opening/closing member. FIG. 14 is a view illustrating an operation of the distribution device of the dish washing machine of FIG. 1, in which wash water is distributed only into rotation nozzles by opening only a second outlet. FIG. 15 is a view illustrating an operation of the distribution device of the dish washing machine of FIG. 1, in which wash water is distributed only into right fixing nozzles by opening only a third outlet. FIG. 16 is a view illustrating an operation of the distribution device of the dish washing machine of FIG. 1, in which wash water is distributed only into left fixing nozzles and the right fixing nozzles by opening only a first outlet and the third outlet. FIG. 17 is a view illustrating an operation of the distribution device of the dish washing machine of FIG. 1, in which wash water is distributed only into the left fixing nozzles by opening only the first outlet.

Operations of a distribution device in accordance with an embodiment of the disclosure will be described with reference to FIGS. 11 through 17.

When the motor 230 is operated, a driving force is transmitted by a motor shaft 231 to the cam member 240, and the cam member 240 rotates. The motor 230 may be a unidirectional motor that rotates in only one direction.

For brevity, it is assumed that the cam member 240 rotates about a rotation center 242 clockwise on the basis of FIG. 12. When the cam member 240 rotates, driving force is transmitted by the cam shaft 241 to the opening/closing member 220 so that the opening/closing member 220 may rotate together with the cam member 240. However, the disclosure is not so limited, and the cam member 240 may rotate in a different direction (e.g., counterclockwise).

A contact terminal 251 of the micro switch 250 may be disposed or placed in contact with the cam member 240. The cam member 240 may include convex units 243a, 243b, and 243c, which protrude in a radial direction, and concave units 244a, 244b, and 244c, which are depressed in the radial direction, to turn on and off the micro switch 250.

The convex units 243a, 243b, and 243c may include a first convex unit 243a, a second convex unit 243b, and a third convex unit 243c, which are sequentially arranged counterclockwise, and the concave units 244a, 244b, and 244c may include a first concave unit 244a, a second concave unit 244b, and a third concave unit 244c, which are sequentially arranged counterclockwise.

It is assumed that the micro switch 250 is turned on when the contact terminal 251 is contacted by the convex units 243a, 243b, and 243c of the cam member 240, and turned off when the contact terminal 251 is contacted by the concave units 244a, 244b, and 244c of the cam member 240. Accordingly, when the motor 230 is driven, the micro switch 250 may be alternately turned on and off.

Meanwhile, the distribution device 200 further may include a controller, which determines rotation positions of the opening/closing member 220 according to time points at which the micro switch 250 is turned on and off, and rotates the motor 230 or stops the rotation of the motor 230 such that the opening/closing member 220 rotates to a required specific rotation position from among the determined rotation positions. The controller may be configured by an electronic circuit and may include one or more processors.

As an example, as shown in FIG. 13, the controller may determine six rotation positions P1, P2, P3, P4, P5, and P6 of the opening/closing member 220.

The controller may designate a rotation position of the opening/closing member 220 in a time point when the micro switch 250 is turned off after the micro switch 250 is turned on for five minutes, as a first rotation position P1 of the six rotation positions P1, P2, P3, P4, P5, and P6 of the opening/closing member 220.

In accordance with an aspect of the disclosure, since there is only one time point when the micro switch 250 is turned off after the micro switch 250 is turned on for five seconds, a section for which the micro switch 250 is turned on for five seconds may correspond to a reference reset section.

Also, in a time point when the micro switch 250 is turned on again after the micro switch 250 is turned on for about five seconds and turned off for about five seconds, the controller may designate a rotation position of the opening/closing member 220 as a second rotation position P2.

First through sixth rotation positions P1 through P6 may be designated in the above-described manner.

In the six rotation positions P1, P2, P3, P4, P5, and P6 of the opening/closing member 220, the contact terminal 251 of the micro switch 250 is located in contact terminal positions T1, T2, T3, T4, T5, and T6 shown in FIG. 12.

Information regarding the rotation positions of the opening/closing member 220 according to the time points when the micro switch 250 is turned on and off may be previously stored in a memory (for example, in a read-only memory (ROM) type) in the controller.

Also, information regarding opening and closing states of the outlets 212a, 212b, and 212c of the distribution device 200 according to the respective rotation positions of the opening/closing member 220 and information regarding the spraying of the spray nozzles 311, 313, 330, and 340 according to the opening and closing states of the outlets 212a, 212b, and 212c may also be stored as a ROM type in the controller.

Accordingly, when a user inputs or selects a desired specific spray nozzle from among the spray nozzles 311, 313, 330, and 340, the controller may determine which ones of the outlets 212a, 212b, and 212c are to be opened or closed according to the user's input or selection, and determine a specific rotation position of the opening/closing member 220 based on the determined opening and closing states of the outlets 212a, 212b, and 212c.

The controller may drive the motor 230 to rotate the opening/closing member 220 to a determined specific rotation position, and stop the driving of the motor 230 when the rotation of the opening/closing member 220 to the determined specific rotation position is completed.

In accordance with an aspect of the disclosure, when the opening/closing member 220 is in the first rotation position P1, only the second outlet 212b is opened as shown in FIG. 14, and wash water may be distributed only to the rotation nozzles 311 and 313.

When the opening/closing member 220 is in the second rotation position P2, only the third outlet 212c is opened as shown in FIG. 15, and wash water may be distributed only to the right fixing nozzle 340.

The third and fourth rotation positions P3 and P4 of the opening/closing member 220 are not used.

When the opening/closing member 220 is in the fifth rotation position P5, only the first outlet 212a and the third outlet 212c are opened as shown in FIG. 16, and wash water may be distributed only to the left fixing nozzle 330 and the right fixing nozzle 340.

When the opening/closing member 220 is in the sixth rotation position P6, only the first outlet 212a is opened as shown in FIG. 17, and wash water may be distributed only to the left fixing nozzle 330.

Figure 18:
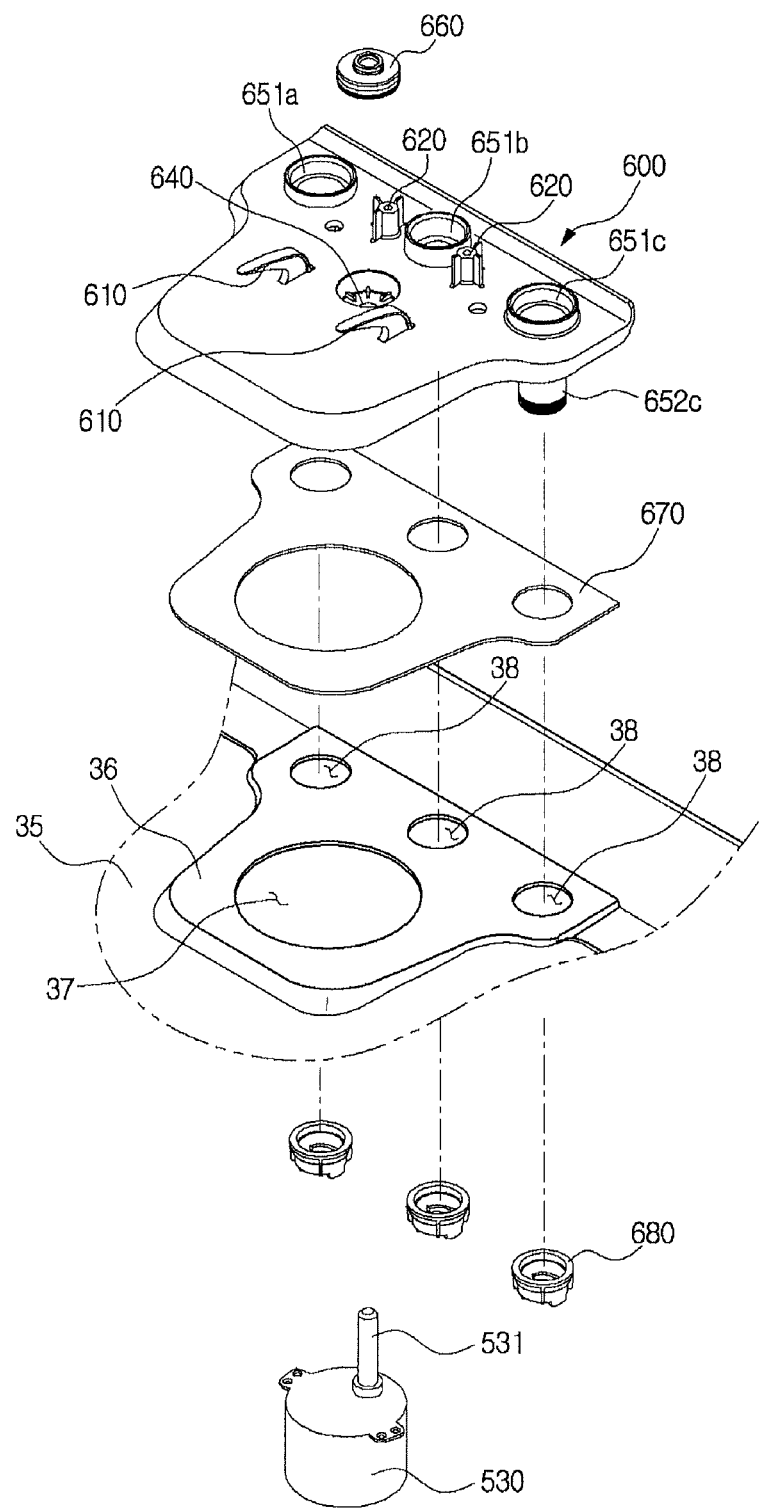
FIG. 18 is an exploded view of a bottom plate, a bottom plate cover, and a motor of a wash tank of the dish washing machine of FIG. 1.
Figure 19:
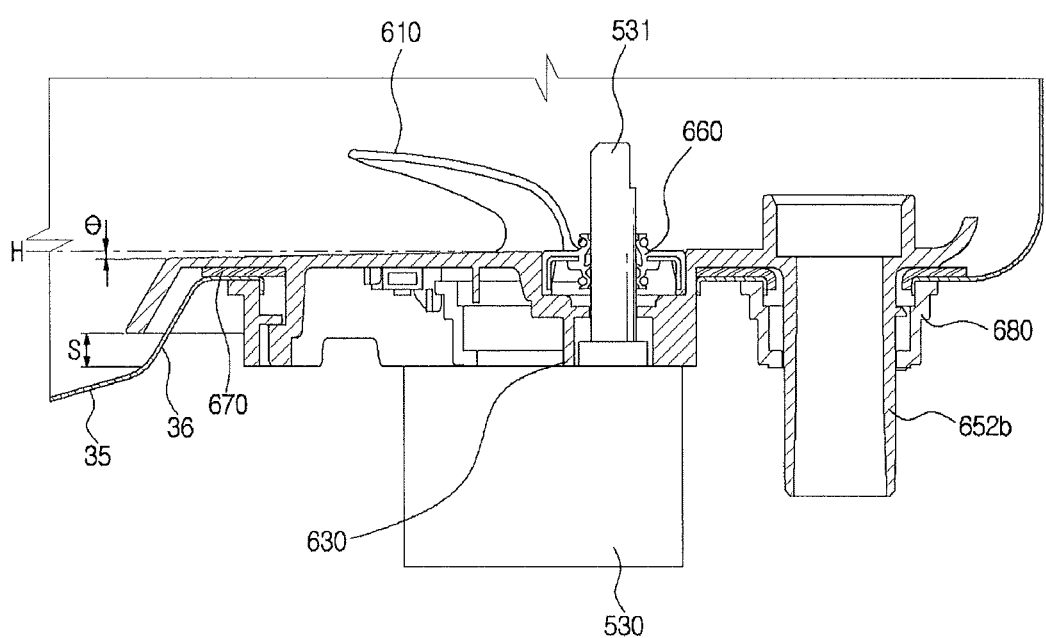
FIG. 19 is a cross-sectional view of the bottom plate, the bottom plate cover, and the motor of the dish washing machine of FIG. 1.
Figure 20:
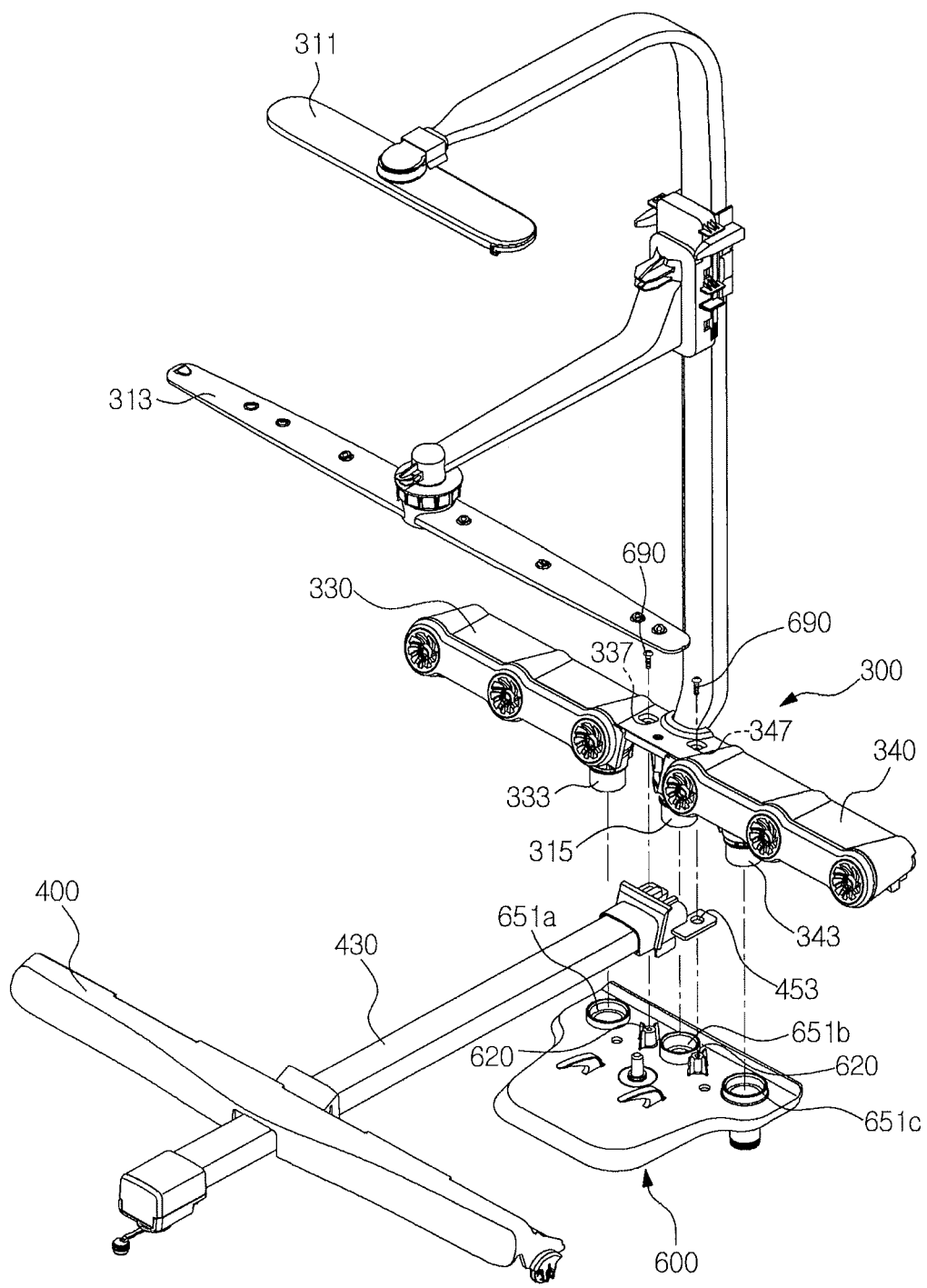
FIG. 20 is an exploded view of a vane, a rail assembly, a spray nozzle assembly, and a bottom plate cover of the dish washing machine of FIG. 1.

FIG. 18 is an exploded view of a bottom plate, a bottom plate cover, and a motor of a wash tank of the dish washing machine of FIG. 1. FIG. 19 is a cross-sectional view of the bottom plate, the bottom plate cover, and the motor of the dish washing machine of FIG. 1. FIG. 20 is an exploded view of a vane, a rail assembly, a spray nozzle assembly, and a bottom plate cover of the dish washing machine of FIG. 1.

A bottom plate cover of a dish washing machine in accordance with an embodiment of the disclosure will be described with reference to FIGS. 18 through 20.

The dish washing machine 1 may include the bottom plate cover 600 combined with one rear side of the bottom plate 35 of the wash tank 30.

The bottom plate cover 600 may function to seal a motor through hole 37 and flow path through holes 38 formed in the bottom plate 35, support the motor 530 configured to drive the vane 400, and fix a rail assembly 430 of the dish washing machine 1 and the nozzle assembly 300.

As described above, the nozzle assembly 300 may include the upper rotation nozzle 311, the middle rotation nozzle 313, the left fixing nozzle 330, and the right fixing nozzle 340.

The rail assembly 430 may guide movement of the vane 400, and an example configuration of the rail assembly 430 will be described later.

A bottom plate protrusion 36 may be formed at the rear of the bottom plate 35 and protrude to be combined with the bottom plate cover 600. A motor through hole 37 through which the motor 530 for driving the vane 400 passes, and flow path through holes 38 through which a flow path connecting the nozzle assembly 300 and the distribution device (refer to 200 in FIG. 3) passes may be formed in the bottom plate protrusion 36.

The motor 530 may be mounted on a bottom surface of the bottom plate cover 600. When the bottom plate cover 600 is separated from the bottom plate 35, the motor 530 may be withdrawn through the motor through hole 37 along with the bottom plate cover 600.

For example, a plurality of hose connection units of the bottom plate cover 600 may pass through the flow path through holes 38.

The bottom plate cover 600 may include a shaft through hole 640 through which a driving shaft 531 of the motor 530 passes, hose connection units that protrude downward to be combined with hoses 271a, 271b, and 271c extending from the distribution device 200 and are inserted into the flow path through holes 38 of the bottom plate protrusion 36, nozzle inflow port connection units 651a, 651b, and 651c that protrude upward to be combined with inflow ports 315, 333, and 343 of the nozzle assembly 300, connecting holes 620 configured to fix the nozzle assembly 300 and the rail assembly 430, and one or more rotation guides 610 that protrude to guide the rotation of the vane 400. As shown in FIGS. 18 and 19 hose connection units 652b and 652c correspond to hoses 271b and 271c. An additional hose connection unit which is not visible in the drawings also corresponds to hose 217a and is disposed below nozzle inflow port connection units 651a.

The bottom plate cover 600 may be closely combined with a top surface of the bottom plate protrusion 36. Fixing caps 680 may be combined with the hose connection units of the bottom plate cover 600 so that the bottom plate cover 600 may be fixed to the bottom plate protrusion 36.

A sealing member 670 may be disposed or placed between the bottom plate cover 600 and the bottom plate protrusion 36 to prevent wash water stored in the wash tank 30 from leaking through the motor through hole 37 and the flow path through holes 38 of the bottom plate protrusion 36. The sealing member 670 may be formed of a rubber material for example.

A motor mounting unit 630 on which the motor 530 for driving the vane 400 is mounted may be disposed or placed on the bottom surface of the bottom plate cover 600. The driving shaft 531 of the motor 530 may penetrate the shaft through hole 640 of the bottom plate cover 600 and protrude into the wash tank 30. A driving pulley (refer to 500 in FIG. 21) that will be described later may be combined with the driving shaft 531 of the motor 530 and rotate along with the driving shaft 531.

A sealing member 660 may be disposed or placed in the shaft through hole 640 to prevent wash water stored in the wash tank 30 from leaking through the shaft through hole 640. The sealing member 660 may be a mechanical sealing device configured to seal the shaft through hole 640 and may enable efficient rotation of the driving shaft 531. As can be seen from FIG. 19, a portion of the shaft 531 may protrude through the shaft through hole 640 and the sealing member 660.

A top surface of the bottom plate cover 600 may be inclined at a predetermined angle (refer to θ in FIG. 19) based on a reference horizontal surface (refer to H in FIG. 19).

The top surface of the bottom plate cover 600 may be inclined to prevent the debris (e.g., food, dirt, etc.) from being accumulated on the bottom plate cover 600 or proceeding toward the fixing spray nozzles 330 and 340. In the dish washing machine 1 in accordance with an embodiment of the disclosure, since the fixing spray nozzles 330 and 340 do not move unlike the rotation nozzles 311 and 313, the debris (e.g., food, dirt, etc.) may remain and accumulate. Thus, the accumulation of the debris (e.g., food, dirt, etc.) may be prevented by the above-described structure.

An inclination angle θ formed by the top surface of the bottom plate cover 600 with the reference horizontal surface H may be about 3° or more.

Also, an end portion of the bottom plate cover 600 may be spaced a predetermined distance (refer to S in FIG. 19) apart from the bottom plate 35 because it is difficult to completely adhere the bottom plate cover 600 to the bottom plate 35 due to manufacturing and assembling errors. In this case, however, the debris (e.g., food, dirt, etc.) may be prevented from being caught in a fine gap between the end portion of the bottom plate cover 600 and the bottom plate 35. The distance S between the end portion of the bottom plate cover 600 and the bottom plate 35 may be about 5 mm or more.

The rail assembly 430 and the nozzle assembly 300 may be combined with the bottom plate cover 600. The bottom plate cover 600, the rail assembly 430, and the nozzle assembly 300 may be tightly fixed by a connecting member 690. To this end, connecting holes (coupling holes) 620, 453, 337, and 347 may be respectively formed in the corresponding positions of the bottom plate cover 600, rail assembly 430, and the nozzle assembly 300. The connecting member 690 may include one or more screws, for example. A connecting member may also include, for example, a bolt, a pin, a rivet, an anchor, an adhesive, and the like.

Due to the above-described structure, the rail assembly 430 and the nozzle assembly 300 may be fixed to and aligned with each other.

In the dish washing machine 1 in accordance with an embodiment of the disclosure, wash water sprayed from the fixing spray nozzles 330 and 340 of the nozzle assembly 300 may not be directly sprayed toward the dishes but reflected by the vane 400 combined with the rail assembly 430 and sprayed toward the dishes. Thus, positions of the fixing spray nozzles 330 and 340 and the rail assembly 430 should preferably be precisely aligned, and this requirement or preference may be satisfied by the above-described combining structure.

Figure 21:
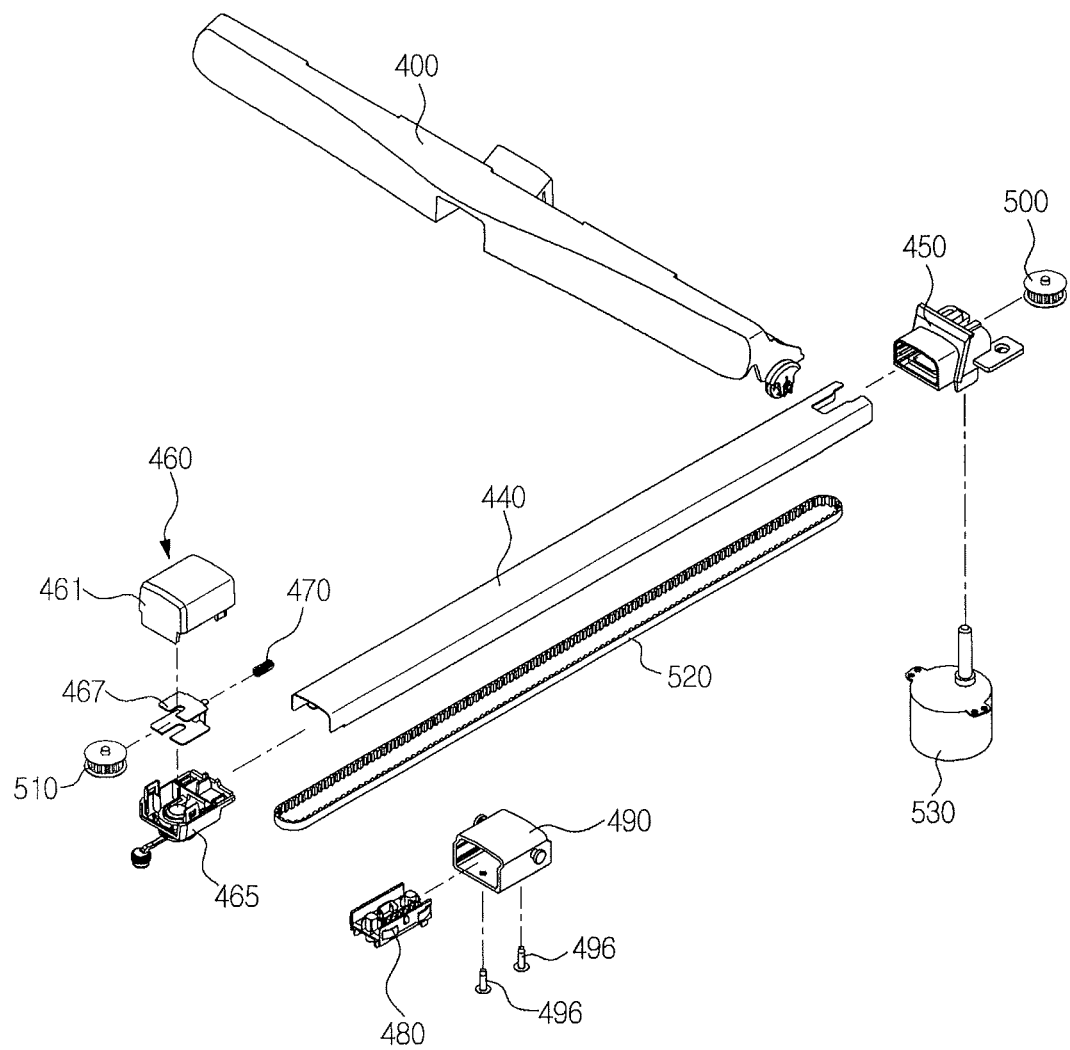
FIG. 21 is a view of the vane and a driving device of the dish washing machine of FIG. 1, which is an exploded view of the driving device.
Figure 22:
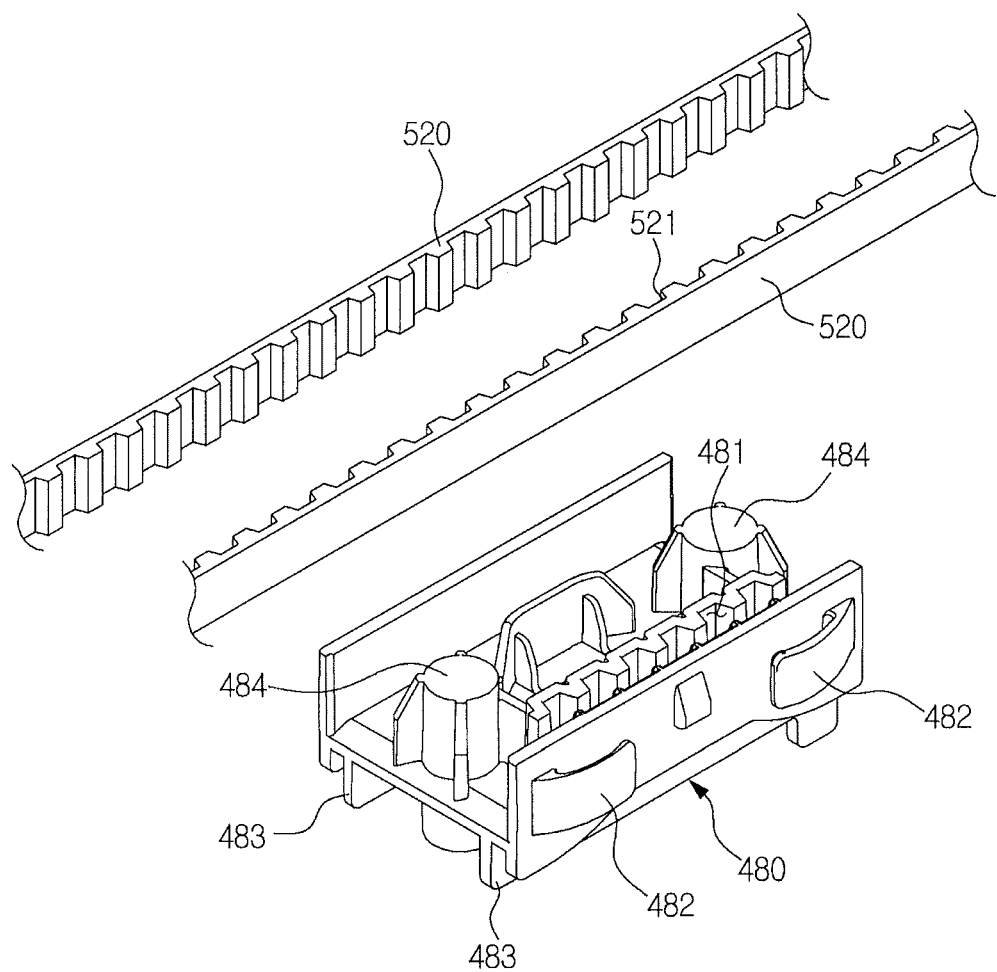
FIG. 22 is a view of a belt and a belt holder of the dish washing machine of FIG. 1.
Figure 23:
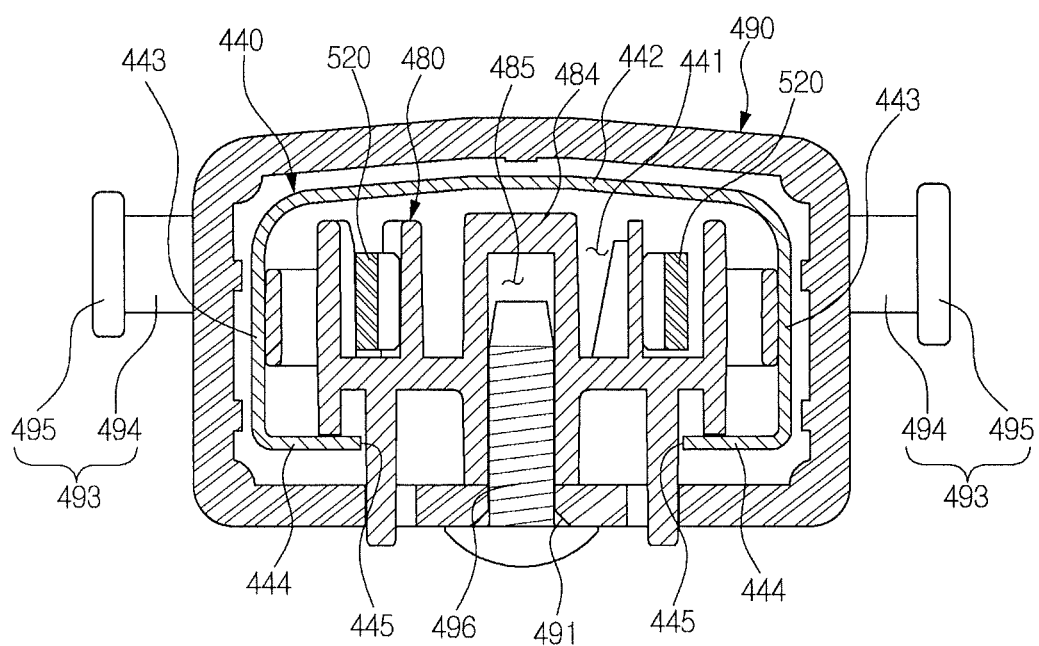
FIG. 23 is a cross-sectional view of a rail, the belt, the belt holder, and a vane holder of the dish washing machine of FIG. 1.
Figure 24:
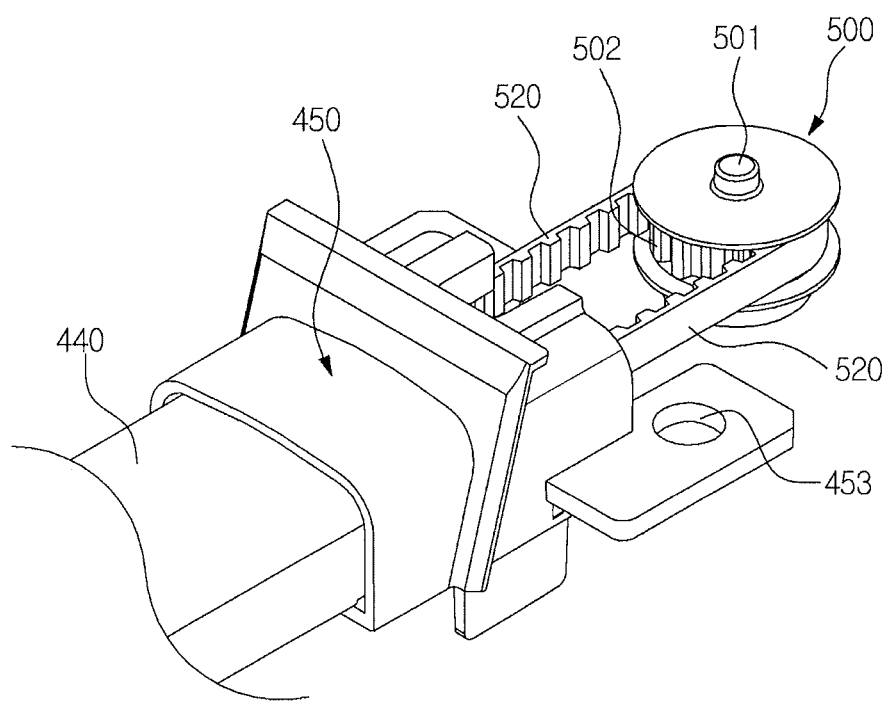
FIG. 24 is a view of the rail, the belt, a driving pulley, and a rear holder of the dish washing machine of FIG. 1.
Figure 25:
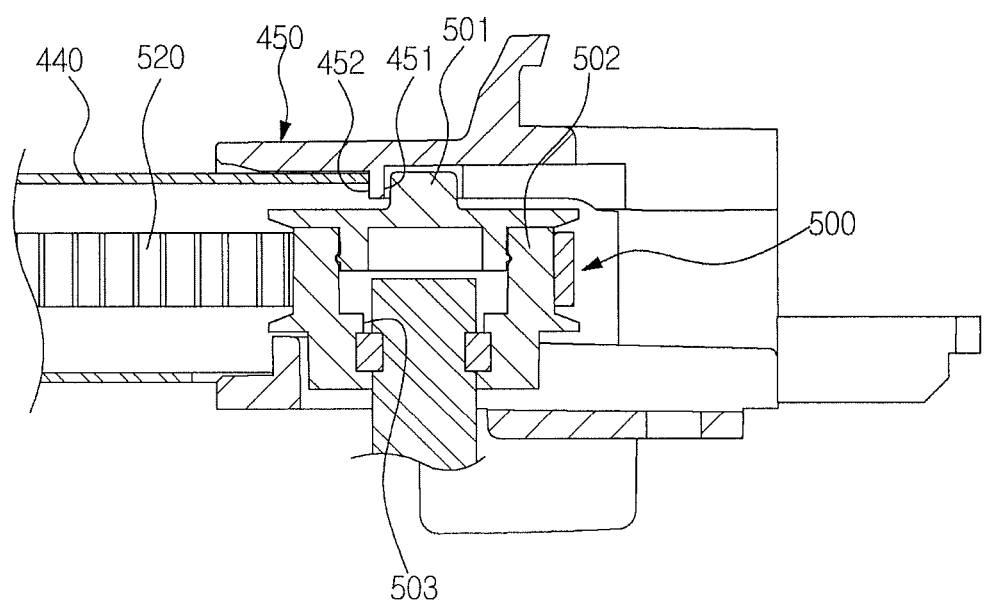
FIG. 25 is a cross-sectional view of the rail, the belt, the driving pulley, and the rear holder of the dish washing machine of FIG. 1.
Figure 26:
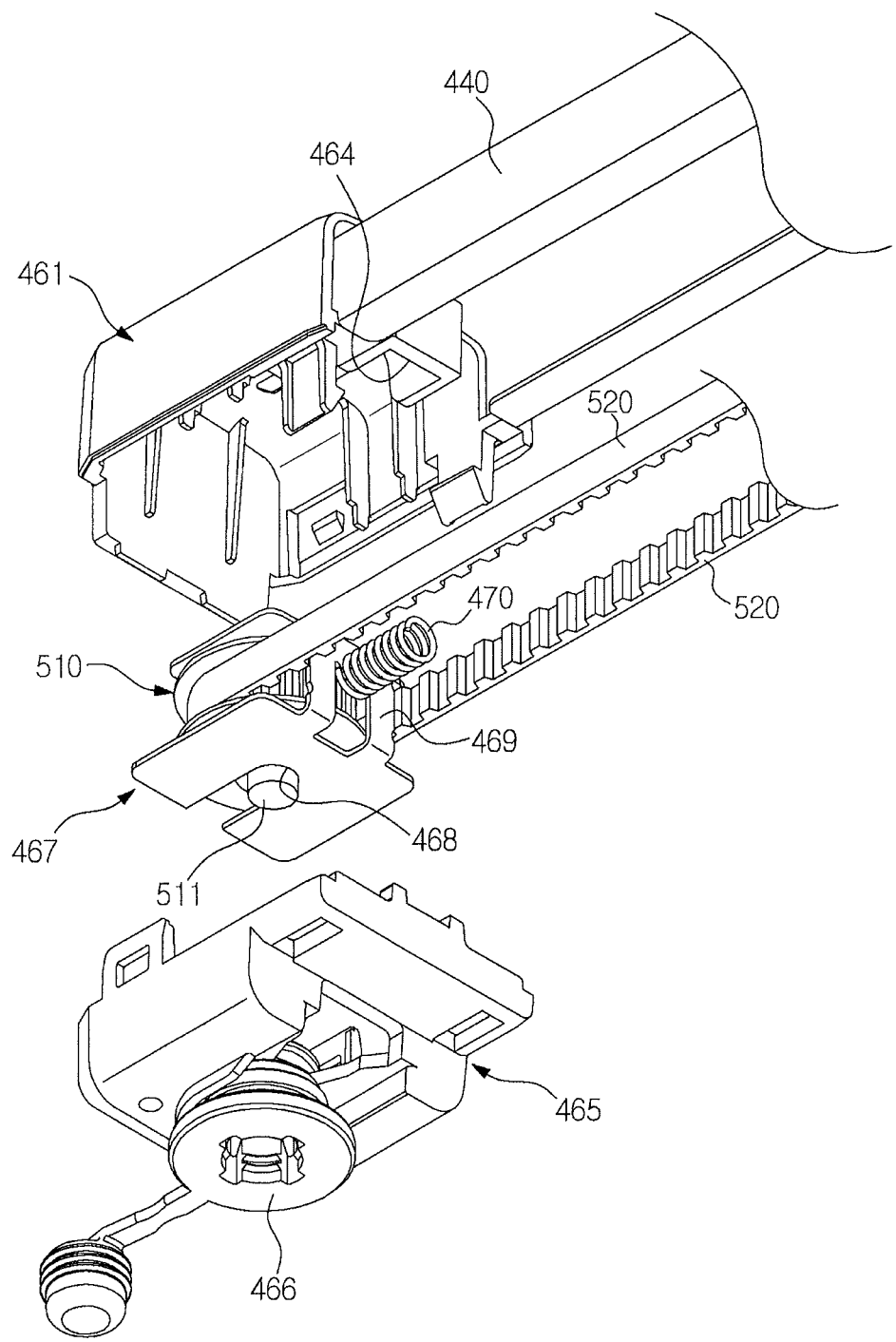
FIG. 26 is a view of the rail, the belt, an idle pulley, and a front holder of the dish washing machine of FIG. 1.
Figure 27:
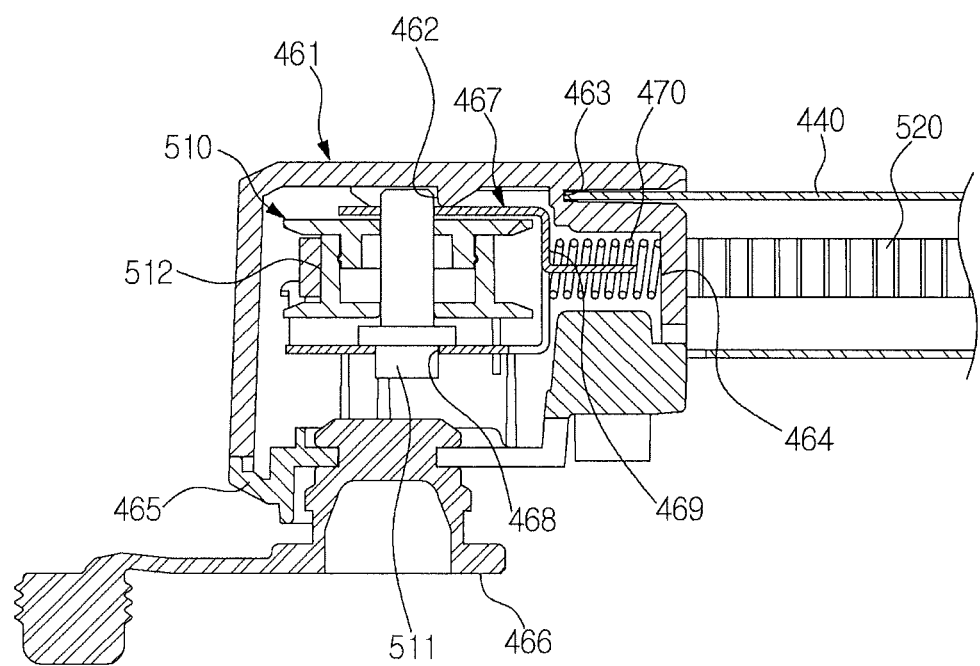
FIG. 27 is a cross-sectional view of the rail, the belt, the idle pulley, and the front holder of the dish washing machine of FIG. 1.

FIG. 21 is a view of the vane and a driving device of the dish washing machine of FIG. 1, which is an exploded view of the driving device. FIG. 22 is a view of a belt and a belt holder of the dish washing machine of FIG. 1. FIG. 23 is a cross-sectional view of a rail, the belt, the belt holder, and a vane holder of the dish washing machine of FIG. 1. FIG. 24 is a view of the rail, the belt, a driving pulley, and a rear holder of the dish washing machine of FIG. 1. FIG. 25 is a cross-sectional view of the rail, the belt, the driving pulley, and the rear holder of the dish washing machine of FIG. 1. FIG. 26 is a view of the rail, the belt, an idle pulley, and a front holder of the dish washing machine of FIG. 1. FIG. 27 is a cross-sectional view of the rail, the belt, the idle pulley, and the front holder of the dish washing machine of FIG. 1.

A vane of a dish washing machine in accordance with an embodiment of the disclosure and a driving device thereof will be described with reference to FIGS. 21 through 27.

The dish washing machine 1 in accordance with an embodiment of the disclosure may include a vane 400 configured to reflect wash water sprayed from fixing nozzles 330 and 340. The vane 400 may linearly reciprocate (move) in a direction in which wash water is sprayed from the fixing spray nozzles 330 and 340 and/or in a direction which is opposite to a direction in which wash water is sprayed from the fixing spray nozzles 330 and 340.

The dish washing machine 1 in accordance with an embodiment of the disclosure may include the driving device 420 configured to linearly reciprocate the vane 400.

The driving device 420 may include a motor 530 configured to generate a driving force and a rail assembly 430 configured to guide movement of the vane 400.

The rail assembly 430 may include a rail 440 configured to guide movement of the vane 400 and having an inner space 441, a driving pulley 500 connected to the motor 530 and configured to rotate, a belt 520 connected to the driving pulley 500, configured to rotate, and disposed in the inner space 441 of the rail 440, an idle pulley 510 connected to the belt 520 to rotatably support the belt 520, a belt holder 480 disposed in the inner space 441 of the rail 400 to combine with the belt 520 and linearly reciprocate, a vane holder 490 disposed outside the rail 400 to combine with the belt holder 480 and linearly reciprocate, wherein the vane holder 490 is combined with the vane 400, a rear holder 450 configured to rotatably support the driving pulley 500 and combined with a rear end portion of the rail 440, and a front holder 460 configured to rotatably support the idle pulley 510 and combined with a front end portion of the rail 440.

The rail 440 may be formed of a metal material. The rail 440 may be elongated in forward and backward directions and may be disposed or positioned midway between the left and right walls 33 and 34 of the wash tank 30.

The rail 440 may have a pipe shape in which an opening 445 is formed in a roughly lower portion. That is, the rail 440 may include the inner space 441, an upper wall 442, a lower wall 444, both sidewalls 443, and the opening 445 formed in the lower wall 444. The lower opening 445 may extend from one lengthwise end portion of the rail 440 to the other lengthwise end portion thereof.

The rail 440 may be disposed or placed in the pipe shape and the belt 520 may be disposed in the inner space 441 of the rail 400 so that the belt 520 may be prevented from being contacted by the dishes of the wash tank 30 and stopped and/or may be prevented from being contacted by wash water of the wash tank 30 and corroding.

The opening 445 may be formed in the lower wall 444 of the rail 440 so that the belt 520 disposed in the inner space 441 of the rail 440 may be connected to the vane 400 disposed or placed outside the rail 400 to transmit a driving force of the belt 520 to the vane 400.

The belt 520 may be wound with the driving pulley 500 and the idle pulley 510 and may form a closed curve. When the motor 530 is driven, the belt 520 may rotate in a direction in which the motor 530 rotates. The belt 520 may be formed of a resin material containing aramid fiber in consideration of tensile strength and cost, for example.

A tooth form 521 may be formed on an inner side surface of the belt 520 and transmit driving force of the belt 520 to the belt holder 480.

Similar to the belt 520, the belt holder 480 may be disposed in the inner space 441 of the rail 400, and may combine with the tooth form 521 of the belt 520 and move along with the belt 520. To this end, the belt holder 480 may have a tooth-form coupling unit 481 that is combined with the tooth form 521 of the belt 520.

Also, the belt holder 480 may include legs 482 and 483 supported by the rail 400. The legs 482 and 483 may include at least one lateral leg 482, which protrudes sideward and is supported by the sidewalls 443 of the rail 400, and at least one lower leg 483, which protrudes downward and is supported by the lower wall 444 of the rail 400.

The lateral legs 482 may be disposed or placed to be capable of elastic deformation to reduce noise and oscillation caused by collision and friction between the belt holder 480 and the rail 400 during movement of the belt holder 480, and enable efficient movement of the belt holder 480.

The lateral legs 482 may be a plate-spring-type elastic material. That is, each of the lateral legs 482 may have a curved plate that is elastically deformed between a relaxed shape and a compressed shape.

Also, the belt holder 480 may have a connecting unit 484 to be combined with the vane holder 490. The connecting unit 484 may include a connecting hole 485 into which a connecting member 496 may be inserted. The connecting member 496 may include one or more screws, for example. A connecting member may also include, for example, a bolt, a pin, a rivet, an anchor, an adhesive, and the like.

The vane holder 490 may be combined with the belt holder 480 and move along with the belt holder 480 and transmit a driving force of the belt holder 480 to the vane 400. The vane holder 490 may be disposed or placed to surround an outer side surface of the rail 440.

The vane holder 490 may be combined with the belt holder 480 through the lower opening 445 of the rail 440. To this end, the vane holder 490 may have a connecting hole 491 to be combined with the belt holder 480. Accordingly, the vane holder 490 may be combined with the belt holder 480 by connecting the connecting hole 491 of the vane holder 490 and the connecting hole 485 of the belt holder 480 with the connecting member 496. The connecting member 496 may include one or more screws, for example. A connecting member may also include, for example, a bolt, a pin, a rivet, an anchor, an adhesive, and the like.

The connecting member 496 may proceed upward from below and be sequentially connected to the connecting hole 491 of the vane holder 490 and the connecting hole 485 of the belt holder 480.

Figure 28:
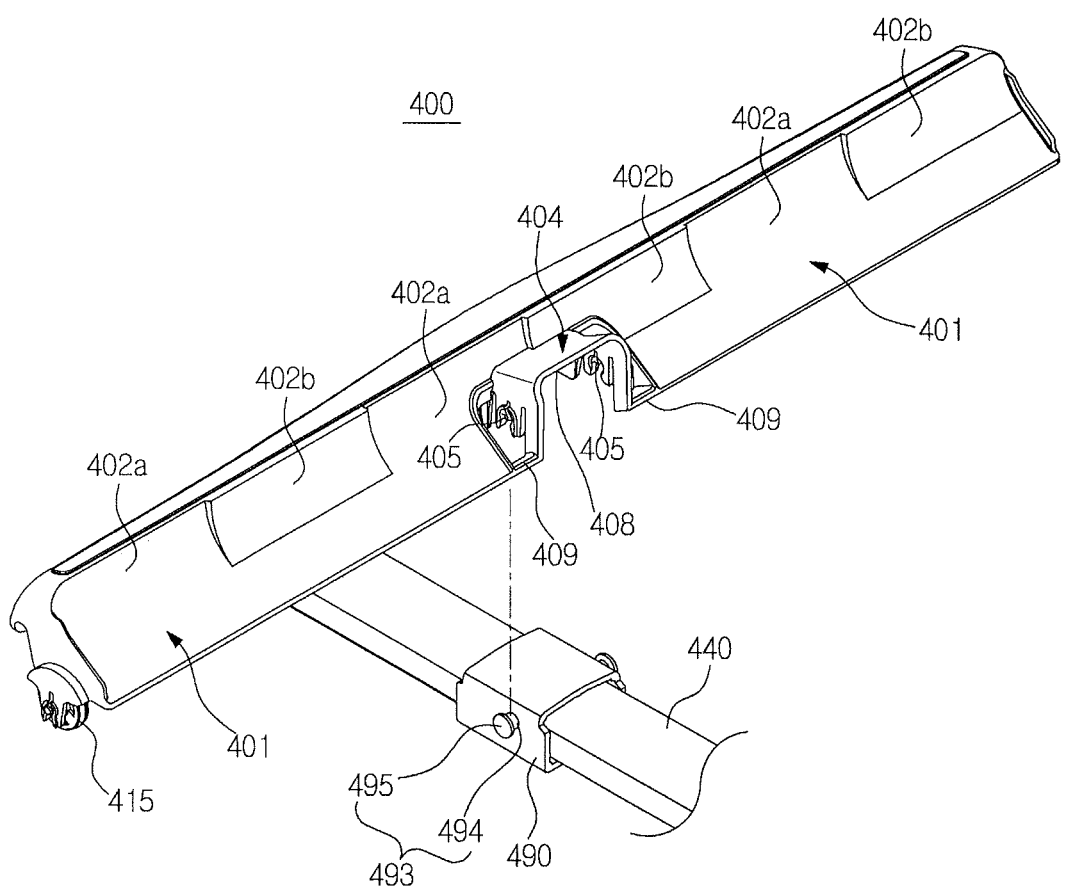
FIG. 28 is a view of the vane and the vane holder of the dish washing machine of FIG. 1.

A coupling protrusion 493 with which the vane 400 is detachably combined may be formed on the vane holder 490. The coupling protrusion 493 may include a coupling axial unit 494, which protrudes sideward, and a separation preventing unit 495 formed in an end portion of the coupling axial unit 494 to prevent separation of the vane 400. With reference to FIG. 28 the separation preventing unit 495 may have a greater diameter than coupling axial unit 494. The coupling protrusion 493 may be disposed on and protrude from one or both sides of the vane holder 490. The coupling protrusion 493 may protrude outward from the vane holder 490 toward the left and/or right sides of the wash tank 30.

The driving pulley 500 may include a rotation axis 501, a shaft connecting unit 503 connected to the driving shaft 531 of the motor 530 to receive driving force, and a belt coupling unit 502 with which the belt 520 is combined.

With reference to FIGS. 24 and 25, the rear holder 450 may rotatably support the driving pulley 500 and combine with the rear end portion of the rail 440. The rear holder 450 may include a pulley support surface 451 configured to support the rotation axis 501 of the driving pulley 500, a rail support surface 452 configured to support the rear end portion of the rail 440, and connecting holes (coupling holes) 453 to be combined with the bottom plate cover 600.

With reference to FIGS. 26 and 27, the idle pulley 510 may include a rotation axis 511 and a belt coupling unit 512 with which the belt 520 is combined.

The front holder 460 may include a front top holder 461, a front bottom holder 465 to be combined with a lower portion of the front top holder 461, and a pulley bracket 467 disposed or placed between the front top holder 461 and the front bottom holder 465 to be capable of moving in a lengthwise direction of the rail 440. The pulley bracket 467 rotatably supports the idle pulley 510.

The front top holder 461 may include a pulley support surface 462 configured to support the rotation axis 511 of the idle pulley 510, and a rail support surface 463 configured to support the front end portion of the rail 440.

The front bottom holder 465 may be combined with the lower portion of the front top holder 461 by a clasp structure. The front bottom holder 465 may have a coupling protrusion 466 to be combined with the bottom plate 35 of the wash tank 30.

The pulley bracket 467 may include a pulley support surface 468 configured to support the rotation axis 511 of the idle pulley 510.

Meanwhile, the rail 440, the belt 520, the driving pulley 500, the rear holder 450, the idle pulley 510, and the front holder 460 may be assembled with one another due to tension of the belt 520.

That is, the driving pulley 500 may be applied with pressure due to the tension of the belt 520 in a direction in which the driving pulley 500 approaches to the rail 400, and the applied pressure may be transmitted to the rear holder 450 by the pulley support surface 451 of the rear holder 450. As a result, the rear holder 450 is closely combined with the rear end portion of the rail 440.

Also, the idle pulley 510 may be applied with pressure due to the tension of the belt 520 in a direction in which the idle pulley 510 approaches to the rail 440, and the applied pressure may be transmitted to the front holder 460 by the pulley support surface 462 of the front holder 460. As a result, the front holder 460 is closely combined with the front end portion of the rail 440.

Meanwhile, the front holder 460 may further include an elastic member 470 for maintaining the tension of the belt 520. When the belt 520 thermally expands due to inner heat of the wash tank 30, the belt 520 extends to reduce the tension of the belt 520. When the tension of the belt 520 is reduced, the vane 400 may not be efficiently driven.

One end portion of the elastic member 470 may be supported by the front holder 460, and the other end portion of the elastic member 470 may be supported by the pulley bracket 467. To this end, elastic member support surfaces 464 and 469 may be respectively formed on the front holder 460 and the pulley bracket 467.

For example, the elastic member 470 may be a compression spring. Since the front holder 460 is supported at the rail 440 by the rail support surface 463, elastic force of the elastic member 470 may act on the pulley bracket 467. That is, the pulley bracket 467 may be applied with pressure far away from the rail 440 due to the elastic force of the elastic member 470.

In this case, since the pulley bracket 467 is applied with pressure due to the tension of the belt 520 in the direction in which the pulley bracket 467 approaches to the rail 440, the pulley bracket 467 moves to a position in which the balance is kept between the tension of the belt 520 and the elastic force of the elastic member 470.

That is, when the belt 520 extends to reduce tension and the elastic force of the elastic member 470 becomes higher than the tension of the belt 520, the pulley bracket 467 moves far away from the rail 440 due to the elastic force of the elastic member 470. Thus, when the pulley bracket 467 moves far away from the rail 440, the belt 520 is tightly stretched again and the tension of the belt 520 is restored.

Due to the above-described structure, even if the belt 520 is extended due to thermal expansion, the belt 520 is pulled by moving the pulley bracket 467 so that the tension of the belt 520 may be maintained constant and reliability of the driving device 420 may be improved.

The assembling order of the rail assembly 430 of the dish washing machine in accordance with an embodiment of the disclosure will be described.

As shown in FIG. 22, the belt holder 480 may be combined with the belt 520.

As shown in FIG. 23, an assembly of the belt 520 and the belt holder 480 may be disposed in the inner space 441 of the rail 440. Next, the vane holder 490 may be combined with the assembly of the belt 520 and the belt holder 480 using the connecting member 496.

As shown in FIG. 24, the rear holder 450 may be assembled with a lengthwise rear end portion of the rail 440. Next, the driving pulley 500 may be combined with the belt 520.

As shown in FIG. 26, the front top holder 461 may be combined with a lengthwise front end portion of the rail 440. Next, the belt 520, the idle pulley 510, the pulley bracket 467, and the elastic member 470 are combined. Next, an assembly of the belt 520, the idle pulley 510, the pulley bracket 467, and the elastic member 470 is pushed into the front top holder 461. Next, the front bottom holder 465 is combined with the front top holder 461.

Figure 29:
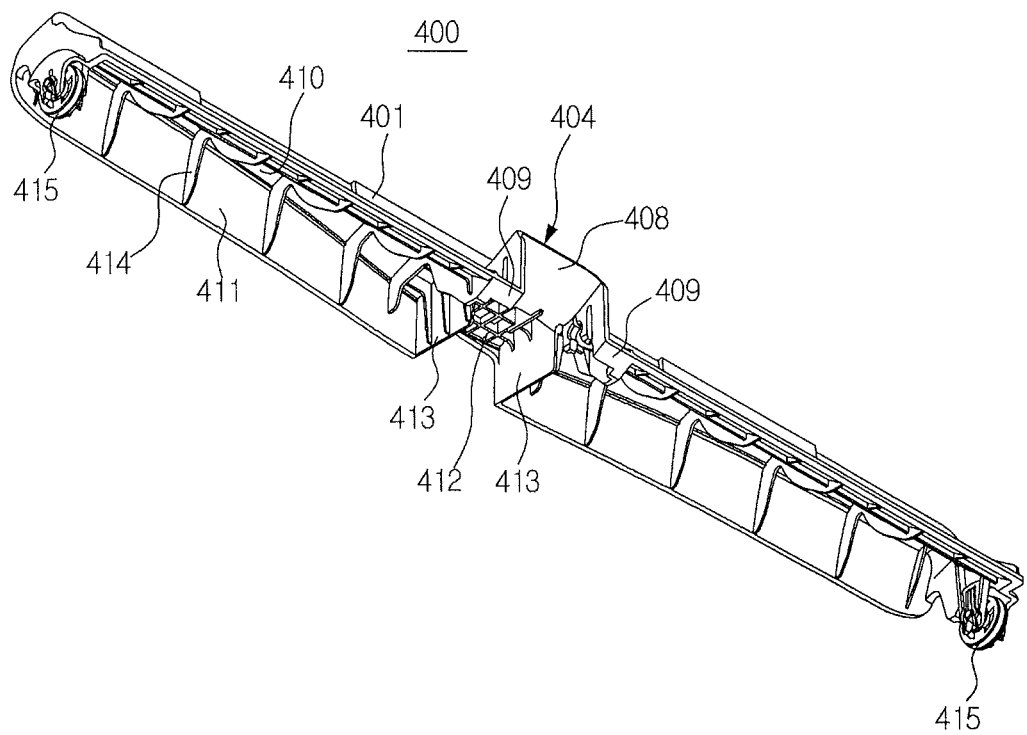
FIG. 29 is a perspective view of the vane of the dish washing machine of FIG. 1.
Figure 30:
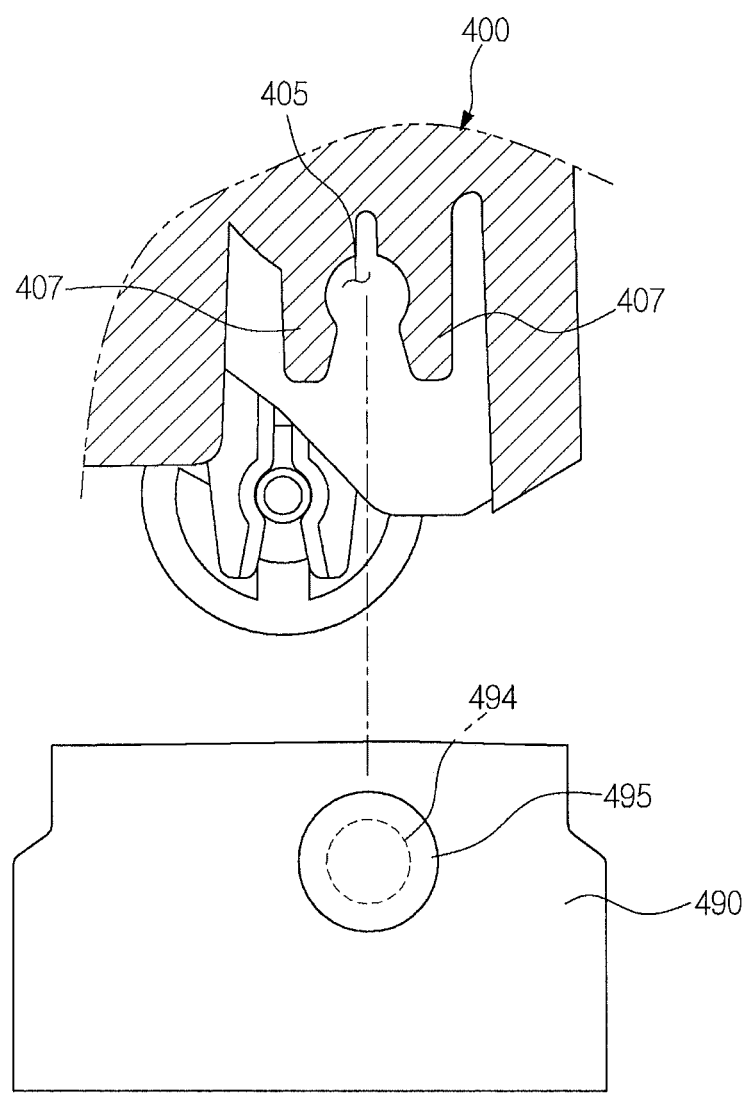
FIG. 30 is an exploded view of the vane and a portion of the vane holder of the dish washing machine of FIG. 1.

FIG. 28 is a view of the vane and the vane holder of the dish washing machine of FIG. 1. FIG. 29 is a perspective view of the vane of the dish washing machine of FIG. 1. FIG. 30 is an exploded view of the vane and a portion of the vane holder of the dish washing machine of FIG. 1.

A vane in accordance with an embodiment of the disclosure will be described with reference to FIGS. 28 through 30.

The vane 400 may be elongated in a vertical direction with respect to the rail 440.

The vane 400 may include a reflection unit 401 configured to reflect wash water sprayed from the fixing nozzles 330 and 340, an upper support unit 410 formed by bending the reflection unit 401, a rear support unit 411 formed by bending the upper support unit 410, a cap unit 404 disposed or placed in a lengthwise central portion of the reflection unit 401, a rotation clasp unit 409 disposed or placed to interface with the rotation guide (refer to 610 in FIG. 31) of the bottom plate cover 600, reinforcing ribs 414 disposed or placed to reinforce the strengths of the reflection unit 401, the upper support unit 410, and the rear support unit 411, a horizontal support 412 supported by the top surface of the vane holder 490, and vertical supports 413 supported by side surfaces of the vane holder 490.

The reflection unit 401 may include reflection surfaces 402a and 402b disposed or placed aslant to reflect wash water. The reflection surfaces 402a and 402b may include a reflection surface 402a and a reflection surface 402b that have different inclinations to vary angles at which the wash water is reflected, and may be alternately arranged in a lengthwise direction. As shown in FIG. 28 there may are three reflection surfaces 402b, however the disclosure is not so limited. For example, there may no reflection surfaces 402b, one, two, or more than three reflection surfaces 402b.

The cap unit 404 may include a coupling groove 405 to be combined with the vane holder 490, and a rotation stopper unit 408 configured to limit a rotation range of the vane 400 when the vane 400 is rotated by the rotation guide 610 of the bottom plate cover 600.

The coupling protrusion 493 of the vane holder 490 may be combined with the coupling groove 405 of the vane 400. For example, the coupling axial unit 494 of the coupling protrusion 493 may be inserted into the coupling groove 405 of the vane 400. The coupling axial unit 494 may rotatably support the vane 400.

As shown in FIG. 30, the coupling groove 405 of the vane 400 may be formed by elastic hooks 407. While the coupling axial unit 494 of the vane holder 490 is being pushed into or extracted from the coupling groove 405 of the vane 400, the elastic hooks 407 are elastically deformed apart from each other. When the insertion or detachment of the coupling axial unit 494 of the vane holder 490 is completed, the elastic hooks 407 may be restored to an original state. In the above-described structure, the vane 400 may be mounted on or detached from the vane holder 490.

Rollers 415 may be disposed or placed at both lengthwise end portions of the vane 400 to enable smooth movement of the vane 400. Roller support units (refer to 39 in FIG. 47) for supporting the rollers 415 may be disposed or placed at the bottom plate 35 of the wash tank 30.

Figure 31:
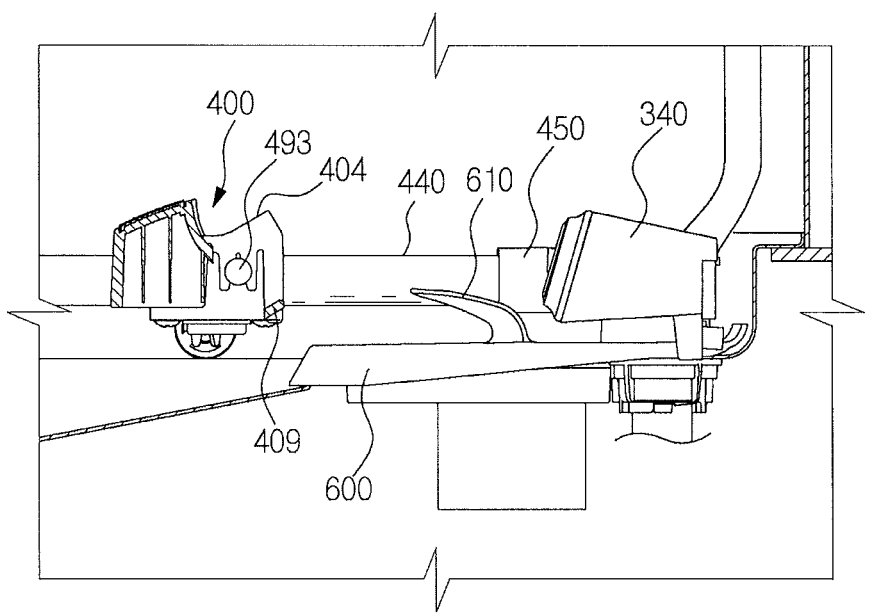
FIGS. 31 through 33 are views illustrating a rotation operation of the vane of the dish washing machine of FIG. 1.
Figure 32:
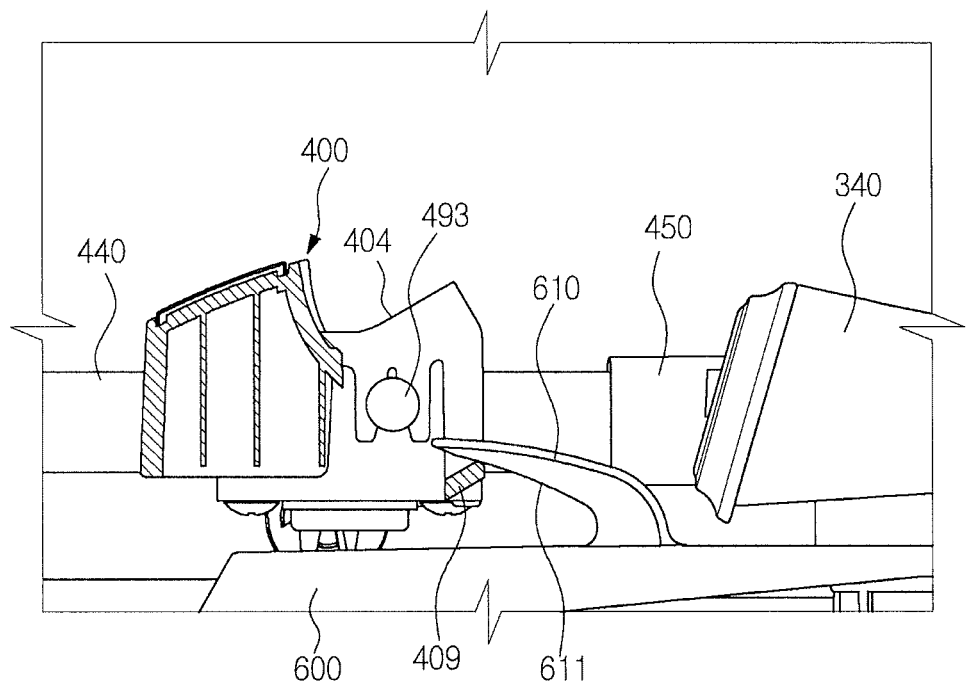
Figure 33:
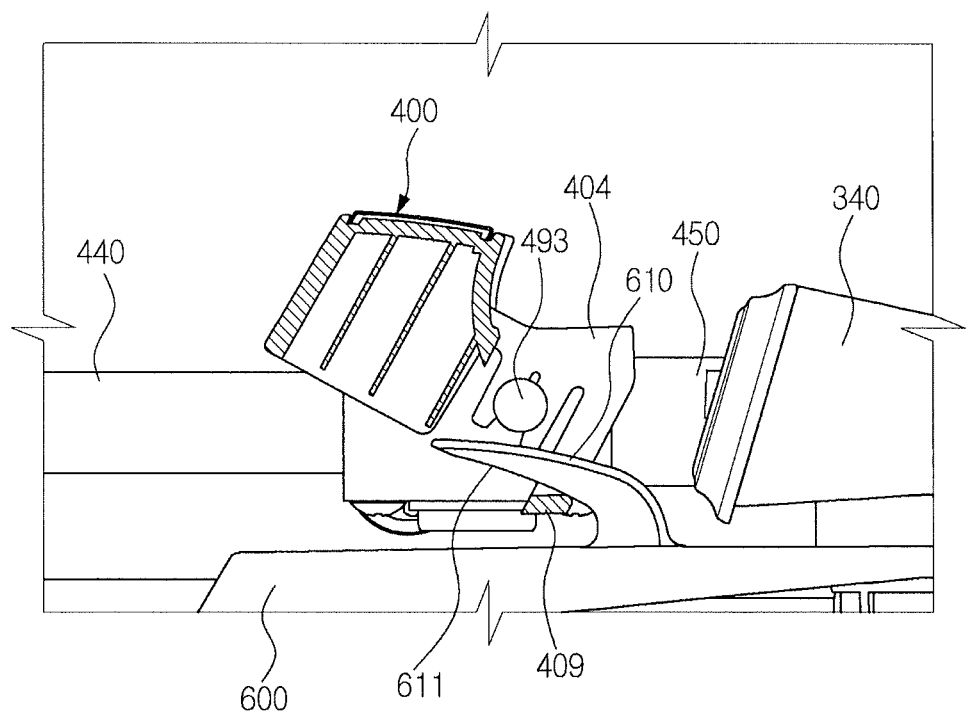
Figure 34:
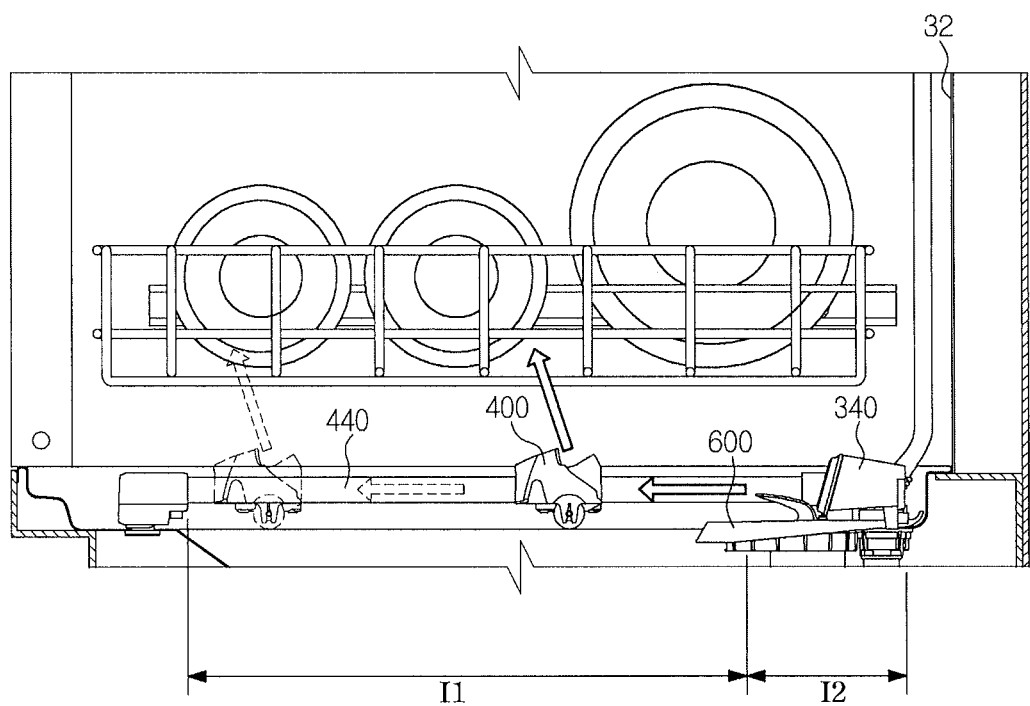
FIG. 34 is a view illustrating an operation of, by a vane, reflecting wash water in a vane movement section of the dish washing machine of FIG. 1.
Figure 35:
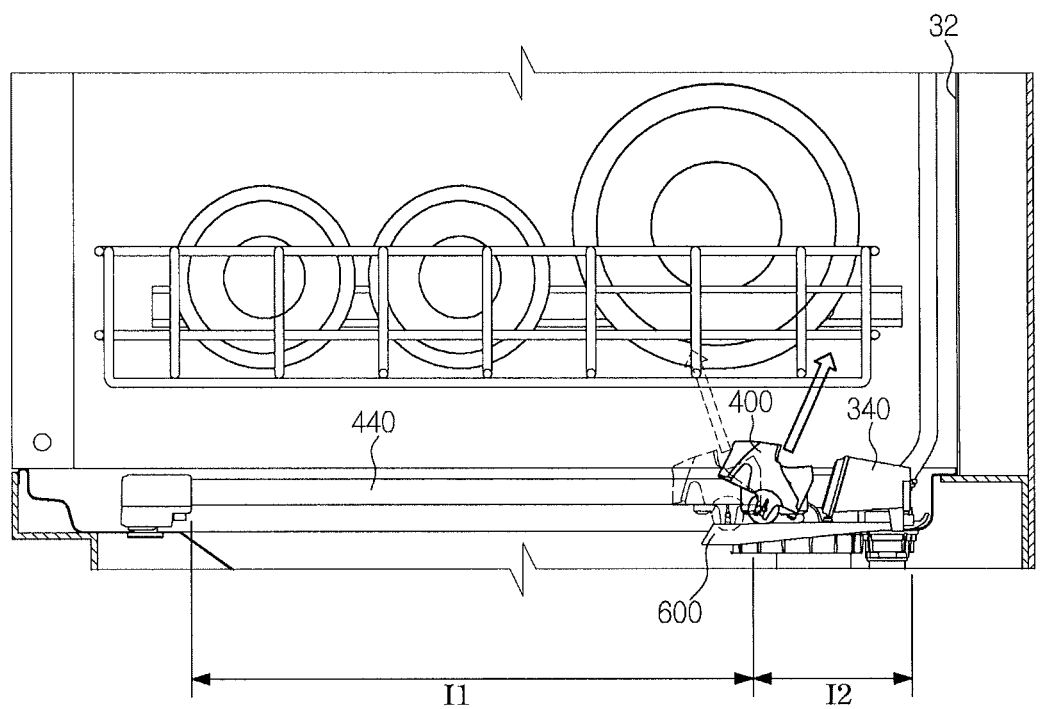
FIG. 35 is a view illustrating an operation of, by the vane, reflecting wash water in a vane non-movement section of the dish washing machine of FIG. 1.

FIGS. 31 through 33 are views illustrating a rotation operation of the vane of the dish washing machine of FIG. 1. FIG. 34 is a view illustrating an operation of, by a vane, reflecting wash water in a vane movement section of the dish washing machine of FIG. 1. FIG. 35 is a view illustrating an operation of, by the vane, reflecting wash water in a vane non-movement section of the dish washing machine of FIG. 1.

A movement section, a non-movement section, and a rotation operation of a vane in accordance with an embodiment of the disclosure will be described with reference to FIGS. 31 through 35.

In the dish washing machine 1 in accordance with an embodiment of the disclosure, the vane 400 reflects wash water sprayed from the fixing spray nozzles 330 and 340, toward the dishes. Since the fixing spray nozzles 330 and 340 spray wash water in a roughly horizontal direction, the fixing spray nozzles 330 and 340 and the vane 400 are disposed roughly parallel to each other. Accordingly, the vane 400 may be restricted from moving in a region in which the fixing spray nozzles 330 and 340 are disposed.

For example, with reference to FIG. 34 and FIG. 35 the dish washing machine 1 may include a vane movement section I1 in which the vane 400 may move, and a vane non-movement section 12 in which the vane 400 may be restricted from moving.

The vane 400 of the dish washing machine 1 in accordance with an embodiment of the disclosure may be rotatably disposed or placed (e.g., at a predetermined angle) to wash the dishes contained in the vane non-movement section 12.

As described above, the rotation guide 610 may be formed in the bottom plate cover 600 and may protrude to guide movement of the vane 400, and the rotation clasp unit 409 may be formed in the vane 400 to interfere with the rotation guide 610. The rotation clasp unit 409 may form a rotation axis of the vane 400 and simultaneously, be formed at a higher level than the coupling protrusion 493 of the vane holder 490 configured to transmit driving force to the vane 400.

The rotation guide 610 may include a guide surface 611, which is contacted by the rotation clasp unit 409 and forms a curved surface to enable efficient rotation of the vane 400.

When the vane 400 comes from the vane movement section I1 to the vane non-movement section 12 and the rotation clasp unit 409 of the vane 400 is interfered with the guide surface 611 of the rotation guide 610 of the bottom plate cover 600, the vane 400 rotates about the coupling protrusion 493 of the vane holder 490. For example, when the vane 400 moves toward the rear wall 32 and the rotation clasp unit 409 of the vane 400 is interfered with the guide surface 611 of the rotation guide 610, the vane 400 may rotate forward or toward the rear wall 32. Due to the rotation of the vane 400, the direction or angle of the wash water which is reflected by the vane 400 may be changed compared to the direction or angle of the wash water which is reflected by the vane 400 before the rotation clasp unit 409 of the vane 400 is interfered with the guide surface 611 of the rotation guide 610. Accordingly, the vane 400 reflects wash water toward the dishes contained in the non-movement section 12.

Figure 36:
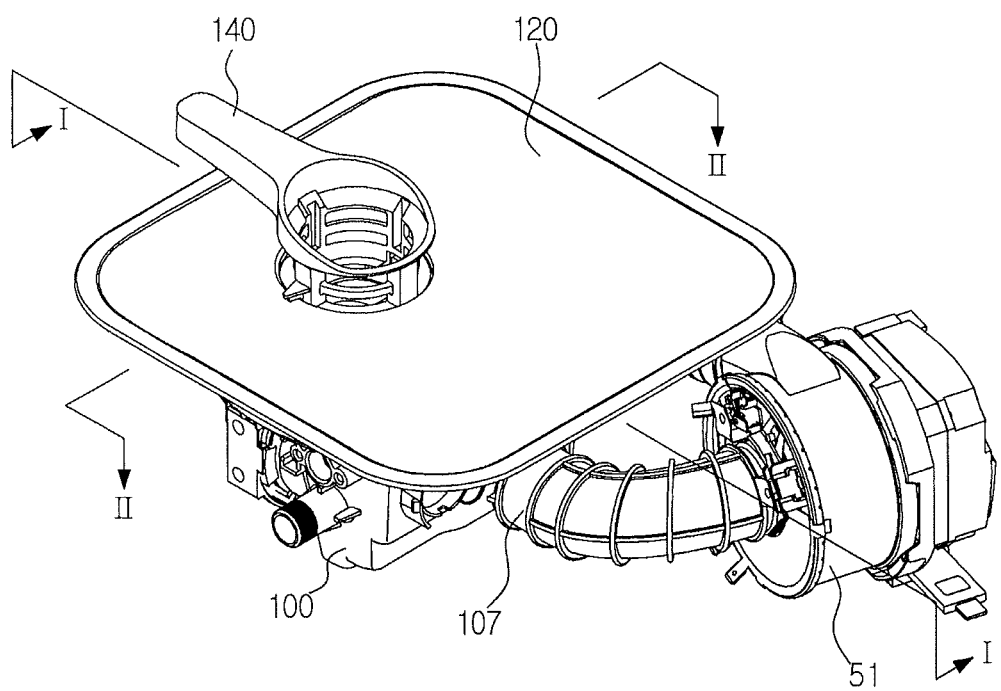
FIG. 36 is a view illustrating of a sump, a coarse filter, and a fine filter of the dish washing machine of FIG. 1.
Figure 37:
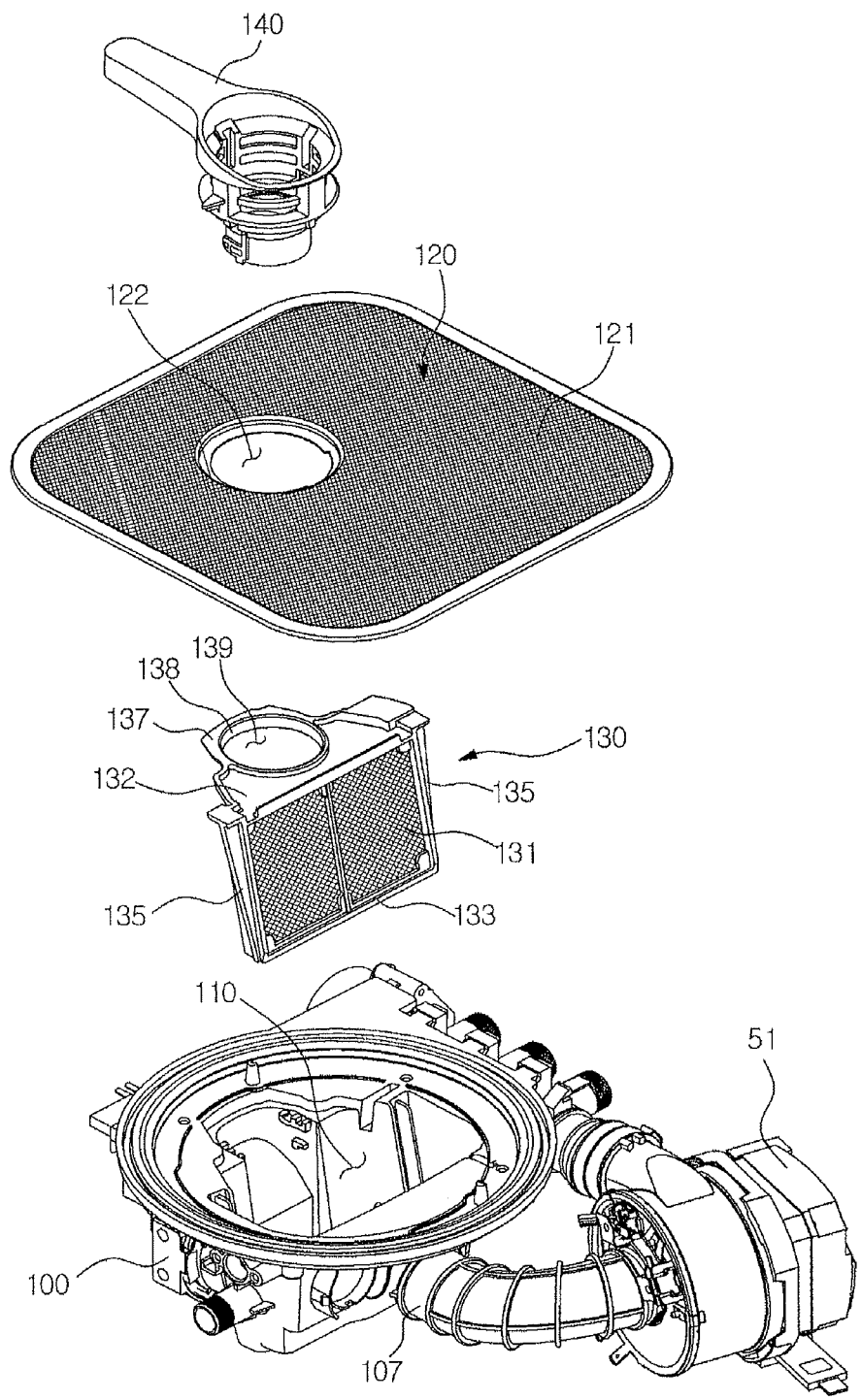
FIG. 37 is an exploded view of a sump, a coarse filter, a fine filter, and a micro filter of the dish washing machine of FIG. 1.
Figure 38:
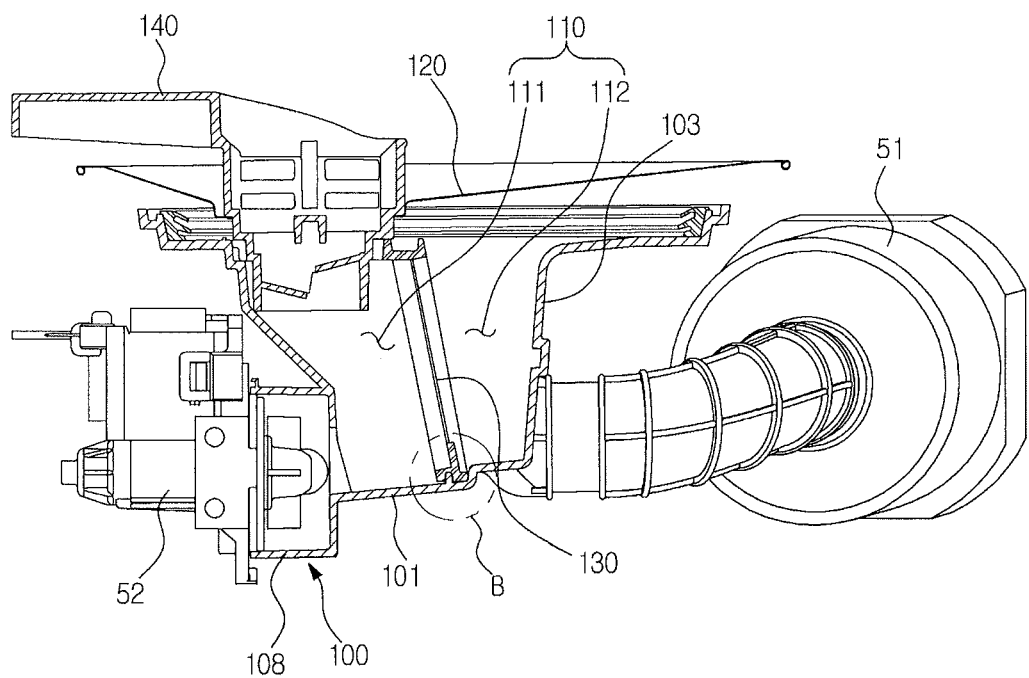
FIG. 38 is a cross-sectional view taken along line I-I of FIG. 36.
Figure 39:
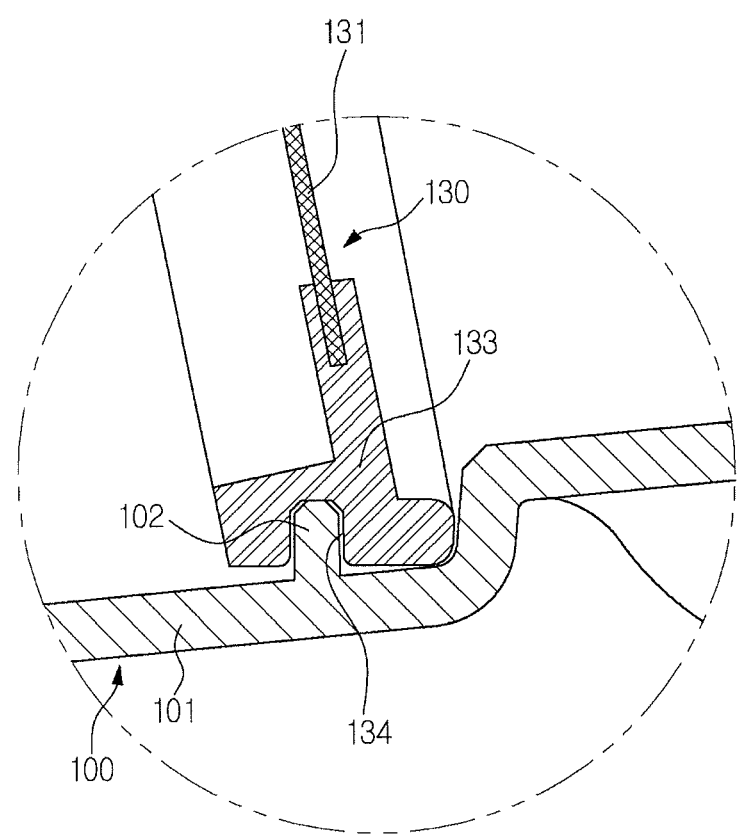
FIG. 39 is an exploded view of portion B of FIG. 38.
Figure 40:
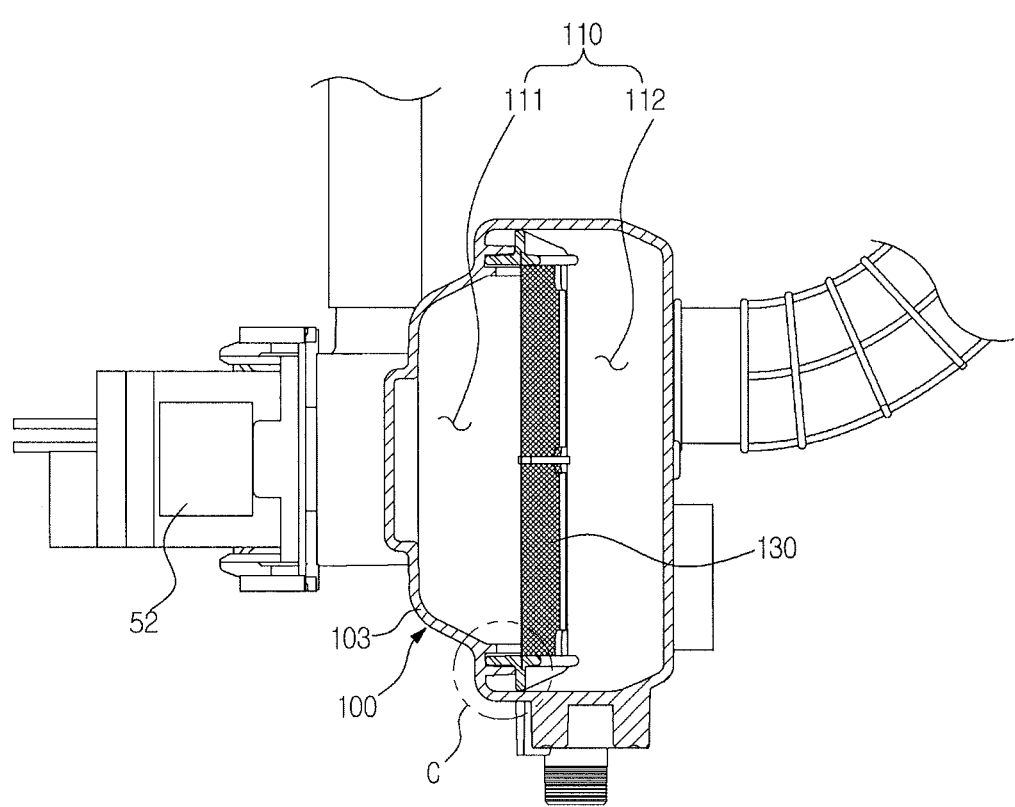
FIG. 40 is a cross-sectional view taken along line II-II of FIG. 38.
Figure 41:
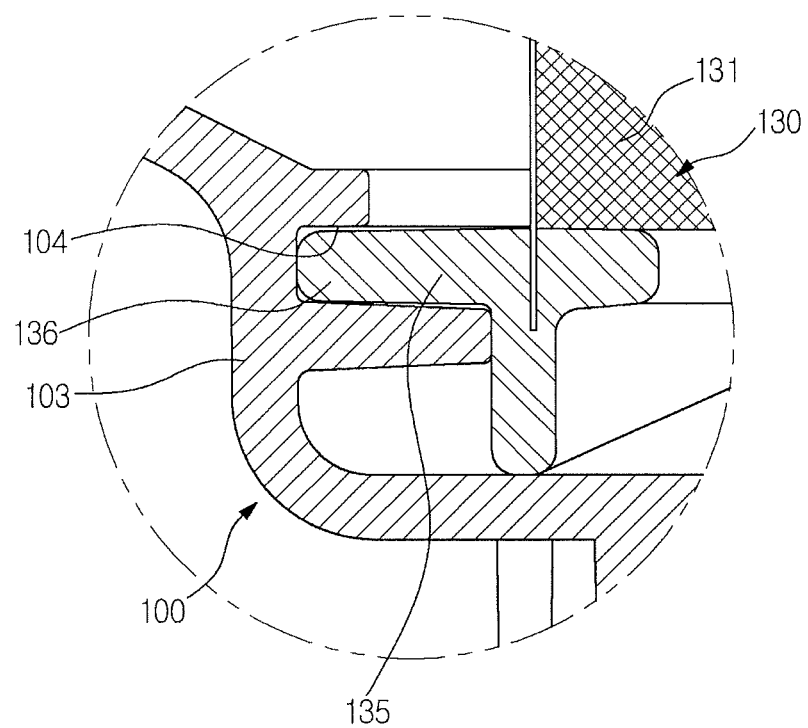
FIG. 41 is an exploded view of portion C of FIG. 40.
Figure 42:
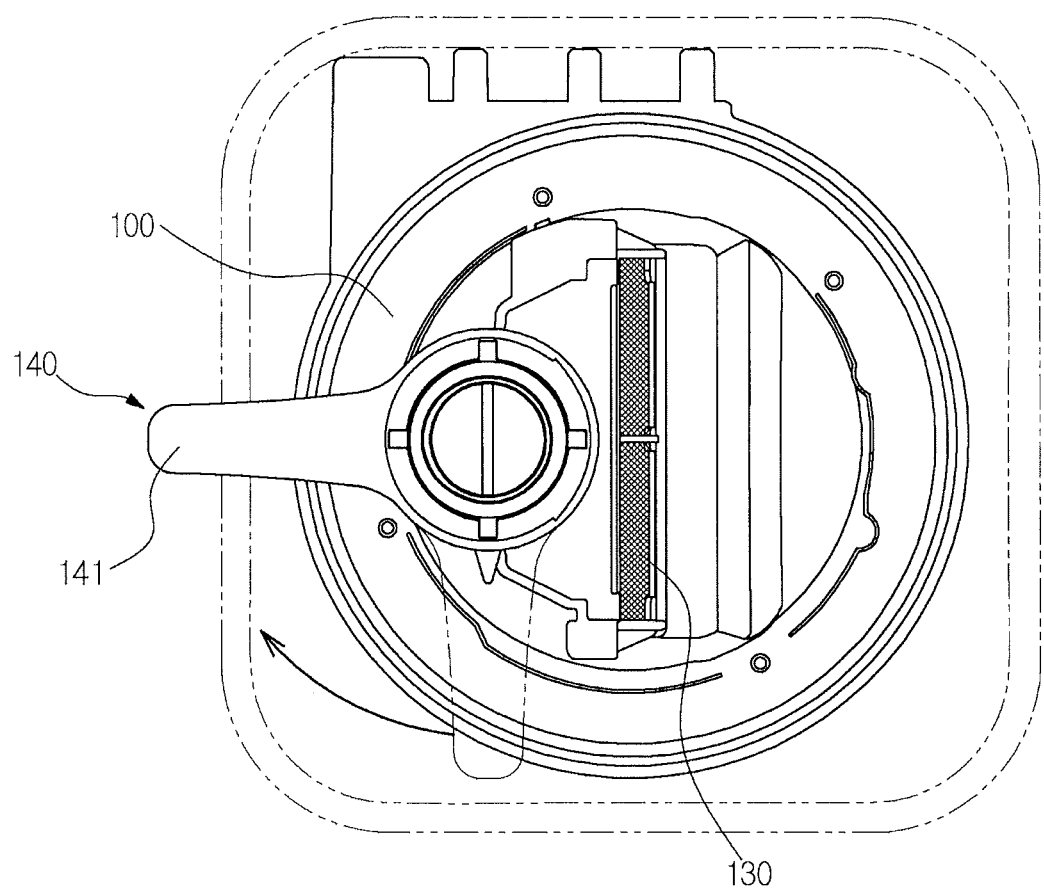
FIG. 42 is a plan view of the sump and the coarse filter of the dish washing machine of FIG. 1, which illustrates a locking operation of the coarse filter.
Figure 43:
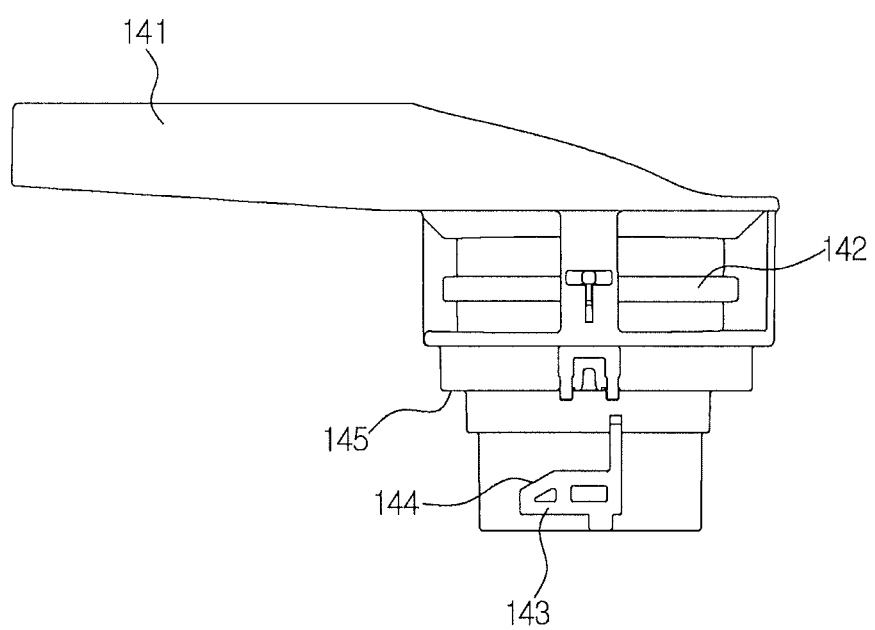
FIG. 43 is a side view of the coarse filter of the dish washing machine of FIG. 1.
Figure 44:
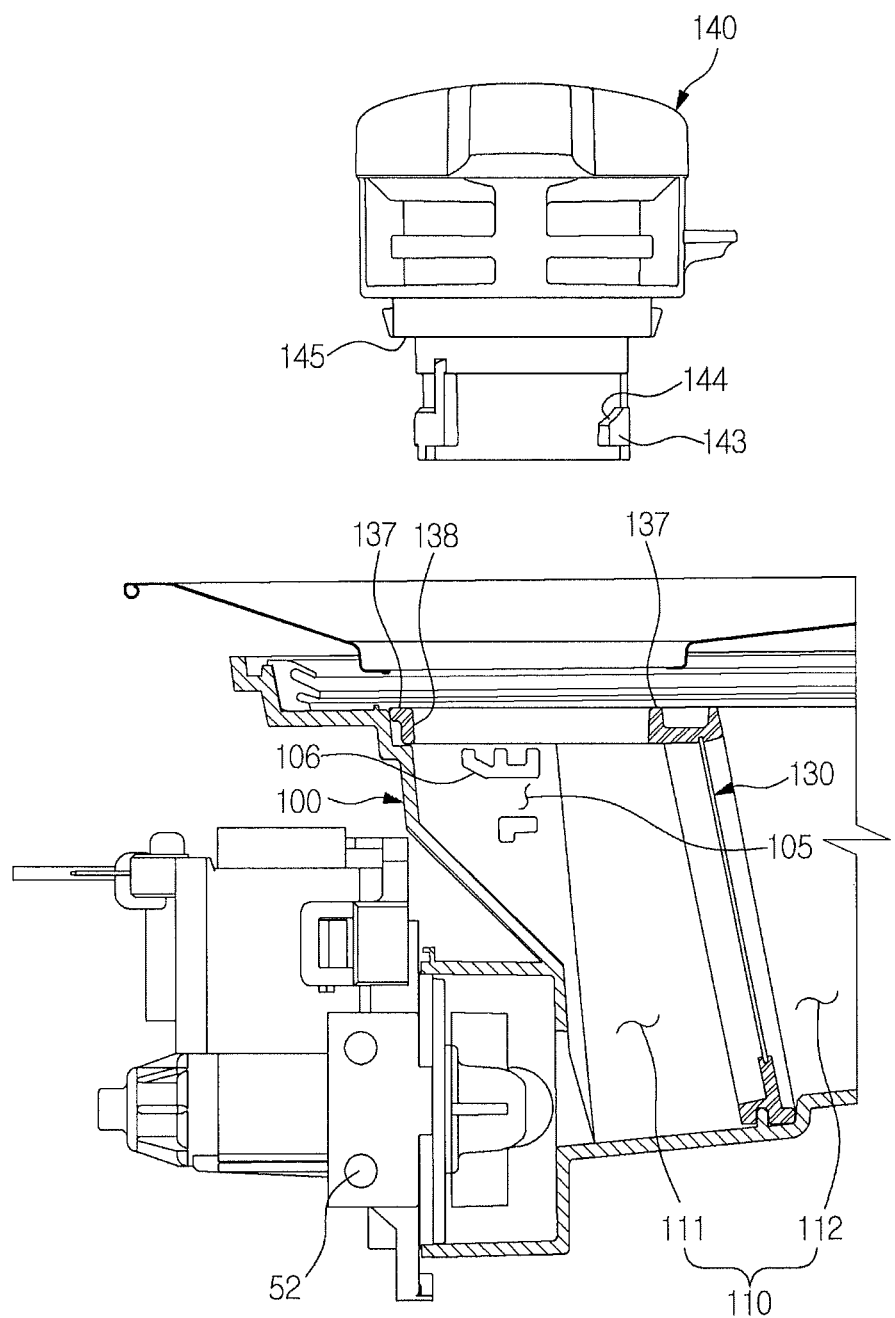
FIG. 44 is a view of the sump and the coarse filter of the dish washing machine of FIG. 1, which illustrates the locking operation of the coarse filter.
Figure 45:
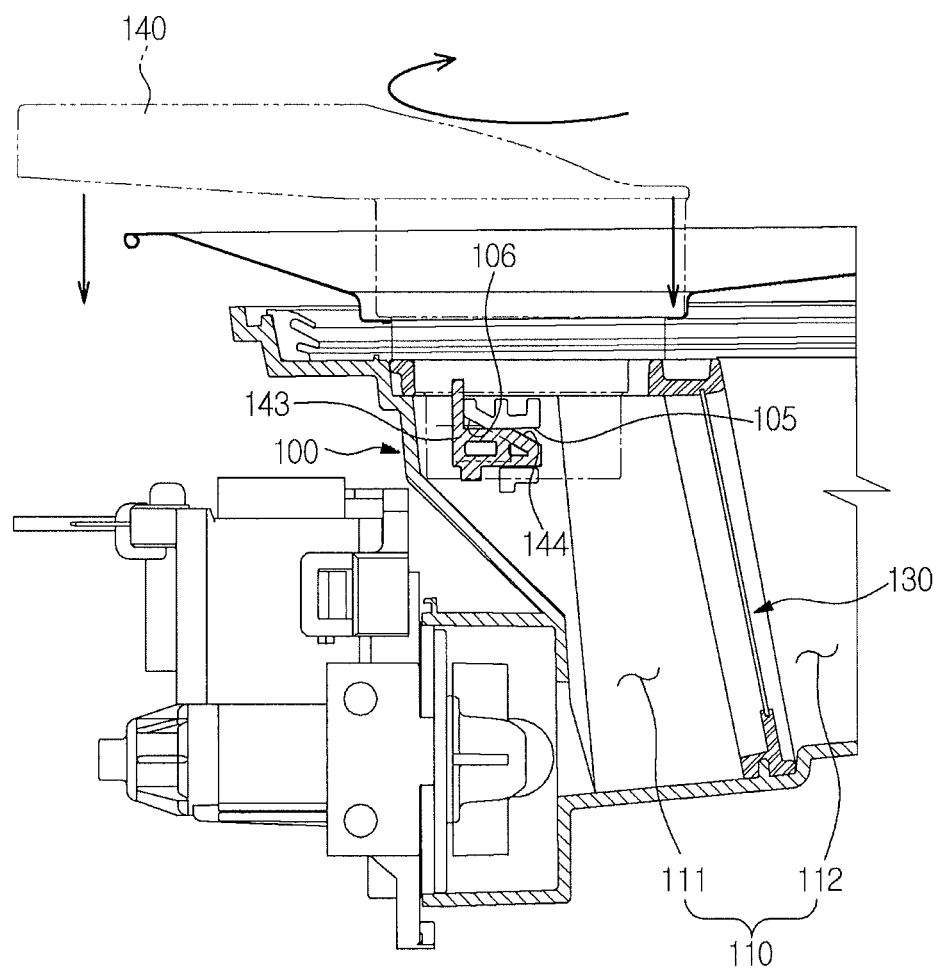
FIG. 45 is a cross-sectional view of the sump, the coarse filter, and a micro filter of the dish washing machine of FIG. 1.
Figure 46:
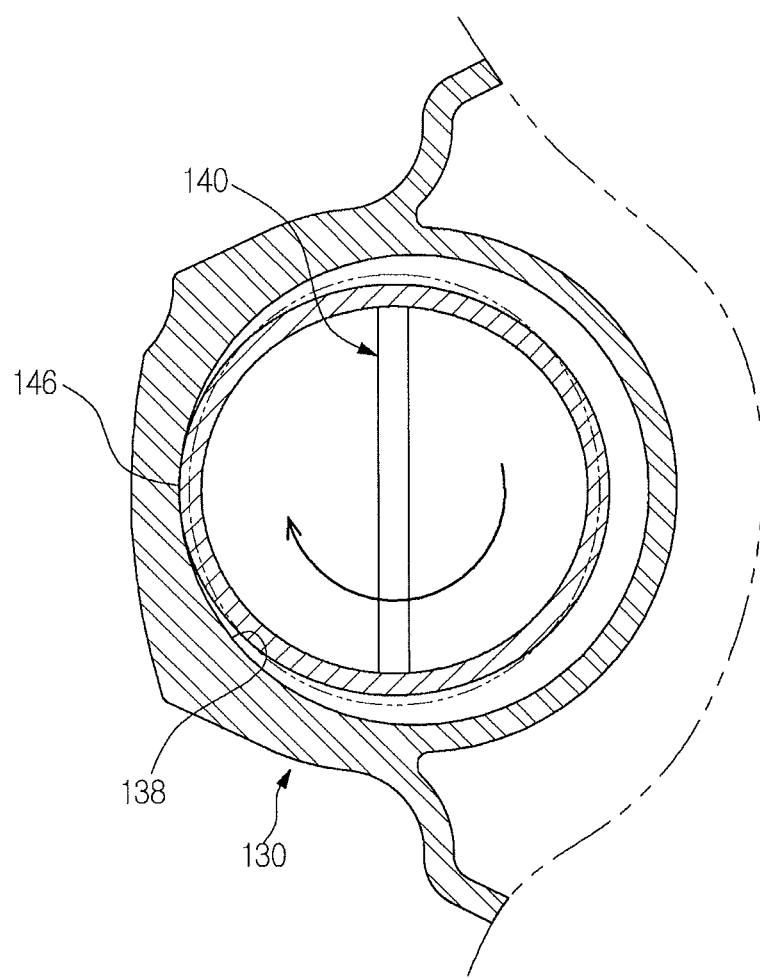
FIG. 46 is an exploded plan view of the coarse filter and a portion of the micro filter of the dish washing machine of FIG. 1.
Figure 47:
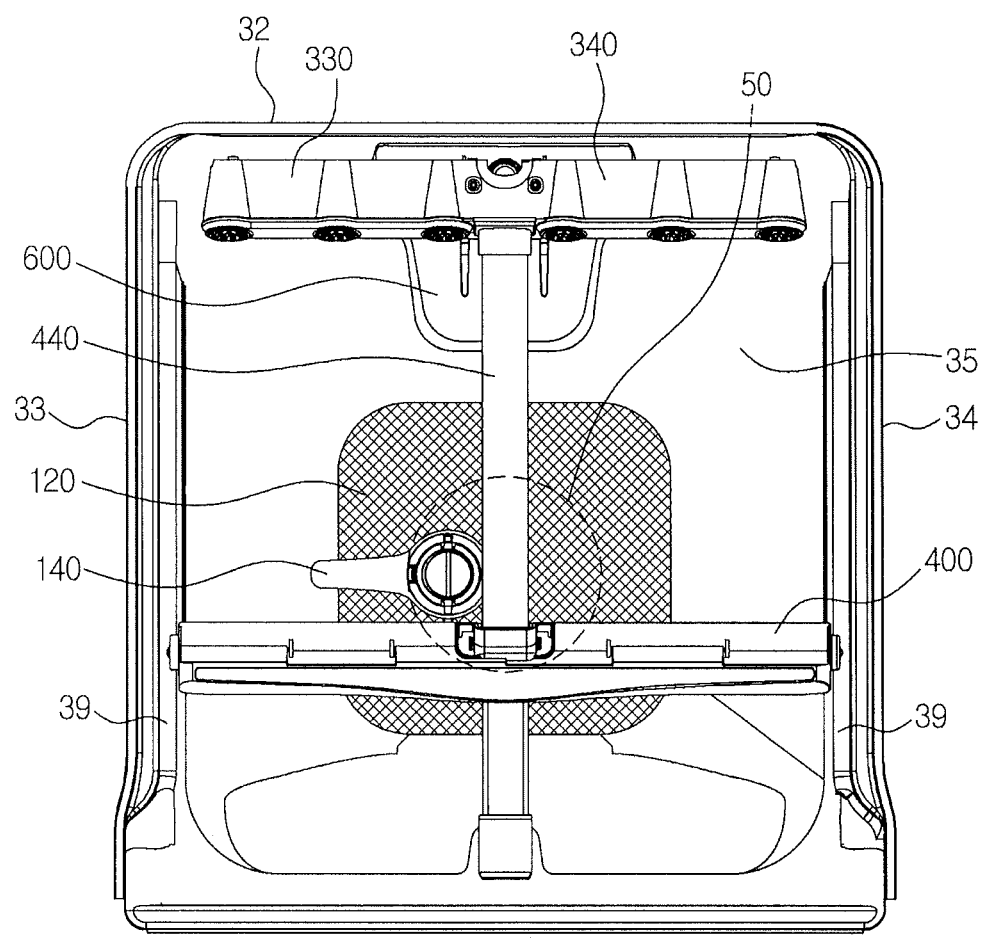
FIG. 47 is a plan view of a lower portion of a wash tank of the dish washing machine of FIG. 1.

FIG. 36 is a view illustrating a sump, a coarse filter, and a fine filter of the dish washing machine of FIG. 1. FIG. 37 is an exploded view of a sump, a coarse filter, a fine filter, and a micro filter of the dish washing machine of FIG. 1. FIG. 38 is a cross-sectional view taken along line I-I of FIG. 36. FIG. 39 is an exploded view of portion B of FIG. 38. FIG. 40 is a cross-sectional view taken along line II-II of FIG. 38. FIG. 41 is an exploded view of portion C of FIG. 40. FIG. 42 is a plan view of the sump and the coarse filter of the dish washing machine of FIG. 1, which illustrates a locking operation of the coarse filter. FIG. 43 is a side view of the coarse filter of the dish washing machine of FIG. 1. FIG. 44 is a view of the sump and the coarse filter of the dish washing machine of FIG. 1, which illustrates the locking operation of the coarse filter. FIG. 45 is a cross-sectional view of the sump, the coarse filter, and a micro filter of the dish washing machine of FIG. 1. FIG. 46 is an exploded plan view of the coarse filter and a portion of the micro filter of the dish washing machine of FIG. 1. FIG. 47 is a plan view of a lower portion of a wash tank of the dish washing machine of FIG. 1.

The dish washing machine 1 in accordance with an embodiment of the disclosure may include the sump 100 configured to store wash water, the circulation pump 51 configured to circulate wash water of the sump 100 into the spray nozzles 311,313,330 and 340, the drain pump 52 configured to drain the wash water of the sump 100 along with the debris (e.g., food, dirt, etc.) out of the main body 10, and filters 120, 130, and 140 configured to filter the debris (e.g., food, dirt, etc.) contained in the wash water.

A drainer (refer to 50 in FIG. 47) for draining wash water into the sump 100 is formed in the bottom plate 35 of the wash tank 30. The bottom plate 35 of the wash tank 30 may be inclined toward the drainer 50 such that wash water is guided toward the drainer 50 due to self-weight of the wash water (i.e., due to the force of gravity).

The sump 100 may have a hemispherical shape having a roughly or substantially open top surface. The sump 100 may include a bottom portion 101, a sidewall portion 103, a water storage chamber 110 formed on the bottom portion 101 and the sidewall portion 103 to store wash water, a circulation port 107 connected to the circulation pump 51, and a drain port 108 connected to the drain pump 52.

The filters 120, 130, and 140 may include a fine filter 120 mounted at the drainer 50 of the bottom plate 35, and a coarse filter 140 and a micro filter 130 mounted at the sump 100.

The coarse filter 140 may have a roughly cylindrical shape. The coarse filter 140 may be mounted in an inner side surface of the sidewall portion 103 of the sump 100.

The coarse filter 140 may have a filter unit 142 configured to filter debris (e.g., food, dirt, etc.) having a relatively large size and a handle 141 for mounting the coarse filter 140. The filter unit 142 of the coarse filter 140 may be formed at a circumferential surface of the coarse filter 140.

The coarse filter 140 may penetrate a through hole 139 of the micro filter 130 and a through hole 122 of the fine filter 120 and may be mounted on the sump 100. An upper portion of the coarse filter 140 may protrude into the wash tank 30, and a lower portion of the coarse filter 140 may protrude into a debris capturing chamber 111 of the sump 100. The debris capturing chamber 111 will be described below.

The fine filter 120 may have a filter unit 121 configured to filter debris (e.g., food, dirt, etc.) having a relatively medium size or larger, and a through hole 122 through which the coarse filter 140 passes. The fine filter 120 may be mounted on the drainer 50 of the bottom plate 35 of the wash tank 30 in a roughly horizontal direction. The fine filter 120 may be inclined such that wash water is guided toward the through hole 122 due to self-weight of the wash water (i.e., due to the force of gravity).

The wash water of the wash tank 30 may flow toward the coarse filter 140 along the inclined fine filter 120. However, some wash water and the debris (e.g., food, dirt, etc.) may pass through the filter unit 121 of the fine filter 120 and directly flow into the water storage chamber 110 of the sump 100.

The micro filter 130 may have a filter unit 131 configured to filter debris (e.g., food, dirt, etc.) having a relatively small size or larger and having a flat shape, frames 132, 133, and 135 configured to support the filter unit 131, and a through hole 139 through which the coarse filter 140 passes.

The frames 132, 133, and 135 may include an upper frame 132, a lower frame 133, and side frames 135. The micro filter 130 may be mounted on the sump 100 such that the lower frame 133 is closely adhered to the bottom portion 101 of the sump 100 and the side frames 135 are closely adhered to the sidewall portion 103 of the sump 100.

The micro filter 130 may divide the water storage chamber 110 of the sump 100 into the debris capturing chamber 111 and a circulation chamber 112. As shown in FIG. 38 for example, the debris capturing chamber 111 may be disposed closer to the drain pump 52 than the circulation chamber 112. The circulation chamber 111 may be disposed closer to the circulation pump 51 than the debris capturing chamber 111.

The drain pump 52 may be connected to the debris capturing chamber 111, and the circulation pump 51 may be connected to the circulation chamber 112.

As described above, since the lower portion of the coarse filter 140 is disposed or placed to protrude into the debris capturing chamber 111, wash water and the debris (e.g., food, dirt, etc.) contained in the wash water that have passed through the coarse filter 140 flow into the debris capturing chamber 111.

The wash water that has flowed into the debris capturing chamber 111 may pass through the micro filter 130 and flow into the circulation chamber 112. However, since the debris (e.g., food, dirt, etc.) contained in the wash water, which has flowed in the debris capturing chamber 111, may not pass through the micro filter 130, the debris (e.g., food, dirt, etc.) may not flow into the circulation chamber 112 but remains in the dirt capturing chamber 111.

The debris (e.g., food, dirt, etc.) captured in the dirt capturing chamber 111 may be drained along with the wash water out of the main body 10 when the drain pump 52 is driven.

Meanwhile, the micro filter 130 may be closely adhered to the bottom portion 101 and the sidewall portion 103 of the sump 100 to prevent the debris (e.g., food, dirt, etc.) of the dirt capturing chamber 111 from flowing through a gap between the micro filter 130 and the sump 100 into the circulation chamber 112.

To this end, a lower sealing groove 134 may be formed in the lower frame 133 of the micro filter 130, and a side sealing protrusion 136 may be formed on the side frame 135 such that it protrudes toward sidewall portion 103. To correspond to the lower sealing groove 134 and the side sealing protrusion 136, a lower sealing protrusion 102 may be formed on the bottom portion 101 of the sump 100 and inserted into the lower sealing groove 134, and a side sealing groove 104 into which the side sealing protrusion 136 is inserted may be formed in the sidewall portion 103 of the sump 100.

Sealing between the micro filter 130 and the sump 100 may be reinforced by using the lower sealing protrusion 102 and side sealing protrusion 136 and the lower sealing groove 134 and the side sealing groove 103.

Meanwhile, after the coarse filter 140 is inserted into the sump 100 vertically downward, the coarse filter 140 may be rotated from an unlocking position to a locking position and mounted on the sump 100.

To this end, a mounting protrusion 143 may be formed on an outer circumferential surface of the coarse filter 140, and a mounting groove 105 may be formed in an inner side surface of the sidewall portion 103 of the sump 100. When the coarse filter 140 rotates from the unlocking position to the locking position, the mounting protrusion 143 may be inserted into the mounting groove 105 in a horizontal direction.

The mounting protrusion 143 may have an upward inclined surface 144, which is inclined upward along a direction in which the coarse filter 140 rotates from the unlocking position to the locking position. The mounting groove 105 may have a downward inclined surface 106, which is inclined along a direction in which the coarse filter 140 rotates from the unlocking position to the locking position.

Due to the above-described structure, when the coarse filter 140 rotates from the unlocking position to the locking position, the coarse filter 140 may move downward while the upward inclined surface 144 of the mounting protrusion 143 is sliding on the downward inclined surface 106 of the mounting groove 105.

When the coarse filter 140 rotates from the unlocking position to the locking position, the coarse filter 140 may apply pressure to the micro filter 130 downward while moving downward. To this end, the coarse filter 140 may have a downward pressure surface 145 that is horizontally formed to apply pressure to the micro filter 130 downward. The micro filter 130 may have a downward corresponding surface 137 that is horizontally formed (e.g., on a portion of the upper frame 132) and to which pressure is applied by the downward pressure surface 145.

Thus, when the coarse filter 140 rotates from the unlocking position to the locking position, the coarse filter 140 applies pressure to the micro filter 130 downward, thereby reinforcing sealing between the lower frame 133 of the micro filter 130 and the bottom portion 101 of the sump 100 and preventing the micro filter 130 from coming off.

Furthermore, the coarse filter 140 may have a lateral pressure surface 146, which is formed by expanding a portion of the outer circumferential surface of the coarse filter 140 outward from a radial direction. When the coarse filter 140 rotates from the unlocking position to the locking position, the lateral pressure surface 146 may apply pressure to the micro filter 130 sideward. That is, the coarse filter 140 may have a swelling shape or an elliptical shape.

The micro filter 130 may have a lateral corresponding surface 138 to which pressure is applied by the lateral pressure surface 146 sideward. For example, lateral corresponding surface 138 may be disposed as or correspond to an inner wall of the upper frame 132 which forms through hole 139.

Due to the above-described structure, when the coarse filter 140 rotates from the unlocking position to the locking position, pressure is applied to the micro filter 130 sideward, thereby further reinforcing sealing between the side frame 135 of the micro filter 130 and the sidewall portion 130 of the sump 100.

Meanwhile, as shown in FIG. 47, the coarse filter 140 may be disposed to lean toward one of the both sidewalls 33 and 34 of the wash tank 30. For example, the coarse filter 140 may be disposed closer to the left wall 33 than to the right wall 34. Alternatively, the coarse filter 140 may be disposed closer to the right wall 34 than to the left wall 33. Also, the coarse filter 140 may additionally, or alternatively, be disposed closer to the rear wall 32 than to the door, or vice versa. By disposing the coarse filter 140, the coarse filter 140 may not be interfered with the rail 440 but may be easily separated.

Figure 48:
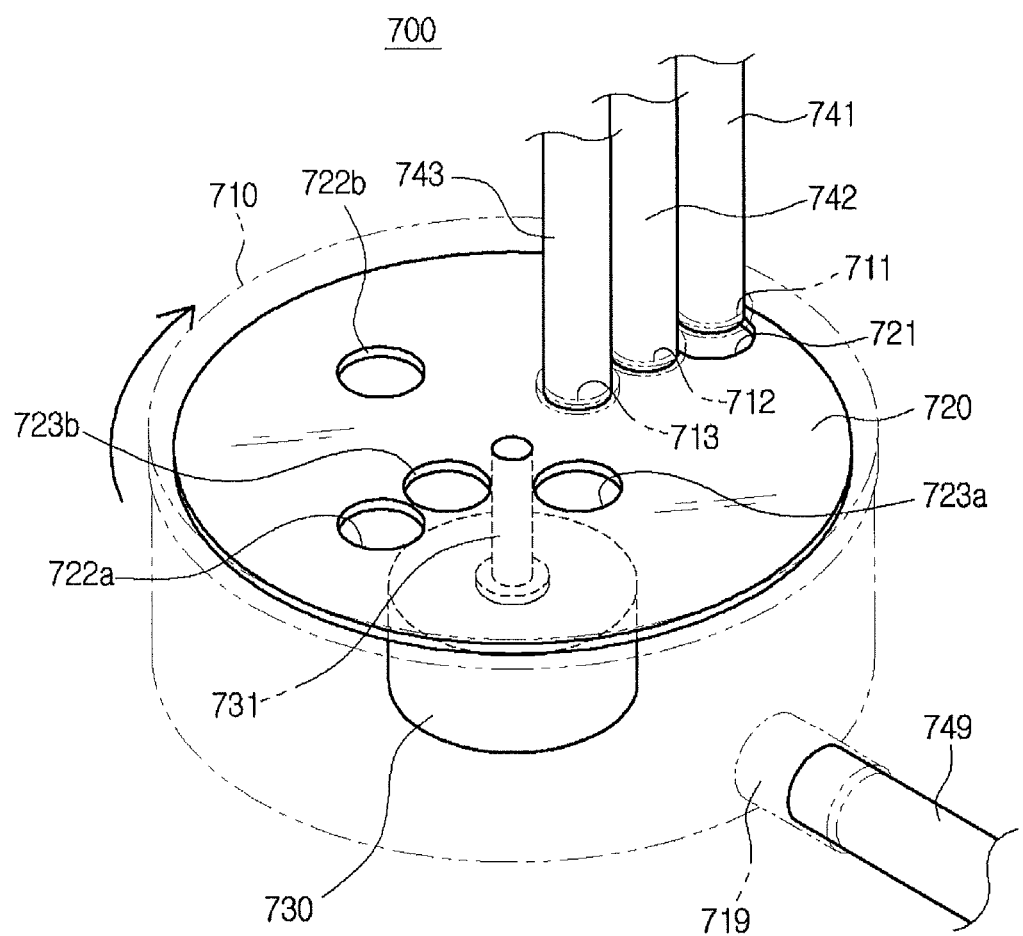
FIG. 48 is a perspective view of a distribution device in accordance with an embodiment of the disclosure.
Figure 49:
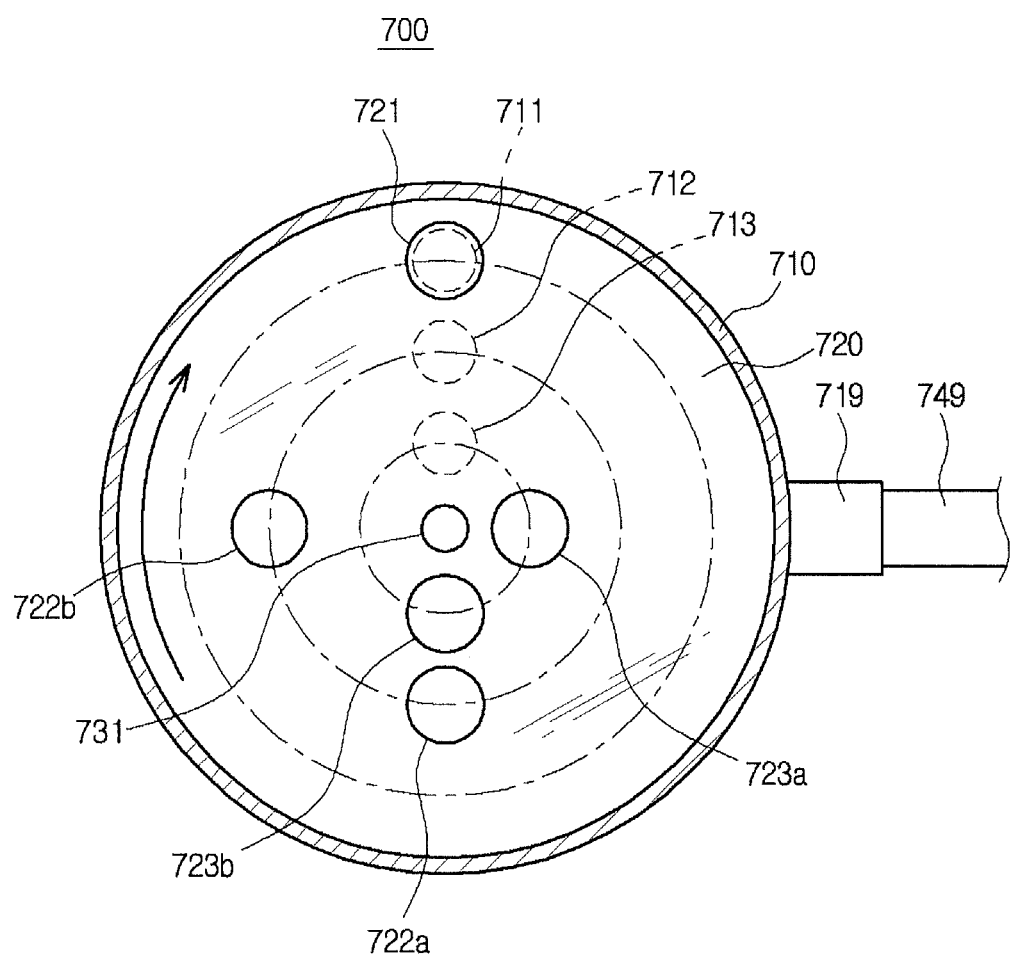
FIG. 49 is a plan view illustrating operations of the distribution device of FIG. 48.

FIG. 48 is a perspective view of a distribution device in accordance with a second embodiment of the disclosure. FIG. 49 is a plan view illustrating operations of the distribution device of FIG. 48.

A distribution device in accordance with an embodiment of the disclosure will be described with reference to FIGS. 48 and 49. The same reference numerals are used to denote the same elements, and descriptions for elements or features which have previously been described may be omitted.

A distribution device 700 may distribute wash water pumped by the circulation pump (refer to 51 in FIG. 3) into upper rotation nozzles (refer to 311 and 312 in FIG. 3), a lower left fixing nozzle 330, and a lower right fixing nozzle 340.

The distribution device 700 may include a roughly cylindrical housing 710, an opening/closing member 720 rotatably disposed or placed within the housing 710, and a motor 730 configured to generate rotary power to rotate the opening/closing member 720.

A plurality of outlets 711, 712, and 713 may be formed in any one of a top surface or bottom surface of the housing 710, that is, in an axial direction of the housing 710. The plurality of outlets 711, 712, and 713 may include a first outlet 711, a second outlet 712, and a third outlet 713. The first outlet 711, the second outlet 712, and the third outlet 713 may be arranged in a radial direction.

The first outlet 711 may be connected to a first hose 741 and supply wash water to the upper rotation nozzles 311 and 312. The second outlet 712 may be connected to the second hose 742 and supply wash water to the lower left fixing nozzle 330. The third outlet 713 may be connected to the third hose 743 and supply wash water to the lower right fixing nozzle 340.

An inlet 719 may be formed in a circumferential surface of the housing 710. An inlet hose 749 to which the circulation pump 51 is connected may be connected to the inlet 719.

The opening/closing member 720 may have a roughly disk shape. The opening/closing member 720 may be closely adhered to the top surface of the housing 710 in which the outlets 711, 712, and 713 are formed. The outlets 711, 712, and 713 may be turned on and off by rotating the opening/closing member 720. The opening/closing member 720 may rotate about an axial direction of the housing 710.

To this end, the opening/closing member 720 may include a first communication hole 721, second communication holes 722a and 722b, and third communication holes 723a and 723b respectively corresponding to the first outlet 711, the second outlet 712, and the third outlet 713. For example, third outlet 713 may be disposed closest to the center of the top surface of the opening/closing member 720, first outlet 711 may be disposed the farthest from the center of the top surface of the opening/closing member 720, and the second outlet 712 may be disposed between the first outlet 711 and the third outlet 713. However, the disclosure is not so limited and the outlets may be differently arranged. Also, as shown in FIG. 48, the outlets are aligned in a radial direction. However, alternatively, some or all of the outlets may be disposed such that the outlets are not all aligned in a same radial direction. Also, each of the outlets may have the same or may have different diameters.

Accordingly, when the opening/closing member 720 rotates and stops at a position in which a communication hole and an outlet face each other, the corresponding outlet is opened.

Referring to FIG. 49, since the first communication hole 721 of the opening/closing member 720 is in a position corresponding to the first outlet 711 of the housing 710 in a state shown in FIG. 49, the first outlet 711 is opened, and wash water may be supplied to the upper rotation nozzles 311 and 312.

In this state, when the opening/closing member 720 rotates by a predetermined angle in a clockwise or counterclockwise direction (e.g., about 90° clockwise), the second communication hole 722b of the opening/closing member 720 is in a position corresponding to the second outlet 712 of the housing 710. Thus, the second outlet 712 is opened, and wash water may be supplied to the lower left fixing nozzle 330.

In this state, when the opening/closing member 720 further rotates by a predetermined angle in a clockwise or counterclockwise direction (e.g., about 90° clockwise), the second communication hole 722a and the third communication hole 723b of the opening/closing member 720 are respectively in positions corresponding to the second outlet 712 and the third outlet 713 of the housing 710. Thus, the second outlet 712 and the third outlet 713 are opened so that wash water may be supplied to the lower left fixing nozzle 330 and the right lower fixing nozzle 340.

In this state, when the opening/closing member 720 further rotates by a predetermined angle in a clockwise or counterclockwise direction (e.g., about 90° clockwise), the third communication hole 723a of the opening/closing member 720 is in a position corresponding to the third outlet 713 of the housing 710. Thus, the third outlet 713 is opened so that wash water may be supplied to the lower right fixing nozzle 340. As would be understood by one of ordinary skill in the art, degrees of rotation of the opening/closing member 720 may vary, and may depend on the number of states or distribution combinations, number of outlets, etc.

As described above, the distribution device in accordance with example embodiments disclosed herein may be structured such that outlets are formed in a circumferential surface of a housing, that is, in a radial direction of the housing, while the distribution device in accordance with the embodiment as discussed above with respect to FIGS. 48 and 49 may be structured such that outlets are formed in a top surface or bottom surface of a housing, that is, in an axial direction.

Reference numeral 731 denotes a rotation axis of the motor 730. For example, the rotation axis 731 of the motor 730 may correspond to a center of the top surface of the housing 710 and/or opening/closing member 720.

Figure 50:
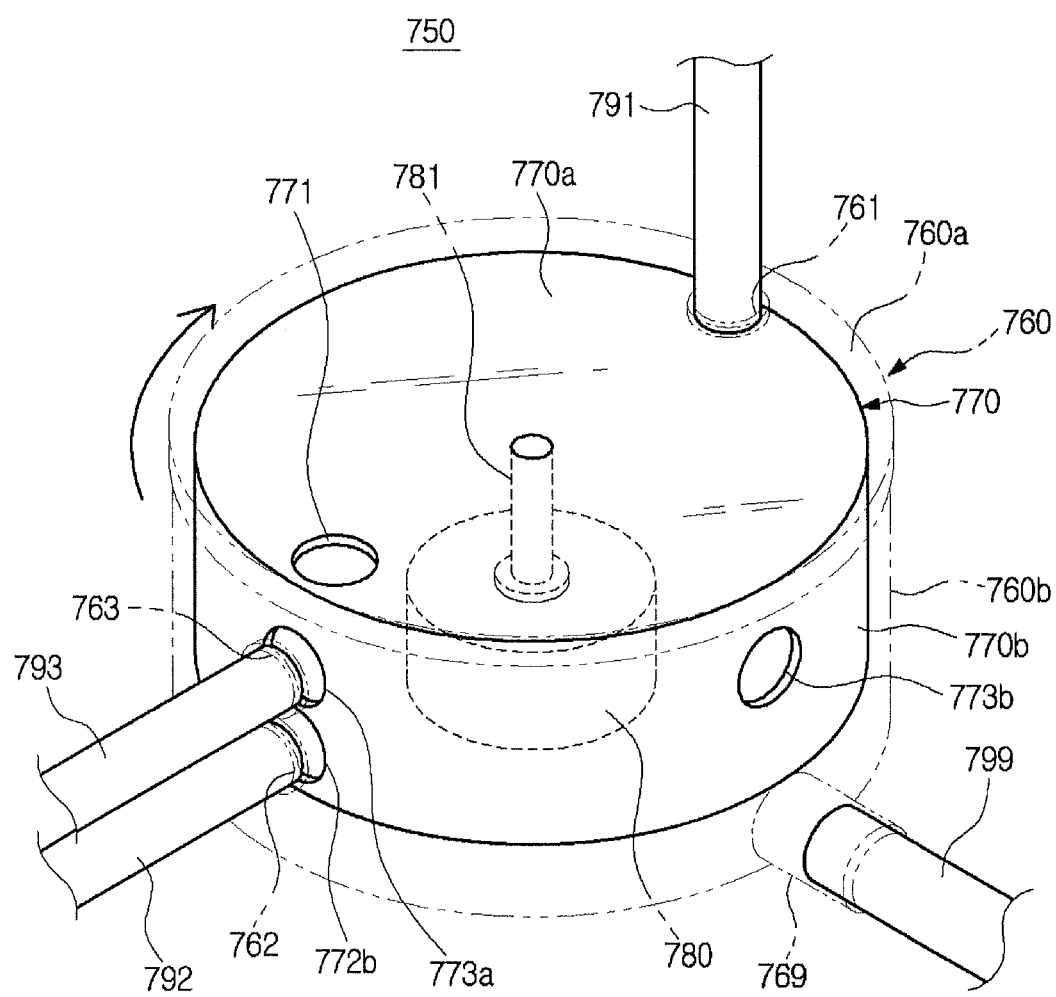
FIG. 50 is a perspective view of a distribution device in accordance with an embodiment of the disclosure.
Figure 51:
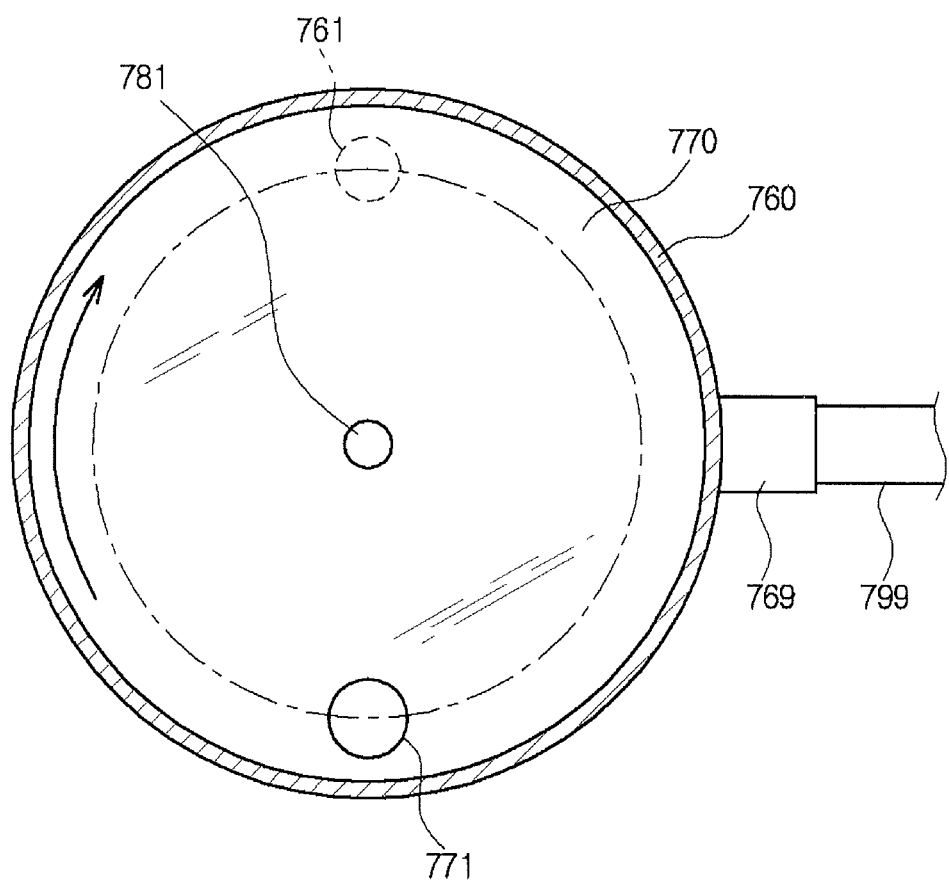
FIG. 51 is a plan view illustrating operations of the distribution device of FIG. 50.
Figure 52:
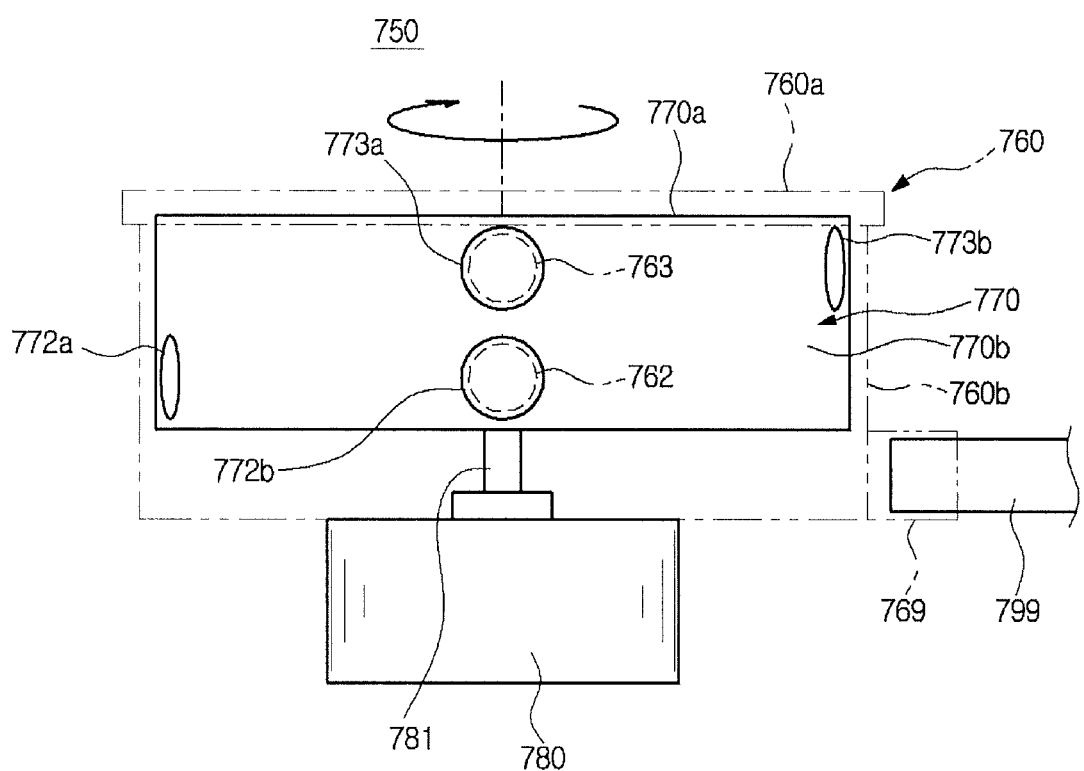
FIG. 52 is a side view illustrating operations of the distribution device of FIG. 50.
Figure 53:
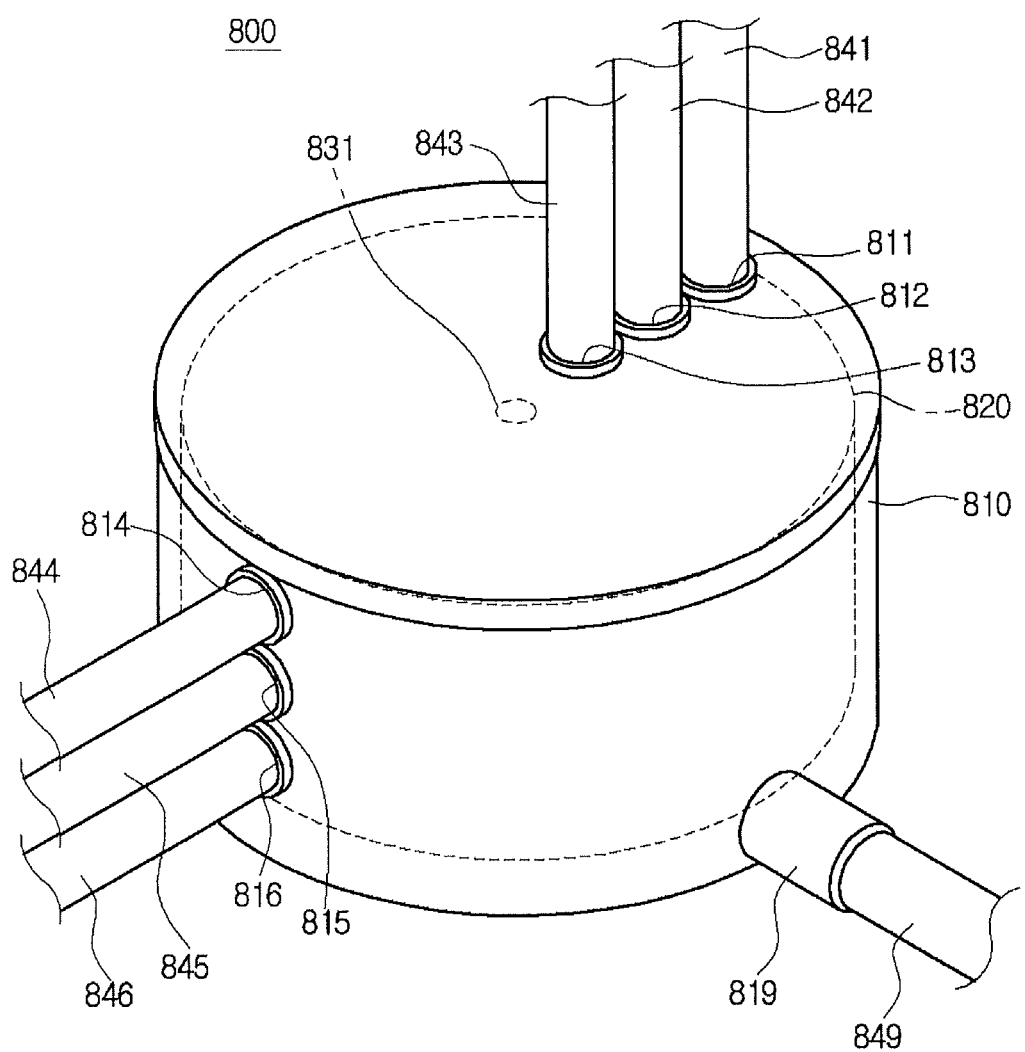
FIG. 53 is a perspective view of a distribution device in accordance with an embodiment of the disclosure.

FIG. 50 is a perspective view of a distribution device in accordance with an embodiment of the disclosure. FIG. 51 is a plan view illustrating operations of the distribution device of FIG. 50. FIG. 52 is a side view illustrating operations of the distribution device of FIG. 50. FIG. 53 is a perspective view of a distribution device in accordance with an embodiment of the disclosure.

A distribution device in accordance with the disclosure will be described with reference to FIGS. 50 through 52. The same reference numerals are used to denote the same elements, and descriptions for elements or features which have previously been described may be omitted.

A distribution device 750 distributes wash water pumped by the circulation pump (refer to 51 in FIG. 3) into the upper rotation nozzles (refer to 311 and 312 in FIG. 3), the lower left fixing nozzle 330, and the lower right fixing nozzle 340.

The distribution device 750 may include a roughly cylindrical housing 760, an opening/closing member 770 rotatably disposed or placed within the housing 760, and a motor 780 configured to generate rotary power to rotate the opening/closing member 770. Reference numeral 781 denotes a rotation axis of the motor 780. For example, the rotation axis 781 of the motor 780 may correspond to a center of the top surface of the housing 760 and/or opening/closing member 770.

A first outlet 761 may be formed in any one 760a of a top surface or a bottom surface of the housing 760, that is, in an axial direction of the housing 760, and a second outlet 762 and a third outlet 763 may be formed in a circumferential surface 760b of the housing 760, that is, in a radial direction of the housing 760. The first outlet 761 may be an axial outlet, and the second outlet 762 and the third outlet 763 may be radial outlets.

The first outlet 761 may be connected to a first hose 791 and supply wash water to the upper rotation nozzles 311 and

312. The second outlet 762 may be connected to the second hose 792 and supply wash water to the lower left fixing nozzle 330. The third outlet 763 may be connected to the third hose 793 and supply wash water to the lower right fixing nozzle 340. As shown in FIG. 50, second outlet 762 and third outlet 763 may be vertically arranged with respect to one another such that they are aligned vertically in an axial direction. However, the disclosure is not so limited and the second outlet 762 and third outlet 763 may be vertically arranged with respect to one another such that they are not aligned vertically in an axial direction and are disposed at different positions of the circumferential surface 760b in the circumferential direction.

An inlet 769 may be formed in the circumferential surface of the housing 760. An inlet hose 799 to which the circulation pump 51 is connected may be connected to the inlet 769.

The opening/closing member 770 may have a roughly cylindrical shape like the housing 760. The opening/closing member 770 may include an axial opening/closing unit 770a configured to open and close the first outlet 761, which is the axial outlet, and a radial opening/closing unit 770b configured to open and close the second and third outlets 762 and 763, which are radial outlets. The axial opening/closing unit 770a and the radial opening/closing unit 770b may be disposed vertical to each other and integrated. The opening/closing member 770 rotates about an axial direction of the housing 760.

The axial opening/closing unit 770a may have a first communication hole 771 corresponding to the first outlet 761. The radial opening/closing unit 770b may have second communication holes 772a and 772b and third communication holes 773a and 773b respectively corresponding to the second outlet 762 and the third outlet 763.

Accordingly, when the opening/closing member 770 rotates and stops at a position in which a communication hole and an outlet face each other, the corresponding outlet is opened.

As described above, example embodiments describe a structure in which outlets are formed in a radial direction of a housing, and example embodiments describe a structure in which outlets are formed in an axial direction of a housing. By comparison, the example embodiments shown in FIGS. 50 to 52 disclose a structure in which outlets are formed both in a radial direction of a housing and in an axial direction thereof.

Because outlets may be formed in both the radial direction and axial direction of the housing, a larger number of outlets may be disposed or placed compared to embodiments in which outlets are only disposed in an axial direction or only in a radial direction of the housing. Thus, even if a larger number of spray nozzles are disposed or placed, wash water may be distributed, and a larger number of combinations of distribution may be made.

As an example, as shown in FIG. 53, a distribution device 800 may have a housing 810 and an opening/closing member 820 rotatably disposed or placed within the housing 810, and the housing 810 may have a first outlet 811, a second outlet 812, and a third outlet 813 formed in an axial direction, and a fourth outlet 814, a fifth outlet 815, and a sixth outlet 816 formed in a radial direction.

As shown, the first to third outlets 811, 812, and 813, which are axial outlets, may be arranged in the radial direction, and the fourth to sixth outlets 814, 815, and 816, which are radial outlets, may be arranged in the axial direction. Thus, the outlets 811, 812, 813, 814, 815 and 816 may be opened and closed independent of one another.

Accordingly, various combinations of distribution may be made. As shown in FIG. 53, outlets 814, 815, and 816 may be vertically arranged with respect to one another such that they are aligned vertically in an axial direction. However, the disclosure is not so limited and the outlets 814, 815, and 816 may be vertically arranged with respect to one another such that they are not aligned vertically in an axial direction and are disposed at different positions of the circumferential surface in the circumferential direction of the housing 810 and/or opening/closing member 820. Likewise, outlets 811, 812, and 813 may be horizontally arranged with respect to one another such that they are aligned horizontally in a radial direction. However, the disclosure is not so limited and the outlets 811, 812, and 813 may be horizontally arranged with respect to one another such that they are not aligned horizontally in a radial direction and are disposed at different positions of the top surface in the radial direction of the housing 810 and/or opening/closing member 820.

The outlets 811, 812, 813, 814, 815, and 816 may be respectively connected to hoses 841, 842, 843, 844, 845, and 846 and supply wash water to separate spray nozzles (not shown). The distribution device 800 may distribute wash water to a larger number of spray nozzles. Communication holes (not shown) may be disposed or placed on the top surface and/or circumferential surface of the housing 810 and/or opening/closing member 820 as appropriate according to the number of outlets and/or desired number of distribution modes and combinations.

Reference numeral 831 denotes a rotation axis of a motor (not shown), 819 denotes an inlet, and 849 denotes an inlet hose. The motor of the distribution device 800 may be disposed or placed in a manner similar to the example embodiments disclosed herein.

Figure 54:
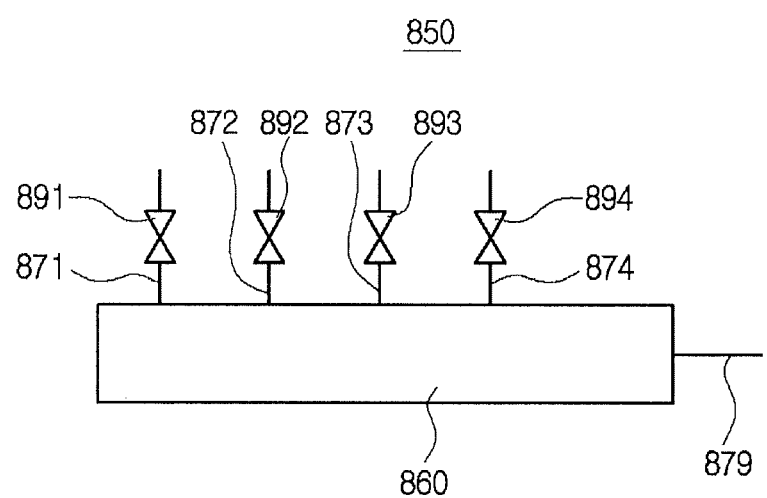
FIG. 54 is a conceptual diagram of a distribution device in accordance with an embodiment of the disclosure.
Figure 55:
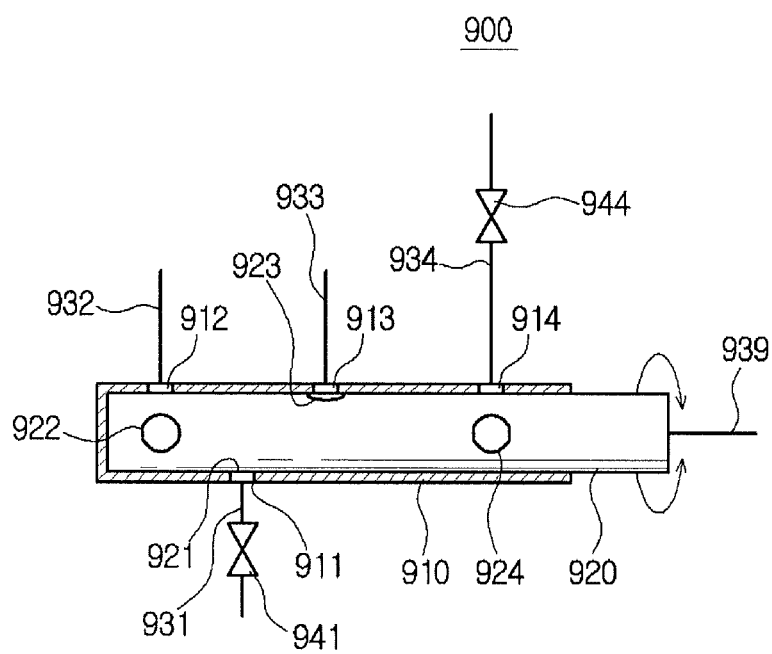
FIG. 55 is a conceptual diagram of a distribution device in accordance with an embodiment of the disclosure.

FIG. 54 is a conceptual diagram of a distribution device in accordance with an embodiment of the disclosure. FIG. 55 is a conceptual diagram of a distribution device in accordance with an embodiment of the disclosure.

Distribution devices will be described with reference to FIGS. 54 and 55. The same reference numerals are used to denote the same elements, and descriptions of elements or features which have been previously described may be omitted.

A distribution device 850 may include a distribution body 860, an inflow path 879, outflow paths 871, 872, 873, and 874, and distribution valves 891, 892, 893, and 894 respectively disposed or placed at the outflow paths 871, 872, 873, and 874 to open and close the outflow paths 871, 872, 873, and 874.

Here, each of the distribution valves 891, 892, 893, and 894 may be a typical opening/closing valve that has an independent driving source and operates independently. As an example, each of the distribution valves 891, 892, 893, and 894 may be a solenoid valve using electromagnetic force of a coil, a ball valve, or a butterfly valve.

The distribution device 850 may easily make various combinations of distribution by using independent opening/closing operations of the distribution valves 891, 892, 893, and 894.

Meanwhile, a distribution device may be configured or arranged by combining a distribution device having a rotatable opening/closing member with distribution valves that operate independently.

As shown in FIG. 55, a distribution device 900 may include a housing 910 having a plurality of outlets 911, 912, 913, and 914, an opening/closing member 920 rotatably disposed or placed within the housing 910 to open and close the outlets 911, 912, 913, and 914, an inflow path 939, outflow paths 931, 932, 933, and 934 connected to the outlets 911, 912, 913, and 914, and distribution valves 941 and 944 disposed or placed on the outflow paths 931 and 934 to open and close the outflow paths 931 and 934.

The opening/closing member 920 may have communication holes 921, 922, 923, and 924 that rotate about an axial direction of the housing 910 and correspond to the outlets 911, 912, 913, and 914.

In accordance with an aspect of the disclosure, outlets may be formed in a radial direction of the housing 910, but the disclosure is not limited thereto and outlets may be formed in an axial direction of the housing 910.

In accordance with an aspect of the disclosure, the distribution valves 941 and 944 may be disposed or placed only on the outflow paths 931 and 934. However, distribution valves may be naturally disposed or placed in other outflow paths. For example, only one path or more than two paths may include distribution valves, and the example embodiment of FIG. 55 is merely an example. Each of the distribution valves 941 and 944 may be a typical opening/closing valve that has an independent driving source and operates independently.

Figure 56:
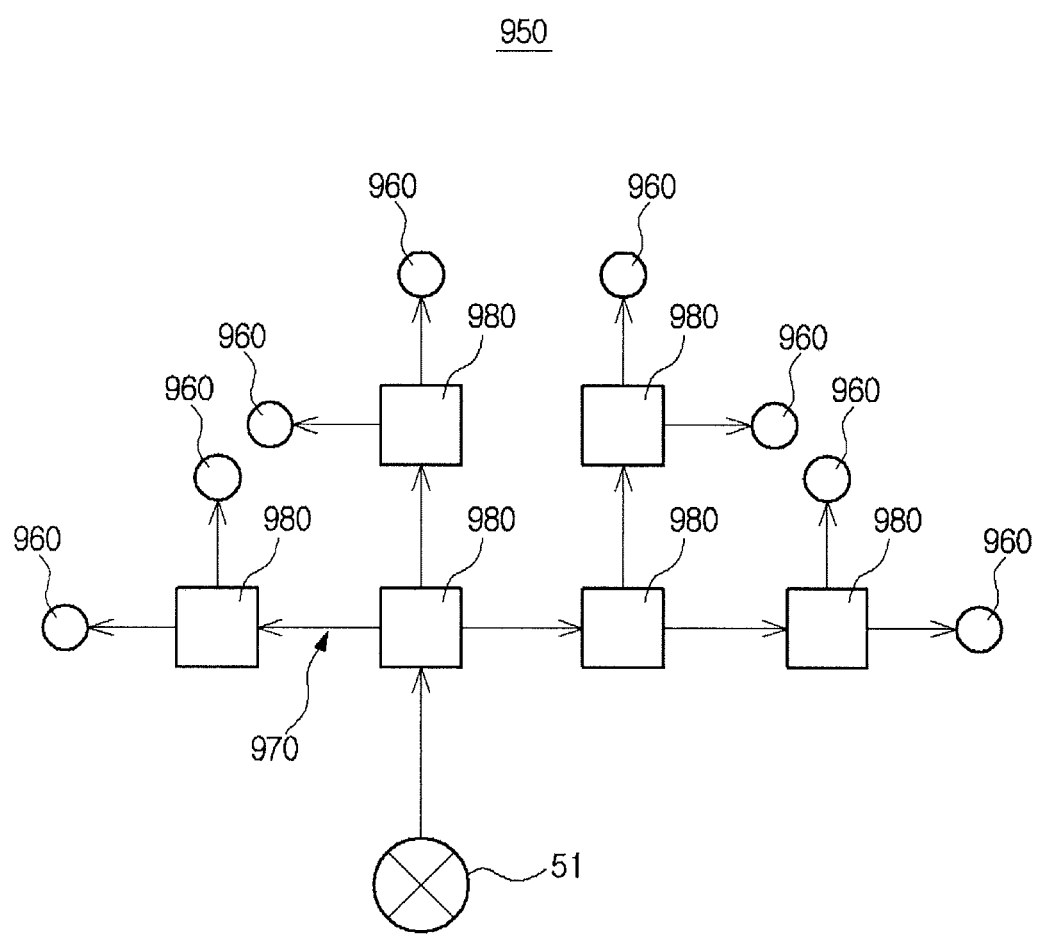
FIG. 56 is a conceptual diagram of a wash water distribution system in accordance with an embodiment of the disclosure.

FIG. 56 is a conceptual diagram of a wash water distribution system in accordance with an embodiment of the disclosure.

Referring to FIG. 56, a dish washing machine may have a wash water distribution system capable of controlling a large number of spray nozzles. As an example, the distribution system 950 may include a pump 51 configured to pump wash water, a plurality of spray nozzles 960, a distribution flow path 970 having a plurality of branch points and configured to connect the pump 51 with the plurality of spray nozzles 960 to supply wash water to the plurality of spray nozzles 960, and a plurality of distribution devices 980 disposed or placed in the plurality of branch points to distribute wash water.

A dish washing machine may adopt the above-described distribution system when the dish washing machine has a large number of spray nozzles, which may not be covered or supportable by a single distribution device among the distribution devices in accordance with the previous embodiments, or the dish washing machine may need various combinations of distribution modes or states.

The distribution system does not have a distribution flow path having only one branch point and only one distribution device but may have a distribution flow path having a plurality of branch points and a plurality of distribution devices.

In this case, the distribution devices of the distribution system may include one or more of the various distribution devices as disclosed herein.

For example, the distribution device may be any one or more of a distribution device having a rotatable opening/closing member in which an outlet is formed in a radial direction, a distribution device having a rotatable opening/closing member in which an outlet is formed in an axial direction, a distribution device having a rotatable opening/closing member in which outlets are formed both in a radial direction and an axial direction, a distribution device having an opening/closing valve that has an independent driving source and operates independently, and/or a distribution device in which a rotatable opening/closing member is combined with an opening/closing valve.

As is apparent from the above description, a dish washing machine having a linear spray structure in accordance with the disclosure may efficiently circulate wash water and increase spatial availability.

Also, only a partial region of a wash tank may be dividedly washed by supplying wash water only to some fixing nozzles from among a plurality of fixing nozzles.

Furthermore, wash water may be supplied to a large number of spray nozzles, and a wide variety of combinations of distribution may be embodied and obtained.

The dish washer and operation thereof according to the above-described example embodiments may use one or more processors. For example, a processing device may be implemented using one or more general-purpose or special purpose computers, and may include, for example, one or more of a processor, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor or any other device capable of responding to and executing instructions in a defined manner.

Although example embodiments of the disclosure have been shown and described, it would be appreciated by those skilled in the art that changes may be made to these embodiments without departing from the principles and spirit of the disclosure, the scope of which is defined in the claims and their equivalents.

What is claimed is:

1. A distribution device comprising:
   a cylindrical housing including an inlet formed in one axial end portion and a plurality of outlets arranged in a circumferential surface in an axial direction;
   a cylindrical rotation body rotatably disposed within the housing and having a plurality of communication holes corresponding to the plurality of outlets;
   a plurality of sealing members combined with the rotation body to close the plurality of outlets;
   a motor to rotate the rotation body;
   a cam member combined with the rotation body to rotate together with the rotation body; and
   a micro switch contacted by the cam member to detect a rotation position of the rotation body.

2. The distribution device according to claim 1, wherein the sealing member is combined with the rotation body to be moveable in a radial direction between an open position in which the sealing member is closely adhered to the rotation body and a closed position in which the sealing member is closely adhered to the outlet, and moves from the open position to the closed position due to water pressure.

* * * * *